US012093905B2

(12) United States Patent
Audino et al.

(10) Patent No.: US 12,093,905 B2
(45) Date of Patent: Sep. 17, 2024

(54) ENCLOSURE DEVICE AND METHOD FOR WASTE PRODUCT, CHEMICAL DEGRADATION PROCESS OF WASTE PRODUCT, AND CHAIN-OF-CUSTODY AUDIT TRAIL

(71) Applicant: Responsible Waste Disposal, LLC, Wilmington, DE (US)

(72) Inventors: Susan Audino, Wilmington, DE (US); Norman P. Audino, Wilmington, DE (US); John Sousa, Wilmington, DE (US)

(73) Assignee: Responsible Waste Disposal, LLC, Wilmington, DE (US)

(*) Notice: Subject to any disclaimer, the term of this patent is extended or adjusted under 35 U.S.C. 154(b) by 1305 days.

(21) Appl. No.: 16/666,681

(22) Filed: Oct. 29, 2019

(65) Prior Publication Data

US 2022/0147953 A1 May 12, 2022
US 2023/0132369 A9 Apr. 27, 2023

Related U.S. Application Data

(60) Provisional application No. 62/751,850, filed on Oct. 29, 2018.

(51) Int. Cl.
*G06Q 10/30* (2023.01)
*A62D 3/38* (2007.01)
(Continued)

(52) U.S. Cl.
CPC .............. *G06Q 10/30* (2013.01); *A62D 3/38* (2013.01); *B09B 3/70* (2022.01); *B65F 1/004* (2013.01);
(Continued)

(58) Field of Classification Search
CPC ........ A62D 3/38; Y02P 20/145; Y02W 30/10; Y02W 30/40; Y02W 30/82; Y02W 90/00
See application file for complete search history.

(56) References Cited

U.S. PATENT DOCUMENTS 7,918,778 B2   4/2011   Lim et al.
8,100,989 B2   1/2012   Kunik et al.
(Continued)

FOREIGN PATENT DOCUMENTS

CA    3 098 368 A1      10/2019
CN    102491487 A   *   6/2012
(Continued)

OTHER PUBLICATIONS

International Search Report and Written Opinion received in International Application No. PCT/IB2019/059278 mailed Feb. 6, 2020.
(Continued)

*Primary Examiner* — Thomas C Lee
*Assistant Examiner* — Anzuman Sharmin
(74) *Attorney, Agent, or Firm* — Ajay A. Jagtiani; Miles & Stockbridge P.C.

(57) ABSTRACT

A secured "smart" container is disclosed for collecting green waste products including operational functions for collection, video surveillance and monitoring capacity. The secured "smart" container may include one or more programmable logic controllers. Operational functions are performed by electrical components including sensors to determine green waste deposits characteristics and contents. Operational functions are further adapted to send and receive data, operationally wirelessly, and configured and adapted to utilize solar derived electric power and, optionally, electric power from other sources. Embodiments provide constant 24 hour/7 days a week video surveillance and alert monitoring capabilities. Disclosed systems and meth-
(Continued)

ods also include collection and transportation of waste contents from the container to a processing subsystem. Additionally, disclosed systems may also include a monitoring system for monitoring the collection of green waste product, delivery of the same to the processing subsystem and tracking to and throughout final processing of the green waste product and handling personnel.

19 Claims, 38 Drawing Sheets

(51) Int. Cl.
  *B09B 3/70* (2022.01)
  *B65F 1/00* (2006.01)
  *B65F 1/14* (2006.01)
  *G06F 1/3296* (2019.01)
  *G07C 9/28* (2020.01)
  *G07C 9/29* (2020.01)

(52) U.S. Cl.
  CPC ............. *B65F 1/14* (2013.01); *B65F 1/1426* (2013.01); *G06F 1/3296* (2013.01); *G07C 9/28* (2020.01); *G07C 9/29* (2020.01); *B65F 2210/128* (2013.01); *B65F 2210/168* (2013.01)

(56) References Cited

U.S. PATENT DOCUMENTS

| | | | |
|---|---|---|---|
| 8,163,045 B2 | 4/2012 | Kunik et al. | |
| 8,268,073 B2 | 9/2012 | Kunik et al. | |
| 8,324,443 B2 | 12/2012 | Kunik et al. | |
| 8,603,558 B1 * | 12/2013 | Almutairi | ................ B09B 3/45 99/474 |
| 8,785,712 B2 | 7/2014 | Deryck et al. | |
| 2003/0196884 A1 | 10/2003 | Dell'Orfano | |
| 2005/0153754 A1 | 7/2005 | Shanks et al. | |
| 2009/0071382 A1 * | 3/2009 | Clarke | ..................... F23J 15/04 110/328 |
| 2009/0105517 A1 * | 4/2009 | Kaye | ....................... A61L 11/00 588/318 |
| 2013/0278067 A1 * | 10/2013 | Poss | ...................... B65F 1/1468 307/62 |
| 2013/0336804 A1 * | 12/2013 | Robinson | ............. G05D 7/0617 417/22 |
| 2014/0040165 A1 | 2/2014 | Borowski et al. | |
| 2015/0152348 A1 | 6/2015 | Tusa et al. | |
| 2019/0332093 A1 * | 10/2019 | Isham | .................... B02C 25/00 |

FOREIGN PATENT DOCUMENTS

| | | | | |
|---|---|---|---|---|
| CN | 107052022 A | | 8/2017 | |
| GB | 2512763 A | * | 10/2014 | ............... B01F 7/08 |
| JP | 2001191056 A | | 7/2001 | |
| KR | 101769502 B1 | * | 10/2016 | |
| WO | 2013/171516 A1 | | 11/2013 | |
| WO | WO-2015183204 A1 | * | 12/2015 | ............... B09B 3/00 |
| WO | WO-2018192725 A1 | * | 10/2018 | ............... A61L 11/00 |

OTHER PUBLICATIONS

Office Action received in Canadian Application No. 3,113,385 dated Nov. 17, 2023.

* cited by examiner

FIG. 4

| | 300 RESPONSIBLE WASTE DISPOSAL | 402 SEED-TO-SALE SYSTEMS | 404 RECYCLING CENTERS | 406 WASTE VENDOR n | 408 WASTE VENDOR n+1 | 410 WASTE VENDOR n+2 |
|---|---|---|---|---|---|---|
| 412 — 1. DIRECT REGULATOR REPORTING | ● | ◐ | ○ | ○ | ○ | ○ |
| 414 — 2. SECURE DEPOSIT-VIDEO VERIFIED | ● | ○ | ◐ | ◐ | ⊖ | ○ |
| 416 — 3. ECO-FRIENDLY DESTRUCTION | ● | ○ | ◐ | ◐ | ⊖ | ⊖ |
| 418 — 4. VERIFICATION OF DESTRUCTION | ● | ○ | ◐ | ◐ | ⊖ | ○ |
| 420 — 5. REAL TIME AUDIT-QUALITY REPORTING | ● | ○ | ◐ | ○ | ○ | ○ |
| 422 — 6. ON DEMAND REMOVAL & SERVICE | ● | ○ | ◐ | ◐ | ◐ | ◐ |
| 424 — 7. FIBROUS RESIDUE RE-USE | ● | ○ | ○ | ◐ | ○ | ⊖ |
| 426 — 8. NATIONWIDE SERVICE | ● | ○ | ○ | ○ | ○ | ○ |
| 428 — 9. LOCKED SYSTEM ON-SITE DESTRUCTION | ● | ○ | ○ | ○ | ○ | ○ |

Legend: ● EXCELLENT  ◐ GOOD  ⊖ NEUTRAL  ⊖ DETRACTS  ○ NOT AVAILABLE

ENCLOSURE DEVICE AND METHOD FOR WASTE PRODUCT, CHEMICAL DEGRADATION PROCESS OF WASTE PRODUCT, AND CHAIN-OF-CUSTODY AUDIT TRAIL

CROSS-REFERENCE TO RELATED APPLICATIONS

This application claims benefit of priority of U.S. Provisional Application No. 62/751,850 entitled, "WASTE PRODUCT, CHEMICAL DEGRADATION PROCESS OF WASTE PRODUCT AND CHAIN-OF-CUSTODY AUDIT TRAIL," filed Oct. 29, 2018. The entire contents and disclosures of this patent application are incorporated herein by reference in its entirety.

BACKGROUND

Field of the Invention

The present disclosure relates generally to processes and devices for waste disposal systems. More particularly, the present disclosure is directed to collection, management and elimination of waste products including audit-quality verification and reporting of the same.

Background of the Invention

A need exists within the prior art to develop and provide improved services for the secure collection, re-purposing and/or disposing of waste products, and including providing a chain-of-custody audit trail.

SUMMARY

According to first broad aspect, the present invention provides a self-contained smart waste machine comprising: an enclosure; a power supply; a non-retrievable chute for receiving green waste material; a first receiving bin; a second receiving bin; a first holding tank for receiving the second receiving bin; a second holding tank for supplying processing fluid to the first holding tank; a third holding tank for receiving used processing fluid from the first holding tank; a ytoter for receiving processed green waste materials from the second receiving bin; and an enclosure for containing the power supply, the non-retrievable chute, the first receiving bin, the second receiving bin, the first holding tank, the second holding tank, and the toter.

According to a second broad aspect, the present invention provides a method processing green waste material in a self-contained smart waste machine comprising: powering the self-contained smart waste machine; placing green waste material into an interior of the self-contained smart waste machine through a non-retrievable chute and into first receiving bin; weighing the green waste material in the first receiving bin; transferring the green waste material from the first receiving bin to a second receiving bin; supplying a processing fluid to a first holding tank for receiving the second receiving bin; immersing the second receiving bin with transferred green waste material disposed therein into the processing fluid to undergo a chemical degradation process for a prescribed time period; removing the chemically degraded green waste material from the processing fluid and allow it to dry within the second receiving bin; and transferring the dried chemically degraded green waste material from the second receiving bin into a toter.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 4 illustrates a comparison between the present disclosure and other prior art systems for providing real-time audit-quality reporting of the disclosed service process and equipment for the collection, disposal and tracking of waste material according to one embodiment of the present disclosure.

DETAILED DESCRIPTION OF THE INVENTION

Definitions

Figure 1:
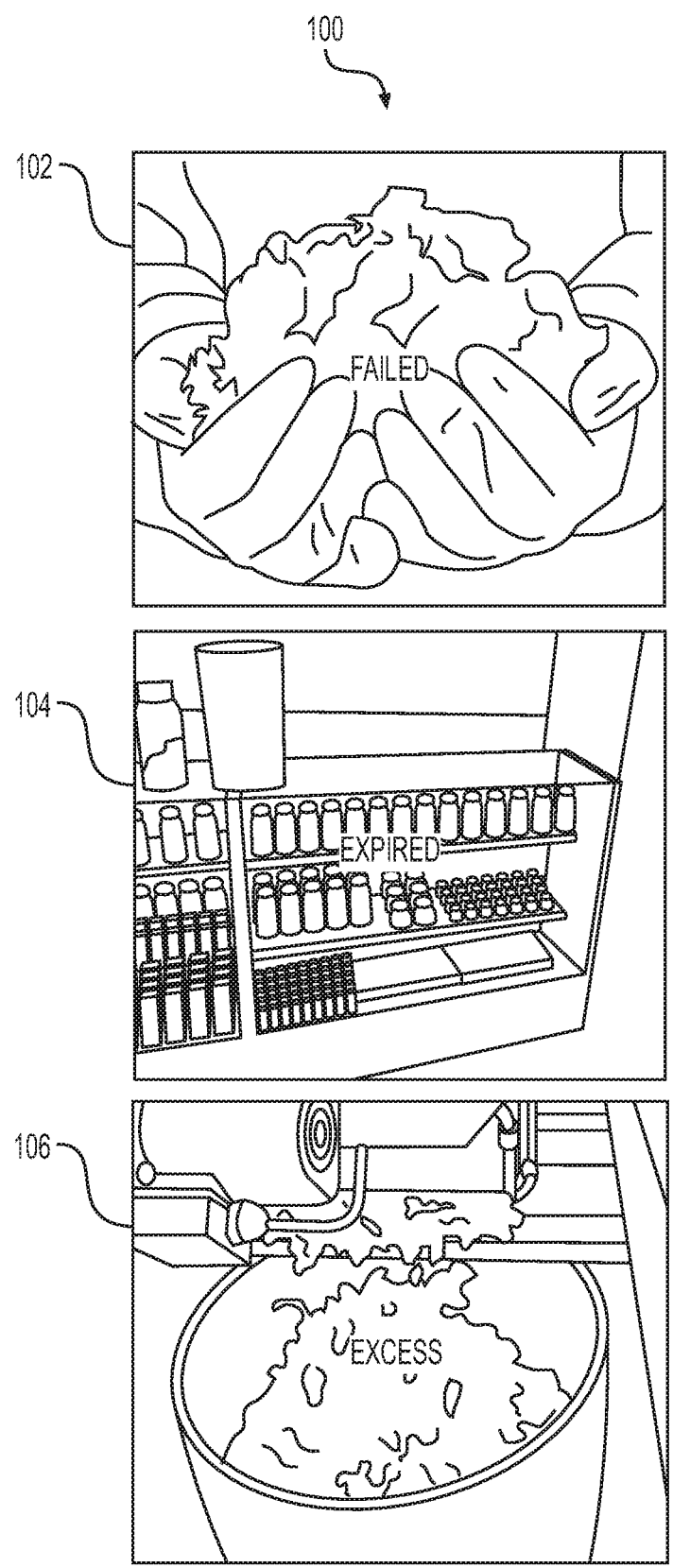
FIG. 1 is a schematic illustration showing various conditions of waste product according to one embodiment of the present disclosure.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "associated" with respect to data refers to data that are associated or linked to each other. For example, data relating the identity of an individual (identity data) wearing an integrated sensor module may be associated with the motion data for the individual obtained from an accelerometer or, optionally, from a gyroscope or, optionally, from the amplitude of the power signal from an energy harvester.

For the purposes of the present disclosure, the term "API" refers to an application programming interface (API) which is a set of subroutine definitions, communication protocols, and tools for building software applications. In general terms, it is a set of clearly defined methods of communication between various components. An API may make it easier to develop a computer program by providing all the building blocks, which are then put together by a programmer. An API may be for a web-based system, operating system, database system, computer hardware, or software library. An API specification can take many forms, but often includes specifications for routines, data structures, object classes, variables, or remote calls. POSIX, Windows API and ASPI are examples of different forms of APIs.

For the purposes of the present disclosure, the term "Bluetooth®" refers to a wireless technology standard for exchanging data over short distances (using short-wavelength radio transmissions in the ISM band from 2400-2480 MHz) from fixed and mobile devices, creating personal area networks (PANs) with high levels of security. Created by telecom vendor Ericsson in 1994, it was originally conceived as a wireless alternative to RS-232 data cables. It can connect several devices, overcoming problems of synchronization. Bluetooth® is managed by the Bluetooth® Special Interest Group, which has more than 18,000 member companies in the areas of telecommunication, computing, networking, and consumer electronics. Bluetooth® was standardized as IEEE 802.15.1, but the standard is no longer maintained. The SIG oversees the development of the specification, manages the qualification program, and protects the trademarks. To be marketed as a Bluetooth® device, it must be qualified to standards defined by the SIG. A network of patents is required to implement the technology and is licensed only for those qualifying devices.

For the purposes of the present disclosure, the term "cloud computing" is synonymous with computing performed by computers that are located remotely and accessed via the Internet (the "Cloud"). It is a style of computing where the computing resources are provided "as a service", allowing users to access technology-enabled services "in the cloud" without knowledge of, expertise with, or control over the technology infrastructure that supports them. According to the IEEE Computer Society it "is a paradigm in which information is permanently stored in servers on the Internet and cached temporarily on clients that include desktops, entertainment centers, table computers, notebooks, wall computers, handhelds, etc." Cloud computing is a general concept that incorporates virtualized storage, computing and web services and, often, software as a service (SaaS), where the common theme is reliance on the Internet for satisfying the computing needs of the users. For example, Google Apps provides common business applications online that are accessed from a web browser, while the software and data are stored on the servers. Some successful cloud architectures may have little or no established infrastructure or billing systems whatsoever including Peer-to-peer networks like BitTorrent and Skype and volunteer computing like SETI@home. The majority of cloud computing infrastructure currently consists of reliable services delivered through next-generation data centers that are built on computer and storage virtualization technologies. The services may be accessible anywhere in the world, with the Cloud appearing as a single point of access for all the computing needs of data consumers. Commercial offerings may need to meet the quality of service requirements of customers and may offer service level agreements. Open standards and open source software are also critical to the growth of cloud computing. As customers generally do not own the infrastructure, they are merely accessing or renting, they may forego capital expenditure and consume resources as a service, paying instead for what they use. Many cloud computing offerings have adopted the utility computing model which is analogous to how traditional utilities like electricity are consumed, while others are billed on a subscription basis. By sharing "perishable and intangible" computing power between multiple tenants, utilization rates may be improved (as servers are not left idle) which can reduce costs significantly while increasing the speed of application development. A side effect of this approach is that "computer capacity rises dramatically" as customers may not have to engineer for peak loads. Adoption has been enabled by "increased high-speed bandwidth" which makes it possible to receive the same response times from centralized infrastructure at other sites.

For purposes of the present disclosure, the term "computer" refers to any type of computer or other device that implements software including an individual computer such as a personal computer, laptop computer, tablet computer, mainframe computer, mini-computer, etc. A computer also refers to electronic devices such as an electronic scientific instrument such as a spectrometer, a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc. Various processes of the present disclosure may be carried out using a computer. Various functions of the present disclosure may be performed by one or more computers.

For the purposes of the present disclosure, the term "computer hardware" and the term "hardware" refer to the digital circuitry and physical devices of a computer system, as opposed to computer software, which is stored on a hardware device such as a hard disk. Most computer hardware is not seen by normal users, because it is embedded within a variety of every day systems, such as in automobiles, microwave ovens, electrocardiograph machines, compact disc players, and video games, among many others. A typical personal computer consists of a case or chassis in a tower shape (desktop) and the following parts: motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present disclosure, the term "computer network" refers to a group of interconnected computers. Networks may be classified according to a wide variety of characteristics. The most common types of computer networks in order of scale include: Personal Area Network (PAN), Local Area Network (LAN), Campus Area Network (CAN), Metropolitan Area Network (MAN), Wide Area Network (WAN), Global Area Network (GAN), Internetwork (intranet, extranet, Internet), and various types of wireless networks. All networks are made up of basic hardware building blocks to interconnect network nodes, such as Network Interface Cards (NICs), Bridges, Hubs, Switches, and Routers. In addition, some method of connecting these building blocks is required, usually in the form of galvanic cable (most commonly category 5 cable). Less common are microwave links (as in IEEE 802.11) or optical cable ("optical fiber").

For the purposes of the present disclosure, the term "computer software" and the term "software" refers to one or more computer programs, procedures and documentation that perform some tasks on a computer system. The term includes application software such as word processors which perform productive tasks for users, system software such as operating systems, which interface with hardware to provide the necessary services for application software, and middleware which controls and co-ordinates distributed systems. Software may include websites, programs, video games, etc. that are coded by programming languages like C, C++, Java, etc. Computer software is usually regarded as anything but hardware, meaning the "hard" are the parts that are tangible (able to hold) while the "soft" part is the intangible objects inside the computer. Computer software is so called to distinguish it from computer hardware, which encompasses the physical interconnections and devices required to store and execute (or run) the software. At the lowest level, software consists of a machine language specific to an individual processor. A machine language consists of groups of binary values signifying processor instructions which change the state of the computer from its preceding state.

For the purposes of the present disclosure, the term "computer system" refers to any type of computer system that implements software including an individual computer such as a personal computer, mainframe computer, minicomputer, etc. In addition, computer system refers to any type of network of computers, such as a network of computers in a business, the Internet, personal data assistant (PDA), devices such as a cell phone, a television, a videogame console, a compressed audio or video player such as an MP3 player, a DVD player, a microwave oven, etc. A personal computer is one type of computer system that typically includes the following components: a case or chassis in a tower shape (desktop) and the following parts: motherboard, CPU, RAM, firmware, internal buses (PIC, PCI-E, USB, HyperTransport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present disclosure, the term "data" means the reinterpretable representation of information in a formalized manner suitable for communication, interpretation, or processing. Although one type of common type data is a computer file, data may also be streaming data, a web service, etc. The term "data" is used to refer to one or more pieces of data.

For the purposes of the present disclosure, the term "database" or "data record" refers to a structured collection of records or data that is stored in a computer system. The structure is achieved by organizing the data according to a database model. The model in most common use today is the relational model. Other models such as the hierarchical model and the network model use a more explicit representation of relationships (see below for explanation of the various database models). A computer database relies upon software to organize the storage of data. This software is known as a database management system (DBMS). Database management systems are categorized according to the database model that they support. The model tends to determine the query languages that are available to access the database. A great deal of the internal engineering of a DBMS, however, is independent of the data model, and is concerned with managing factors such as performance, concurrency, integrity, and recovery from hardware failures. In these areas there are large differences between products.

For the purposes of the present disclosure, the term "database management system (DBMS)" represents computer software designed for the purpose of managing databases based on a variety of data models. A DBMS is a set of software programs that controls the organization, storage, management, and retrieval of data in a database. DBMS are categorized according to their data structures or types. It is a set of prewritten programs that are used to store, update and retrieve a Database.

For the purposes of the present disclosure, the term "data storage medium" or "data storage device" refers to any medium or media on which a data may be stored for use by a computer system. Examples of data storage media include floppy disks, Zip™ disks, CD-ROM, CD-R, CD-RW, DVD, DVD-R, memory sticks, flash memory, hard disks, solid state disks, optical disks, etc. Two or more data storage media acting similarly to a single data storage medium may be referred to as a "data storage medium" for the purposes of the present disclosure. A data storage medium may be part of a computer.

For the purposes of the present disclosure, the term "green waste" refers to any undesired cannabis or cannabis derived product.

For purposes of the present disclosure, the term "hardware and/or software" refers to functions that may be performed by digital software, digital hardware, or a combination of both digital hardware and digital software. Various features of the present disclosure may be performed by hardware and/or software.

For purposes of the present disclosure, the term "human-machine interface" (HMI) refers to a user interface that connects an operator to a controller such as for an industrial system. Thus, the HMI may include a user interface or dashboard that connects a person to a machine, system, or device of the present disclosure. An HMI may include electronic components for signaling and controlling automation systems. In some disclosed embodiments, HMIs may translate data from industrial control systems into human-readable visual representations of the systems. Through the HMI, an operator can see schematics of the systems and turn switches and pumps on or off, for example, or raise or lower temperatures. HMIs may be deployed on computer readable machines, communicating with programmable logic controllers (PLC) and other industrial controllers. In some embodiments, HMI may include a software application that presents information to an operator or user about the state of a process and to accept/implement an operator's control instructions. Typically information may be displayed in a graphic format (Graphical User Interface or GUI).

For purposes of the present disclosure, the term "individual" refers to an individual mammal, such as a human being.

For purposes of the present disclosure, the term "industrial control systems" (ICS) refers to integrated hardware and software designed to monitor and control, for example, the operation of the disclosed machinery and associated devices such as in industrial environments, including those that are designated critical infrastructure.

For purposes of the present disclosure, the term "interlock" refers to a feature that makes the state of two mechanisms or functions mutually dependent. It may be used to prevent undesired states in the disclosed finite-state machine, and may consist of any electrical, electronic, or mechanical devices or systems.

For the purposes of the present disclosure, the term "Internet" is a global system of interconnected computer networks that interchange data by packet switching using the standardized Internet Protocol Suite (TCP/IP). It is a "network of networks" that consists of millions of private and public, academic, business, and government networks of local to global scope that are linked by copper wires, fiber-optic cables, wireless connections, and other technologies. The Internet carries various information resources and services, such as electronic mail, online chat, file transfer and file sharing, online gaming, and the inter-linked hypertext documents and other resources of the World Wide Web (WWW).

For the purposes of the present disclosure, the term "Internet protocol (IP)" refers to a protocol used for communicating data across a packet-switched internetwork using the Internet Protocol Suite (TCP/IP). IP is the primary protocol in the Internet Layer of the Internet Protocol Suite and has the task of delivering datagrams (packets) from the source host to the destination host solely based on its address. For this purpose the Internet Protocol defines addressing methods and structures for datagram encapsulation. The first major version of addressing structure, now referred to as Internet Protocol Version 4 (Ipv4) is still the dominant protocol of the Internet, although the successor, Internet Protocol Version 6 (Ipv6) is actively deployed world-wide. In one embodiment, an EGI-SOA of the present disclosure may be specifically designed to seamlessly implement both of these protocols.

For the purposes of the present disclosure, the term "intranet" refers to a set of networks, using the Internet Protocol and IP-based tools such as web browsers and file transfer applications that are under the control of a single administrative entity. That administrative entity closes the intranet to all but specific, authorized users. Most commonly, an intranet is the internal network of an organization. A large intranet will typically have at least one web server to provide users with organizational information. Intranets may or may not have connections to the Internet. If connected to the Internet, the intranet is normally protected from being accessed from the Internet without proper authorization. The Internet is not considered to be a part of the intranet.

For the purposes of the present disclosure, the term "local area network (LAN)" refers to a network covering a small geographic area, like a home, office, or building. Current LANs are most likely to be based on Ethernet technology. The cables to the servers are typically on Cat 5e enhanced cable, which will support IEEE 802.3 at 1 Gbit/s. A wireless LAN may exist using a different IEEE protocol, 802.11b, 802.11g or possibly 802.11n. The defining characteristics of LANs, in contrast to WANs (wide area networks), include their higher data transfer rates, smaller geographic range, and lack of a need for leased telecommunication lines. Current Ethernet or other IEEE 802.3 LAN technologies operate at speeds up to 10 Gbit/s.

For the purposes of the current invention, the term "low powered wireless network" refers to an ultra-low powered wireless network between sensor nodes and a centralized device. The ultra-low power is needed by devices that need to operate for extended periods of time from small batteries energy scavenging technology. Examples of low powered wireless networks are ANT, ANT+, Bluetooth Low Energy (BLE), ZigBee and WiFi.

For purposes of the present disclosure, the term "machine-readable medium" refers to any tangible or non-transitory medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" includes, but is limited to, solid-state memories, and optical and magnetic media. Specific examples of machine-readable media include non-volatile memory, including by way of example, semiconductor memory devices, e.g., EPROM, EEPROM, and flash memory devices; magnetic disks such as internal hard disks and removable disks; magneto-optical disks; and CD-ROM and DVD-ROM disks. The term "machine-readable medium" may include a single medium or multiple media (e.g., a centralized or distributed database, and/or associated caches and servers) that store the one or more instructions or data structures.

For the purposes of the present disclosure, the term "MEMS" refers to Micro-Electro-Mechanical Systems. MEMS, is a technology that in its most general form may be defined as miniaturized mechanical and electro-mechanical elements (i.e., devices and structures) that are made using the techniques of microfabrication. The critical physical dimensions of MEMS devices can vary from well below one micron on the lower end of the dimensional spectrum, all the way to several millimeters. Likewise, the types of MEMS devices can vary from relatively simple structures having no moving elements, to extremely complex electromechanical systems with multiple moving elements under the control of integrated microelectronics. A main criterion of MEMS may include that there are at least some elements having some sort of mechanical functionality whether or not these elements can move. The term used to define MEMS varies in different parts of the world. In the United States they are predominantly called MEMS, while in some other parts of the world they are called "Microsystems Technology" or "micromachined devices." While the functional elements of MEMS are miniaturized structures, sensors, actuators, and microelectronics, most notable elements may include microsensors and microactuators. Microsensors and microactuators may be appropriately categorized as "transducers," which are defined as devices that convert energy from one form to another. In the case of microsensors, the device typically converts a measured mechanical signal into an electrical signal.

For the purposes of the present disclosure the term "mesh networking" refers to a type of networking where each node must not only capture and disseminate its own data, but also serve as a relay for other nodes, that is, it must collaborate to propagate the data in the network. A mesh network can be designed using a flooding technique or a routing technique. When using a routing technique, the message is propagated along a path, by hopping from node to node until the destination is reached. To ensure all its paths' availability, a routing network must allow for continuous connections and reconfiguration around broken or blocked paths, using self-healing algorithms A mesh network whose nodes are all connected to each other is a fully connected network. Mesh networks can be seen as one type of ad hoc network. Mobile ad hoc networks and mesh networks are therefore closely related, but mobile ad hoc networks also have to deal with the problems introduced by the mobility of the nodes. The self-healing capability enables a routing based network to operate when one node breaks down or a connection goes bad. As a result, the network is typically quite reliable, as there is often more than one path between a source and a destination in the network. Although mostly used in wireless situations, this concept is also applicable to wired networks and software interaction.

For the purposes of the present disclosure the term "mobile ad hoc network" is a self-configuring infrastructureless network of mobile devices connected by wireless. Ad hoc is Latin and means "for this purpose". Each device in a mobile ad hoc network is free to move independently in any direction, and will therefore change its links to other devices frequently. Each must forward traffic unrelated to its own use, and therefore be a router. The primary challenge in building a mobile ad hoc network is equipping each device to continuously maintain the information required to properly route traffic. Such networks may operate by themselves or may be connected to the larger Internet. Mobile ad hoc networks are a kind of wireless ad hoc networks that usually has a routable networking environment on top of a Link Layer ad hoc network. The growths of laptops and wireless networks have made mobile ad hoc networks a popular research topic since the mid-1990s. Many academic papers evaluate protocols and their abilities, assuming varying degrees of mobility within a bounded space, usually with all nodes within a few hops of each other. Different protocols are then evaluated based on measure such as the packet drop rate, the overhead introduced by the routing protocol, end-to-end packet delays, network throughput etc.

For the purposes of the present disclosure, the term "network hub" refers to an electronic device that contains multiple ports. When a packet arrives at one port, it is copied to all the ports of the hub for transmission. When the packets are copied, the destination address in the frame does not change to a broadcast address. It does this in a rudimentary way, it simply copies the data to all of the Nodes connected to the hub. This term is also known as hub. The term "Ethernet hub," "active hub," "network hub," "repeater hub," "multiport repeater" or "hub" may also refer to a device for connecting multiple Ethernet devices together and making them act as a single network segment. It has multiple input/output (I/O) ports, in which a signal introduced at the input of any port appears at the output of every port except the original incoming. A hub works at the physical layer (layer 1) of the OSI model. The device is a form of multiport repeater. Repeater hubs also participate in collision detection, forwarding a jam signal to all ports if it detects a collision.

For purposes of the present disclosure, the term "non-transient storage medium" refers to a storage medium that is non-transitory, tangible and computer readable. Non-transient storage medium may refer generally to any durable medium known in the art upon which data can be stored and later retrieved by data processing circuitry operably coupled with the medium. A non-limiting non-exclusive list of exemplary non-transitory data storage media may include magnetic data storage media (e.g., hard disc, data tape, etc.), solid state semiconductor data storage media (e.g., SDRAM, flash memory, ROM, etc.), and optical data storage media (e.g., compact optical disc, DVD, etc.).

For purposes of the present disclosure, the term "processor" refers to a device that performs the basic operations in a computer. A microprocessor is one example of a processor For the purposes of the present disclosure, the term "random-access memory (RAM)" refers to a type of computer data storage. Today it takes the form of integrated circuits that allow the stored data to be accessed in any order, i.e. at random. The word random thus refers to the fact that any piece of data can be returned in a constant time, regardless of its physical location and whether or not it is related to the previous piece of data. This contrasts with storage mechanisms such as tapes, magnetic discs and optical discs, which rely on the physical movement of the recording medium or a reading head. In these devices, the movement takes longer than the data transfer, and the retrieval time varies depending on the physical location of the next item. The word RAM is mostly associated with volatile types of memory (such as DRAM memory modules), where the information is lost after the power is switched off. However, many other types of memory are RAM as well, including most types of ROM and a kind of flash memory called NOR-Flash.

For the purposes of the present disclosure, the term "re-purposing" refers to the process of treating material to be denatured or stripped of all active chemical compounds, leaving behind a cellulose or fibrous-type debris. This debris may be re-purposed into compost material, novelty products, textile products, paper products, alternative energy component, or other material(s) that could benefit from a chemically inert fiber. Other exemplary application applications may include landfill applications co-mingled with dirt, sand, cat litter, coffee grounds, shredded paper, or cardboard scenarios.

For the purposes of the present disclosure, the term "read-only memory (ROM)" refers to a class of storage media used in computers and other electronic devices. Because data stored in ROM cannot be modified (at least not very quickly or easily), it is mainly used to distribute firmware (software that is very closely tied to specific hardware, and unlikely to require frequent updates). In its strictest sense, ROM refers only to mask ROM (the oldest type of solid state ROM), which is fabricated with the desired data permanently stored in it, and thus can never be modified. However, more modern types such as EPROM and flash EEPROM can be erased and re-programmed multiple times; they are still described as "read-only memory" because the reprogramming process is generally infrequent, comparatively slow, and often does not permit random access writes to individual memory locations.

For the purposes of the present disclosure, the term "real-time" refers to the actual time during which something takes place.

For the purposes of the present disclosure, the term "real-time processing" refers to a processing system designed to handle workloads whose state is constantly changing. Real-time processing means that a transaction is processed fast enough for the result to come back and be acted on as transaction events are generated. In the context of a database, real-time databases are databases that are capable of yielding reliable responses in real-time.

For the purposes of the present disclosure, the term "router" refers to a networking device that forwards data packets between networks using headers and forwarding tables to determine the best path to forward the packets. Routers work at the network layer of the TCP/IP model or layer 3 of the OSI model. Routers also provide interconnectivity between like and unlike media devices. A router is connected to at least two networks, commonly two LANs or WANs or a LAN and its ISP's network.

For the purposes of the present disclosure, the term "seed-to-sale providers" refers to entities providing detailed records of each cannabis plant that is grown, harvested, processed, sold, used, and disposed.

For the purposes of the present disclosure, the term "server" refers to a system (software and suitable computer hardware) that responds to requests across a computer network to provide, or help to provide, a network service. Servers can be run on a dedicated computer, which is also often referred to as "the server," but many networked computers are capable of hosting servers. In many cases, a computer can provide several services and have several servers running. Servers may operate within a client-server architecture and may comprise computer programs running to serve the requests of other programs—the clients. Thus, the server may perform some task on behalf of clients. The clients typically connect to the server through the network but may run on the same computer. In the context of Internet Protocol (IP) networking, a server is a program that operates as a socket listener. Servers often provide essential services across a network, either to private users inside a large organization or to public users via the Internet. Typical computing servers are database server, file server, mail server, print server, web server, gaming server, application server, or some other kind of server. Numerous systems use this client/server networking model including Web sites and email services. An alternative model, peer-to-peer networking may enable all computers to act as either a server or client as needed.

For the purposes of the present disclosure, the term "smart," as it refers to an electronic device, may be regarded as an electronic device generally connected to other devices or networks via different wireless protocols such as Bluetooth, NFC, Wi-Fi, LiFi, 3G, 4G etc., that can operate to some extent interactively and autonomously. The term can also refer to a device that exhibits some properties of ubiquitous computing, including artificial intelligence.

For the purposes of the present disclosure, the term "solid-state electronics" refers to those circuits or devices built entirely from solid materials and in which the electrons, or other charge carriers, are confined entirely within the solid material. The term is often used to contrast with the earlier technologies of vacuum and gas-discharge tube devices and it is also conventional to exclude electro-mechanical devices (relays, switches, hard drives and other devices with moving parts) from the term solid state. While solid-state can include crystalline, polycrystalline and amorphous solids and refer to electrical conductors, insulators and semiconductors, the building material is most often a crystalline semiconductor. Common solid-state devices include transistors, microprocessor chips, and RAM. A specialized type of RAM called flash RAM is used in flash drives and more recently, solid state drives to replace mechanically rotating magnetic disc hard drives. More recently, the integrated circuit (IC), the light-emitting diode (LED), and the liquid-crystal display (LCD) have evolved as further examples of solid-state devices. In a solid-state component, the current is confined to solid elements and compounds engineered specifically to switch and amplify it.

For the purposes of the present disclosure, the term "solid state sensor" refers to sensor built entirely from a solid-phase material such that the electrons or other charge carriers produced in response to the measured quantity stay entirely with the solid volume of the detector, as opposed to gas-discharge or electro-mechanical sensors. Pure solid-state sensors have no mobile parts and are distinct from electro-mechanical transducers or actuators in which mechanical motion is created proportional to the measured quantity.

For purposes of the present disclosure, the term "storage medium" refers to any form of storage that may be used to store bits of information. Examples of storage media include both volatile and non-volatile memories such as MRRAM, MRRAM, ERAM, flash memory, RFID tags, floppy disks, Zip™ disks, CD-ROM, CD-R, CD-RW, DVD, DVD-R, flash memory, hard disks, optical disks, etc. Two or more storage media acting similarly to a single data storage medium may be referred to as a "storage medium" for the purposes of the present disclosure. A storage medium may be part of a computer.

For purposes of the present disclosure, the term "toter" refers to a heavy duty trash can such as a residential curbside or commercial apparatus including, for example, a two-wheeled garbage container with a molded-in axle and attached lid. The large footprint and aerodynamic design may create a superior wind and set-down stability and are compatible with automated or semi-automated collection waste truck lifters.

For the purposes of the present disclosure, the term "transmission control protocol (TCP)" refers to one of the core protocols of the Internet Protocol Suite. TCP is so central that the entire suite is often referred to as "TCP/IP." Whereas IP handles lower-level transmissions from computer to computer as a message makes its way across the Internet, TCP operates at a higher level, concerned only with the two end systems, for example a Web browser and a Web server. In particular, TCP provides reliable, ordered delivery of a stream of bytes from one program on one computer to another program on another computer. Besides the Web, other common applications of TCP include e-mail and file transfer. Among its management tasks, TCP controls message size, the rate at which messages are exchanged, and network traffic congestion.

For the purposes of the present disclosure, the term "time" refers to a component of a measuring system used to sequence events, to compare the durations of events and the intervals between them, and to quantify the motions of objects. Time is considered one of the few fundamental quantities and is used to define quantities such as velocity. An operational definition of time, wherein one says that observing a certain number of repetitions of one or another standard cyclical event (such as the passage of a free-swinging pendulum) constitutes one standard unit such as the second, has a high utility value in the conduct of both advanced experiments and everyday affairs of life. Temporal measurement has occupied scientists and technologists, and was a prime motivation in navigation and astronomy. Periodic events and periodic motion have long served as standards for units of time. Examples include the apparent motion of the sun across the sky, the phases of the moon, the swing of a pendulum, and the beat of a heart. Currently, the international unit of time, the second, is defined in terms of radiation emitted by cesium atoms.

For the purposes of the present disclosure, the term "timestamp" refers to a sequence of characters, denoting the date and/or time at which a certain event occurred. This data is usually presented in a consistent format, allowing for easy comparison of two different records and tracking progress over time; the practice of recording timestamps in a consistent manner along with the actual data is called timestamping. Timestamps are typically used for logging events, in which case each event in a log is marked with a timestamp. In file systems, timestamp may mean the stored date/time of creation or modification of a file. The International Organization for Standardization (ISO) has defined ISO 8601 which standardizes timestamps.

For the purposes of the present disclosure, the term "visual display device" or "visual display apparatus" includes any type of visual display device or apparatus such as a CRT monitor, LCD screen, LEDs, a projected display, a printer for printing out an image such as a picture and/or text, etc. A visual display device may be a part of another device such as a computer monitor, television, projector, telephone, cell phone, smartphone, laptop computer, tablet computer, handheld music and/or video player, personal data assistant (PDA), handheld game player, head mounted display, a heads-up display (HUD), a global positioning system (GPS) receiver, automotive navigation system, dashboard, watch, microwave oven, electronic organ, automatic teller machine (ATM) etc.

For the purposes of the present disclosure, the term "wearable device" refers to a device that may be mounted, fastened or attached to a user or any part of a user's clothing, or incorporated into items of clothing and accessories which may be worn on the body of a user. In some embodiments, wearable device refers to wearable technology, wearables, fashionable technology, tech togs, fashion electronics, clothing and accessories, such as badges, watches, and jewelry incorporating computer and advanced electronic technologies.

For the purposes of the present disclosure, the term "web service" refers to the term defined by the W3C as "a software system designed to support interoperable machine-to-machine interaction over a network". Web services are frequently just web APIs that can be accessed over a network, such as the Internet, and executed on a remote system hosting the requested services. The W3C Web service definition encompasses many different systems, but in common usage the term refers to clients and servers that communicate using XML messages that follow the SOAP standard. In such systems, there is often machine-readable description of the operations offered by the service written in the Web Services Description Language (WSDL). The latter is not a requirement of a SOAP endpoint, but it is a prerequisite for automated client-side code generation in many Java and .NET SOAP frameworks. Some industry organizations, such as the WS-I, mandate both SOAP and WSDL in their definition of a Web service. More recently, RESTful Web services have been used to better integrate with HTTP compared to SOAP-based services. They do not require XML messages or WSDL service-API definitions.

For the purposes of the present disclosure, the term "wide area network (WAN)" refers to a data communications network that covers a relatively broad geographic area (i.e. one city to another and one country to another country) and that often uses transmission facilities provided by common carriers, such as telephone companies. WAN technologies generally function at the lower three layers of the OSI reference model: the physical layer, the data link layer, and the network layer.

For the purposes of the present disclosure, the term "World Wide Web Consortium (W3C)" refers to the main international standards organization for the World Wide Web (abbreviated WWW or W3). It is arranged as a consortium where member organizations maintain full-time staff for the purpose of working together in the development of standards for the World Wide Web. W3C also engages in education and outreach, develops software and serves as an open forum for discussion about the Web. W3C standards include: CSS, CGI, DOM, GRDDL, HTML, OWL, RDF, SVG, SISR, SOAP, SMIL, SRGS, SSML, VoiceXML, XHTML+ Voice, WSDL, XACML. XHTML, XML, XML Events, Xforms, XML Information, Set, XML Schema, Xpath, Xquery and XSLT.

For the purposes of the present disclosure, the term "ZigBee" refers a specification for a suite of high level communication protocols used to create personal area networks built from small, low-power digital radios. ZigBee is based on an IEEE 802 standard. Though low-powered, ZigBee devices often transmit data over longer distances by passing data through intermediate devices to reach more distant ones, creating a mesh network; i.e., a network with no centralized control or high-power transmitter/receiver able to reach all of the networked devices. The decentralized nature of such wireless ad-hoc networks make them suitable for applications where a central node can't be relied upon. ZigBee may be used in applications that require a low data rate, long battery life, and secure networking. ZigBee has a defined rate of 250 kbit/s, best suited for periodic or intermittent data or a single signal transmission from a sensor or input device. Applications include wireless light switches, electrical meters with in-home-displays, traffic management systems, and other consumer and industrial equipment that requires short-range wireless transfer of data at relatively low rates. The technology defined by the ZigBee specification is intended to be simpler and less expensive than other WPANs, such as Bluetooth® or Wi-Fi. Zigbee networks are secured by 128 bit encryption keys.

DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

Marijuana refers to the dried leaves, flowers, stems, and seeds from the *Cannabis sativa* or *Cannabis indica* plant. Cannabis is often used for its mental and physical effects, such as a "high" or "stoned" feeling, a general change in perception, euphoria (heightened mood), and an increase in appetite. Cannabis can be used in several forms, such as by smoking, vaporizing, within food, or as an extract. The main psychoactive part of cannabis is tetrahydrocannabinol (THC); one of 483 known compounds in the plant, including at least 65 other cannabinoids. THC acts on specific brain cell receptors that ordinarily react to natural THC-like chemicals. These natural chemicals play a role in normal brain development and function. Cannabis has both short- and long-term effects on the brain. Short-term side effects may include a decrease in short-term memory, dry mouth, impaired motor skills, red eyes, and feelings of paranoia or anxiety. Long-term side effects may include addiction, decreased mental ability in those who started as teenagers, and behavioral problems in children whose mothers used cannabis during pregnancy.

Cannabis waste comes from any unused portions of cannabis plant, bi-products of manufacturing processes, or discarded commercial products, including marijuana for medical or recreational use. Cannabis waste may be dangerous or potentially harmful to human health or the environment and requires more attention than just typically provided for or a general trash service. Thus, there is a need to effectively manage cannabis waste.

In the United States, cannabis is a schedule I controlled substance under federal law. Cannabis waste is regulated by local and state governments to ensure that proper transport and disposal procedures are followed. Proper waste disposal regulations apply whether the grow operation is a caregiver for a few patients or a large-scale facility that supplies dispensaries. The legal responsibility is on growers to ensure proper disposal.

In the industry of cannabis cultivation, whether professional growers are producing dried buds or collecting resin for extraction, the steps of harvesting and processing create by-products and waste that must be disposed of according to all applicable regulations. The types of waste that must be evaluated for proper disposal include: 1) waste from solid plant material, whether a usable plant trim or flower or unusable plant material, such as stalks, roots, or soil; 2) waste solvents that were used in processing, such as a flammable solvent for the purpose of producing a concentrate; 3) any laboratory wastes that were used during processing for quality assurance testing; 4) any plant waste or extract that is not being used, because it does not meet quality assurance or has been contaminated in some way that would make it unusable in a safe and medical capacity; 5) liquids or water that could contaminate ground water due to pesticide use. Cannabis waste is limited not just to the by-product of growing. Many states also have regulations for how to properly destroy and dispose of any excess product that would place the grower in violation of the allowable limit.

Cannabis is perishable. As soon as a cannabis plant has been harvested, it begins to degrade. In this process, cannabinoids and terpenes synthesize into other compounds, subsequently altering their psychoactive properties. For example, temperature has the ability to cause tetrahydrocannabinolic acid (THCA), a non-psychoactive cannabinoid, to decarboxylate and become THC (which is highly psychoactive), but heat and light can cause THC to degrade to cannabinol (CBN), which induces little to no psychoactive effects, over time as well.

A method of disposal of cannabis plant waste is to allow the cannabis waste to be composted. This method is an environmentally friendly way to handle it internally, and the composted material can be integrated back into the grow cycle in soil-like mixes that can be amended or reused, such as peat and coco (coir) fiber. This method would require lab testing in order to ensure the creation of healthy new soil. Another accepted method to dispose of cannabis plant waste is to shred unused cannabis plant portions (such as leaves), blend the shredded plant waste 50/50 with cardboard, bag the blended plant waste up, and dump it. Shredded cannabis plant waste can also be blended with other organic substances, but the cardboard method is pretty much universally accepted, simple, and clean.

In the industry of medical marijuana, marijuana disposal is similar to pharmaceutical waste disposal. THC is the chemical responsible for most of marijuana's medicinal effects. If not disposed of properly, it can poison animals and have adverse effects on local ecology. Marijuana dispensaries are generally held to stringent standards and requirements when it comes to how and when they dispose of marijuana waste. For example, in Illinois, dispensaries are required to destroy cannabis and cannabis products in order to render it unusable. According to the state, the allowable method to render cannabis waste unusable is by grinding and incorporating the cannabis waste with other ground materials so the resulting mixture is at least 50% non-cannabis waste by volume. Facilities must also file electronic documentation of destruction and keep it for 5 years. In Colorado, for example, state rules require that medical marijuana waste be mixed with oil, cardboard or other products that make the drugs impossible to ingest. The waste should be disposed of in a locked container.

Some acceptable methods of medical cannabis disposal for registered patients and caregivers include: 1) bringing unused medical cannabis products to a medical cannabis dispensary; 2) dropping off remaining medical cannabis with a local law enforcement agency; 3) disposing of medical cannabis products at a recognized drug take-back program within a state. If these methods of disposal are unavailable to a registered patient or caregiver, unused medical cannabis medication may be disposed in the household trash similar to other pharmaceuticals following these steps: 1) removing the medical cannabis from its original container and mixing it with an undesirable substance, such as used coffee grounds, dirt or cat litter (this makes the drug less appealing to children and pets, and unrecognizable to people who may intentionally go through the trash seeking drugs); 2) placing the mixture in a sealable bag, empty can or other container to prevent the drug from leaking; 3) scratching off or marking out all identifying information on the medical cannabis label to make it unreadable. This will help protect the patent or caregiver's identity and the privacy of personal health information.[1]

[1] "Medical Cannabis Disposal Methods for Registered Patients and Caregivers." Minnesota Department of Health Office of Medical Cannabis.

WO/2013/171516 discloses a destruction kit for a controlled drug. The kit includes a water soluble gelling agent comprising starch and an oxidizing agent comprising a peroxide-releasing compound. A medicament to be destroyed is introduced to the gelling agent and oxidizing agent that are combined with water to form a gelled mixture for denaturing an active ingredient. WO/2013/171516 also discloses a method of denaturing the active ingredient in a waste drug formulation by: introducing the waste drug formulation into a mixture of gelling agent and oxidizing agent; and then dissolving the water soluble gelling agent and oxidizing agent in sufficient water to form a gelled mixture. The reaction between the components in the gelled mixture is allowed to proceed to denature the active ingredient after which the combination of gelled mixture and drug formulation is disposed of.

U.S. Pat. No. 7,918,778 discloses a composition for destruction of unused or expired medicines comprised of: an acidic solvent; a dishwashing liquid; and activated carbon. The acidic solvent can be distilled vinegar, lemon juice, hydrochloric acid, diluted hydrochloric acid, acetic acid, diluted acetic acid, bleach, ammonia, alcohol, and combinations thereof, the dishwashing liquid includes at least one anionic surfactant, at least one nonionic surfactant, and cocinin, and the activated carbon is selected can be powdered activated carbon or granulated activated carbon, typically with a surface area of at least approximately 500 square meters per gram. The composition can further include fragrance and/or coloring. The components of the composition can also be sold individually or one or more components can be sold together with a container.

U.S. Pat. No. 8,785,712 discloses a pharmaceutical drug disposal kit including a container for receiving pharmaceutical drugs. Water is added to the container to create an aqueous solution with the pharmaceutical drugs, and a constituent in the container makes the solution a basic aqueous solution. A visual and/or taste deterrent is disposed in the container, and an adsorbent or absorbent is also disposed in the container to provide at least partial solidification of the solution. A binding agent is also disposed in the container to bind the ingredients of the pharmaceutical drug, the deterrent, and the adsorbent/absorbent, thereby changing the physical state of the pharmaceutical drugs into a substance that is undesirable to consume, and which enables safe disposal of the pharmaceutical drugs.

U.S. Publication No. US2015/0152348 discloses systems and methods implementing the systems including a facility including a plurality of collection apparatuses distributed in the facility for ease of collection and transportation. The system also includes transportation subsystems for shipping filled inner containers to a processing subsystem and for transporting a fuel material or a land fillable material to incineration or landfill subsystems. The systems may also include a monitoring subsystem for monitoring the deployed collection apparatuses, inner containers, the fuel material and the land fillable material. In one embodiment, the system comprises a collection subsystem including at least one collection apparatus located in a facility the generates used, unused, and/or waste pharmaceutical containing materials including over-the-counter (OTC) pharmaceuticals, prescription pharmaceuticals and controlled pharmaceuticals, where each apparatus includes a lockable outer container having a lockable opening and a unidirectional depositing member and a transportable inner container for receiving the used, unused, and/or waste pharmaceutical containing materials through the unidirectional depositing member, a repurposing subsystem including processing units, optionally pretreating units, and optionally post-treating units for processing the used, unused, and/or waste pharmaceutical containing materials to produce a burnable fuel material or a plurality of burnable fuel materials or a landfill material or a plurality of landfill materials, and a transportation subsystem including common carriers, contract carriers, medical waste pick-up service companies, hazardous waste pick-up service companies, or mixtures and combinations thereof for transporting the transportable inner containers from the collection subsystem to the repurposing subsystem.

Figure 2:
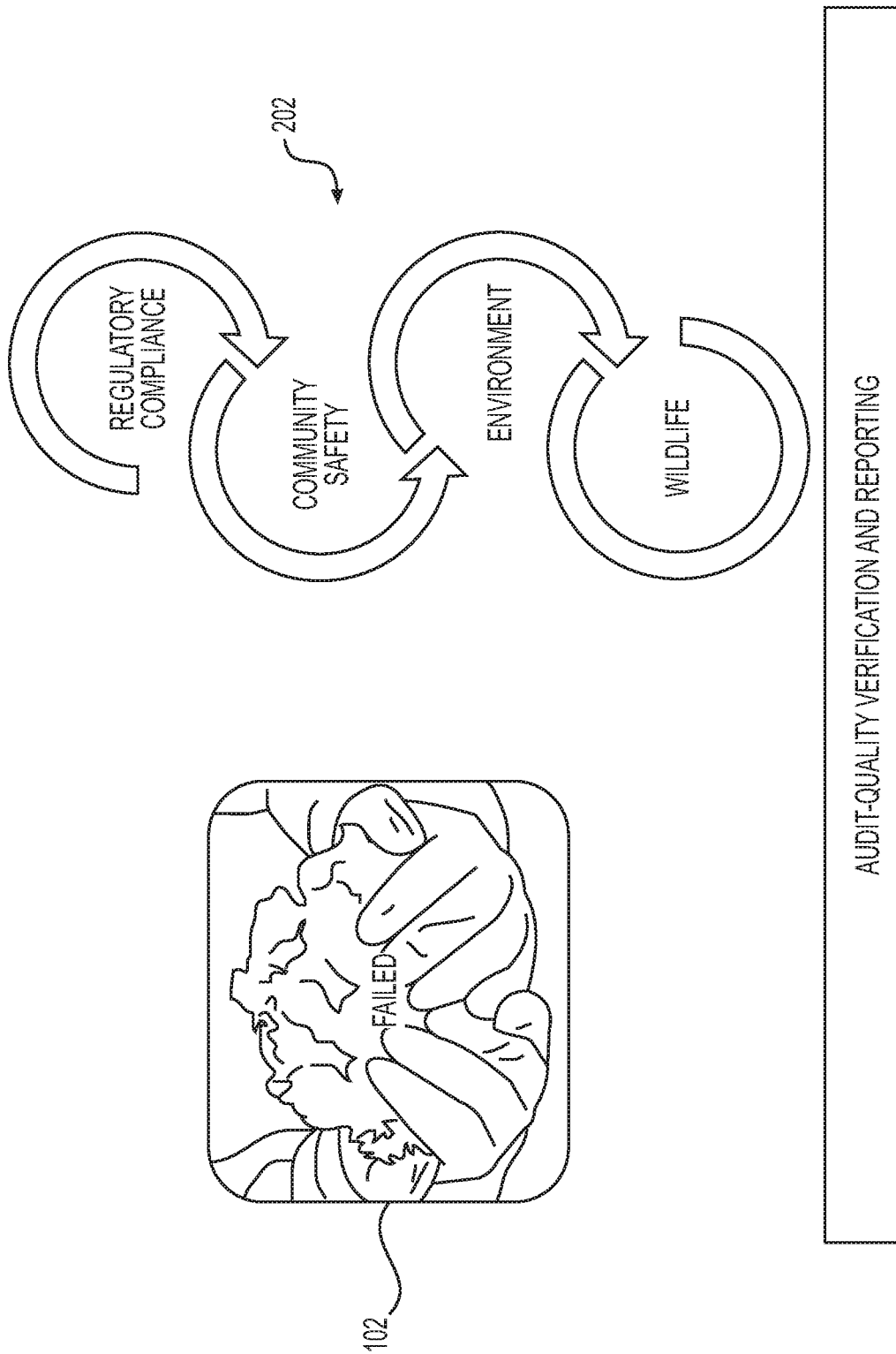
FIG. 2 is a schematic illustration for addressing responsible management and disposal of waste material according to one embodiment of the present disclosure.

The present disclosure is directed to providing an unbroken chain of responsible and accountable waste disposal. In some embodiments, the aforementioned waste disposal includes cannabis waste. As illustrated in FIG. 1, exemplary conditions 100 of cannabis waste may include failed or poor quality product 102, expired product 104 and/or excess product 106. Exemplary conditions 100 may require disposal of the cannabis waste. As shown in FIG. 2, disposal of the cannabis waste must be done responsibly and in consideration of multiple factors 202 including, but not limited to, regulatory compliance in municipalities, community safety, environmental concerns and wildlife considerations. It is, therefore, important to provide audit-quality verification and reporting, for example, during the collection and disposal of cannabis waste product.

Figure 3:
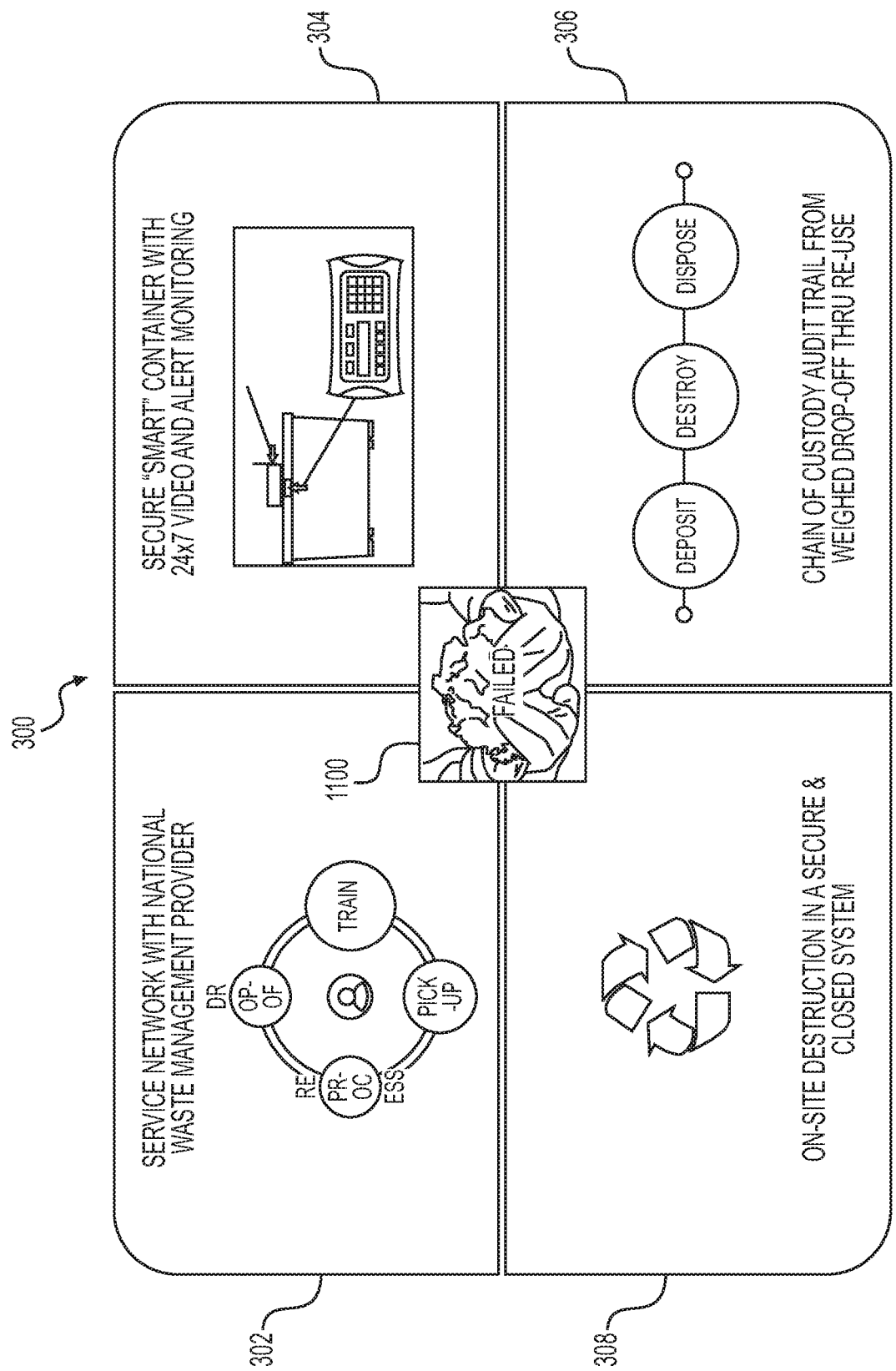
FIG. 3 is a schematic illustration showing an exemplary service process and equipment for the collection, disposal and tracking of waste material according to one embodiment of the present disclosure.

Turning to FIG. 3, disclosed embodiments provide a system 300 for collecting, tracking and disposing of cannabis waste product. Several functionality modules may be employed within system 300 as described herein. For example, when one of the exemplary conditions 100 is identified (e.g., failed or poor quality product 102, expired product 104 and/or excess product 106) a servicing module 302 of system 300 may include a service network. The service network may include a local and/or national waste management which may be deployed to handle the cannabis waste product at a prescribed location, as needed. Such handling may include, for example, collection, pick-up, and drop-off of the cannabis waste product.

An additional embodiment of the disclosed system 300 may include a module 304 for collecting and securing waste product such as cannabis waste. Thus, the cannabis waste product may be collected and secured in a waste enclosure. Such waste enclosure may include a secured "smart" container, for example, having constant 24 hours a day 7 days a week video surveillance and alert monitoring capabilities. Thus, in one exemplary embodiment, the disclosed "smart" container may include: (1) individualized access to deposit material into the box that includes attestation to content and mass of content being deposited; (2) real-time accounting between stated contents of delivery and actual contents, ascertained by either video stream or still shot of the material and internal scale; (3) once container reaches maximum volume or when previously scheduled, technician(s) will be deployed to the container's site; (4) the chemical destruction will occur within the confines of the container and on-site such that the active cannabis material never leaves the site; (5) once the destruction process is complete and the liquid is determined neutral (i.e., pH 6.5-7.1), it will be suctioned to a holding tank while fibrous residue will be either suctioned to the same tank or segregated to an additional device; (6) there will be an constant audit trail of the above steps that will be available for remote viewing, access, and reporting to other sources such as and including regulatory monitoring systems. Ultimately, the disclosed unit or secured "smart" container is different from all other known designs and/or convention systems in that it provides closed-system chemical destruction of a highly valuable material, e.g., cannabis, without transporting active cannabis. The disclosed system provides a real-time audit and accountability for the laboratories, cultivation facilities, dispensaries, and other users and ensures their compliance to local, state, and federal requirements. Ultimately, this disclosed system and process is uniquely qualified to provide safety while addressing environmental and security concerns.

Another embodiment of system 300 may include a module 306 that provides a chain-of-custody audit trail. Features of the same may uniquely include monitoring items such as: (1) person accessing the disclosed "smart" container or locked unit with purpose of disposing waste material; (2) time, date stamp of such access; (3) video feed and/or still shot (from interior of box) of waste material being deposited; (4) reconciliation of mass of waste material purportedly disposed by person depositing with tared and/or cumulative mass as record by internal scale; (5) date and time waste material is destroyed; (6) report of all of the above will be available from cloud storage to customers as well as box owner; (7) upon request, box owner will make this audit trail available to regulatory bodies either by electronic report transfer or by direct upload to state seed to sale monitoring system. Thus, the disclosed system improvises current chain of monitoring which merely requires: (a) cannabis business attestation or affidavit stating entities have complied with requirements/regulations; (b) no chain of custody in those states that don't require chain of custody; (c) other disposal companies provide third party report or attestation to cannabis business. Thus, there is currently no accurate and or precise mechanism of audit trail for wasted cannabis. This makes sale to the black market widely available and accessible, and relies solely on the integrity of cannabis businesses. In contrast, the disclosed system locks down the waste deposit and disposal process as much as possible by requiring coded access to deposit material and inability to retract material once deposited.

Another embodiment of system 300 may include a module 306 that provides a chain-of-custody audit trail such as from a weighed drop-off event (of the waste product) through re-use or destruction of the same. After treating waste product, such as discussed herein, disclosed embodiments may opt to sell remaining cellulose/fibrous material to composting companies, novelty production, paper production or textile companies. Additional opportunities exist for (a) distilling the liquid waste to terpene distillates, and (b) developing chemical degradation of cannabinoids while retaining other necessary properties to make the waste amenable to biodiesel or other alternative energy product. In other disclosed embodiments, microbes may be utilized, for example, to yield organic compost material and or components available for alternative energy sources.

In yet another embodiment of system 300, a final handling module 308 may be provided. Final handling module 308 may include on-site destruction of waste product in a secure and closed system. The disclosed system may not completely destroy the entire waste material. In select embodiments, the emphasis and objective is to destroy only certain chemical components (e.g., cannabinoids) while retaining the inert fibrous residue. Waste products will include a neutral liquid that may be disposed as a non-hazardous liquid while the fiber residue can be recycled for novelty products, compost material, alternative energy products, or paper/textile productions, etc. All destruction of waste material product may be completed within the disclosed waste unit, collection apparatus and/or secured "smart" container which may be disposed on-site at a customer's location. The destructed waste materials may be subsequently transported off the property as neutralized liquid and chemically inert fiber, all of which may be disposed in routine trash collection facilities and/or at general landfills.

As shown in FIG. 4, the disclosed system 300 provides superior advantages over conventional systems and processes 402, 404, 406, 408, and 410 for managing waste disposal systems against multiple criteria including: (1) direct regulator reporting 412; a software protocol may be implanted to provide an immediate remote report that may be uploaded directly to any relevant regulatory data collection system (often referred to as "seed to sale"); (2) secure deposit-video verified 414; an individual access code (e.g., specified for individual depositors) is required to deposit material; at the time of deposit, either a video stream or still shot of the material will provide evidence of what is deposited; (3) eco-friendly destruction 416; after chemically destroying the compounds of interest (e.g., cannabinoids) the remaining liquid will be neutralized and the fibrous residue will not have any monetary value to the black market industry; resulting fibrous material is suitable for compost material; in contrast, traditional destruction by regulatory bodies such as DEA and other law enforcement may usually occur by destruction by incineration; burning the waste material may create an environmental hazard to wildlife and the general populous; (4) verification of destruction 418; verification of the destruction of waste materials is provided by third party (i.e., the disclosed waste disposal unit (e.g., "smart" container) owner); such verification is not entrusted to a cannabis businesses/owner that may have reason to not provide accurate and authentic records of destruction; (5) real time audit-quality reporting 420; an audit trail is established and maintained within the disclosed system and may be viewed remotely by the disclosed waste disposal unit (e.g., "smart" container) owner; (6) on demand removal and service 422; disclosed embodiments may provide a monthly subscription service including, for example, a single pick up/destruction of waste materials; If the disclosed waste disposal unit (e.g., "smart" container) reaches capacity (for example, as evidenced by internal triggering mechanism and alert (e.g., alarm notification)) prior to scheduled pickup/destruction, the waste disposal unit (e.g., "smart" container) owner will provide the demand removal service as needed; (7) fibrous residue re-use 424; compost, paper, textiles, alternative energy, novelty products; (8) nationwide service 426; disclosed embodiments may provide a service platform including, for example, the entire United States (including U.S. territories such as Guam, Puerto Rico, etc.); such services may extend to international service plans such as disclosed process extending services to Canada, Europe, Australia, Israel, and South America; (9) locked system on-site destruction 428; select embodiments provide that the disclosed waste disposal unit (e.g., "smart" container) is entirely closed until a successful access code is utilized to open the same; once the deposit tumbler of the disclosed waste disposal unit (e.g., "smart" container) is activated, the waste material is dropped and retraction of the waste materials is mechanically prohibited. Once the disclosed waste disposal unit (e.g., "smart" container) is closed, all access is locked except to the owner thereof and respective waste disposal unit service providers; waste disposal unit service providers require independent access codes to open and service the disclosed waste disposal unit (e.g., "smart" container). All destruction of the waste materials occurs within the disclosed locked waste disposal unit (e.g., "smart" container). Select embodiments are designed such that not even service providers can access raw deposited waste materials; furthermore, all servicing of waste materials disposed with the disclosed waste disposal unit (e.g., "smart" container) occurs at the leasee's location.

In comparison to conventional systems and processes 402, 404, 406, 408, and 410, many of the criteria 412, 414, 416, 418, 420, 422, 424, 426 and 428 are not available or are not fully addressed to the extend provided by disclosed system 300. Thus, conventional systems and processes 402, 404, 406, 408, and 410 are insufficient for addressing the immediate concerns.

In accordance with disclosed embodiments, the disclosed system is enabled to monitor select items including: (1) person accessing the disclosed locked unit (e.g., "smart" container) with purpose of disposing waste material; (2) time, date stamp of such access; (3) video feed and/or still shot (from interior of box) of material being deposited; (4) reconciliation of mass of material purported disposed by person depositing with tared and/or cumulative mass as record by internal scale; (5) date and time material is destroyed; (6) report of all of the above will be available from cloud storage to customers as well as box owner (me); (7) upon request, box owner will make this audit trail available to regulatory bodies either by electronic report transfer or by direct upload to state seed to sale monitoring system. The disclosed real time audit-quality reporting feature ensures that each deposit is specified by access code of the depositor, a photo of the material deposited, a reconciled accounting of reported mass being deposited with that of the internal scale. Disclosed embodiments provide that all details the aforementioned interaction(s) are date and time stamped and remotely available at any time after the user finalizes the transaction (by logging out and/or the repository door of the disclosed unit (e.g., "smart" container) is closed and locked).

Figure 5:
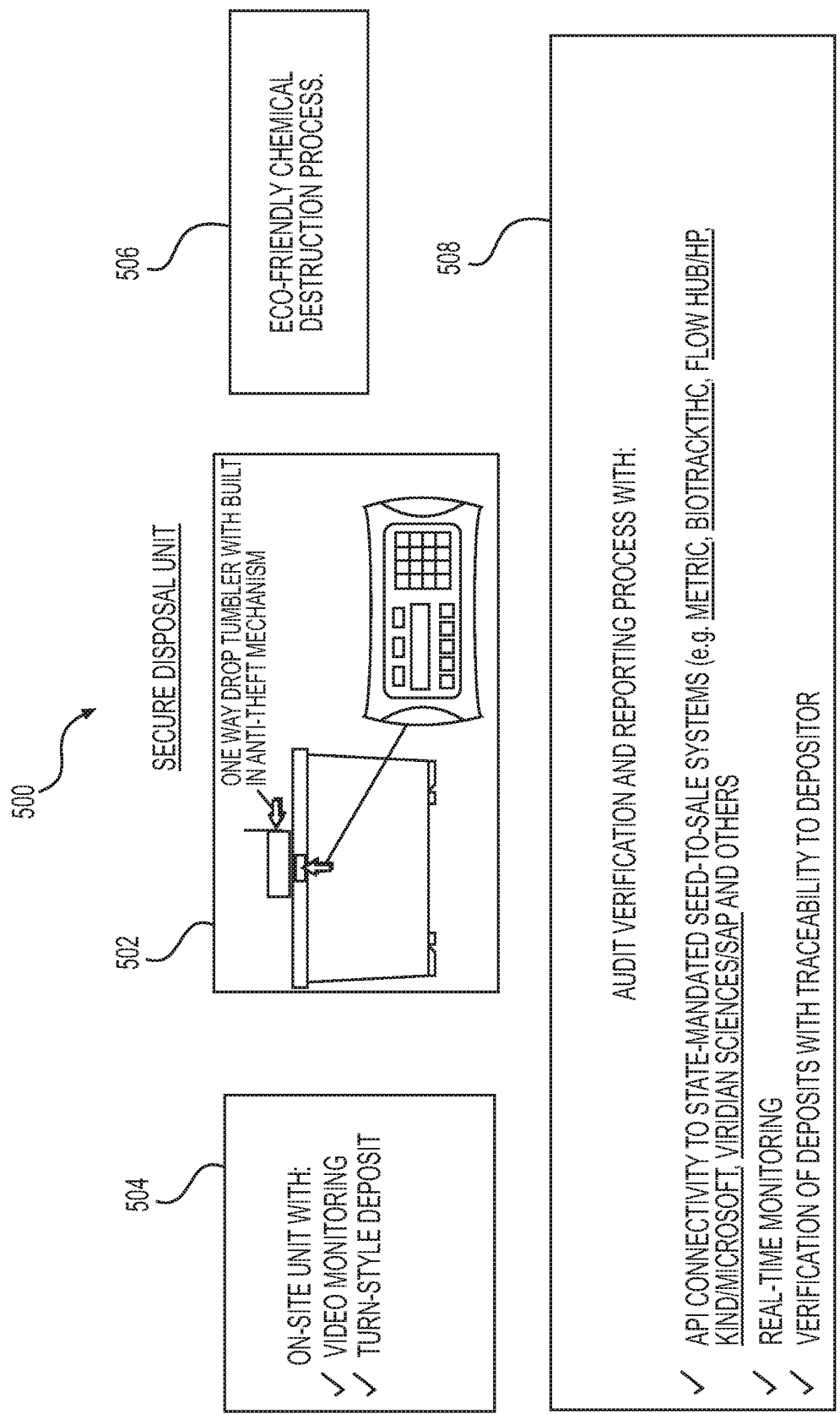
FIG. 5 illustrates components of the disclosed system for providing an unbroken chain of responsible and accountable waste disposal according to one embodiment of the present disclosure.

FIG. 5 illustrates components of the disclosed system 500 for providing an unbroken chain of responsible and accountable waste disposal according to one embodiment of the present disclosure. The disclosed system 500 may include a secured disposal unit 502 such as a waste container for collecting waste materials. Secured disposal unit 502 may include features and capabilities 504 to facilitate anti-tampering and security features. Such features may include video monitoring and a turn-style deposit mechanism for receiving waste materials. The aforementioned turn-style deposit mechanism may include a turn-style or tumbler that will receive waste material from the depositor, drop the waste material into secured disposal unit 502 then mechanically prohibit retrieval of the waste material from the same. Waste material within the secured disposal unit 502 may be collected and serviced for subsequent treatment such as via an eco-friendly chemical destruction process 506. Disclosed embodiments provide an audit verification and reporting process and system 508 that tracks waste product and operational personnel receiving and delivering waste product to secure disposal unit 502. Audit verification and reporting process and system 508 may also be configured to track waste product and operational personnel receiving waste product from secure disposal unit 502, for example, for subsequent processing of the waste product. Audit verification and reporting process and system 508 may also be configured to track waste product and operational personnel delivering waste product received from secure disposal unit 502, transported and delivered to a subsequent treatment center for subsequent processing.

In one embodiment, audit verification and reporting process and system 508 may be enabled to track waste material and denote the time of deposit, identify the depositor, identify and track the weight of deposit, reconcile the weight specified by the depositor and enable an internal scale of secure disposal unit 502 that is inaccessible to depositor. Any person specified by the owner of secure disposal unit 502 may be given an access code. Only an approved access code will open secure disposal unit 502 to permit deposit of waste materials. Audit verification and reporting process and system 508 may further enable date and time stamp of service by secure disposal unit 502 owner, contractor or personnel. Post destruction of waste materials, neutral liquid may be situated for non-hazardous waste disposal such as in a state sanctioned general repository; fiber residue may be (a) discarded as general yard waste (b) sold to or deposited to compost facilities (c) stored for resale to novelty, paper, textile, or other manufacturer(s). Embodiments of audit verification and reporting process and system 508 provide that raw material is tracked by mass (e.g., as reported by the depositor and by internal scale.) Any and all openings of secure disposal unit 502 require access codes. Disclosed embodiments provide that faulty codes will be recorded along with successful codes. Additional embodiments provide that internal electronics of secure disposal unit 502 will capture date, time, and identification of person(s) accessing the same.

Figure 6:
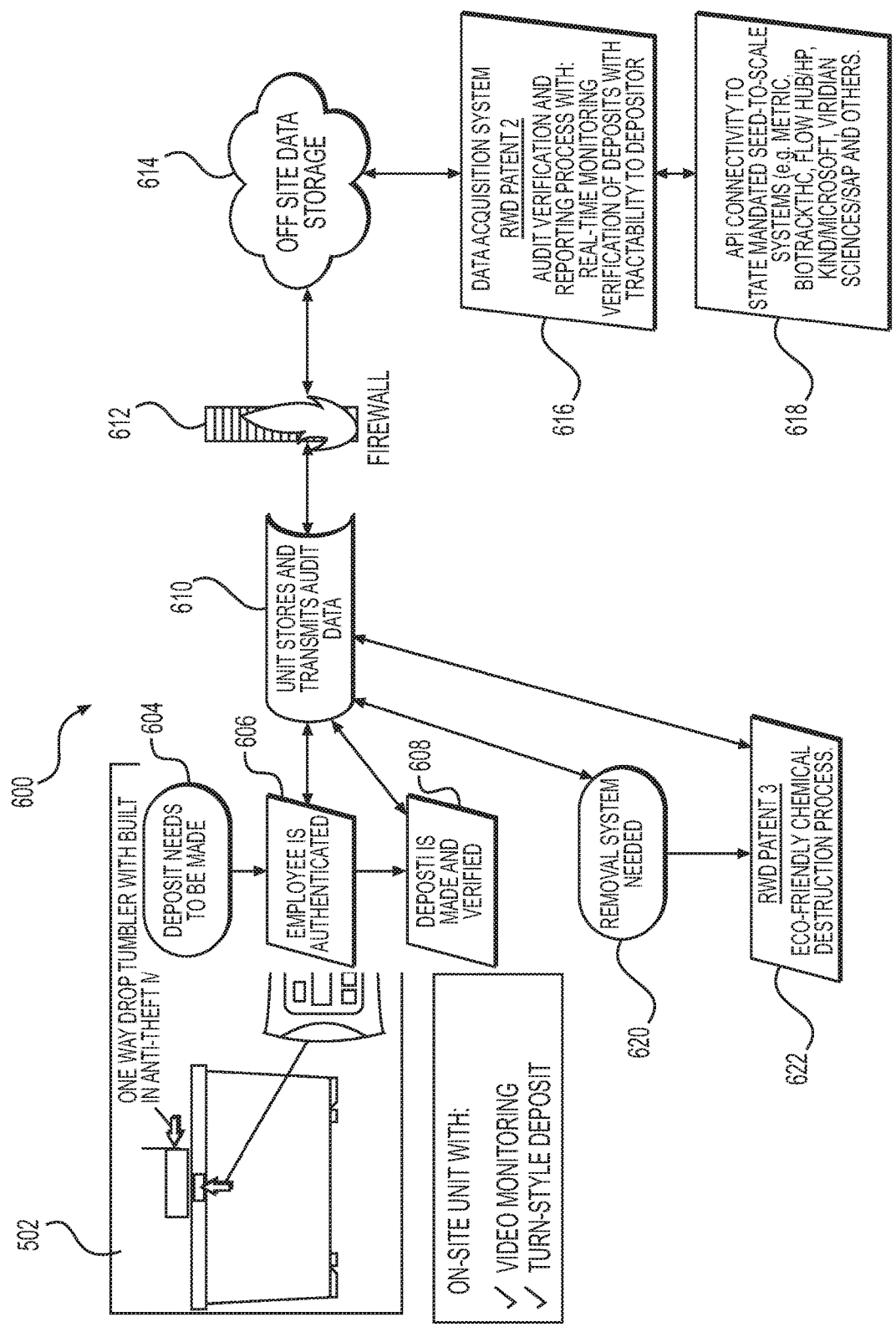
FIG. 6 illustrates further details of the disclosed system of FIG. 5 for providing an unbroken chain of responsible and accountable waste disposal according to one embodiment of the present disclosure.

Turning to FIG. 6, a schematic illustration is provided for the disclosed system 600 for providing secure collection, re-purposing and/or disposing disposal of waste products, including providing a chain-of-custody audit trail. Secure disposal unit 502 may be configured as a smart device, i.e., coupled and/or networked to numerous other electronic devices and systems for communicating data, providing security information, and/or security features such as surveillance and audit verification and reporting capability. In an exemplary configuration, a deposit is made 604 to secure disposal unit 502 wherein personnel such as an employee is authenticated 606. When the deposit of waste materials is made and verified 608, secure disposal unit 502 may store and transmit audit data 610. In a disclosed embodiment, audit data 610 may include, at least: (1) specific identification of person depositing waste; (2) report of the depositor as to the nature (matrix) and weight of the mass; (3) photo or video of material at time of deposit; (4) synchronization or reconciliation of deposit matrix and weight with to that of the photo/video and internal scale; (5) closure of the unit/locked down; (6) service personnel access; (7) destruction specifics including chemicals used, final pH of resulting liquid; and (8) date and time stamp for each of the aforementioned.

Disclosed system 600 may provide a firewall 612 as part of its cyber-security component. Off-site data storage 614 may be utilized as part of disclosed system 600. A data acquisition system 616 may be provided for the audit verification and reporting process. Audit verification and reporting process may include such features as real-time monitoring, verification of deposits with tractability to the depositor. An API component 618 may be implemented within the disclosed system 600 to provide connectivity to state mandated seed-to-sale systems (e.g., METRC, BioTrackTHC, Flow HUB/HP, Kind/Microsoft, Viridian Sciences/SAP, LEAF and others). When secure disposal unit 502 indicates removal of waste from the system is required 620, disclosed embodiments provide eco-friendly chemical destruction process 622 of the waste material. Thus, according to an exemplary embodiment, treated waste material will be non-hazardous and non-active cannabis waste. In one embodiment, neutralized waste products (liquid and fiber) will be removed from the system into holding tanks on service trucks and deposited in landfill, compost facilities, and/or storage facility.

Figure 7:
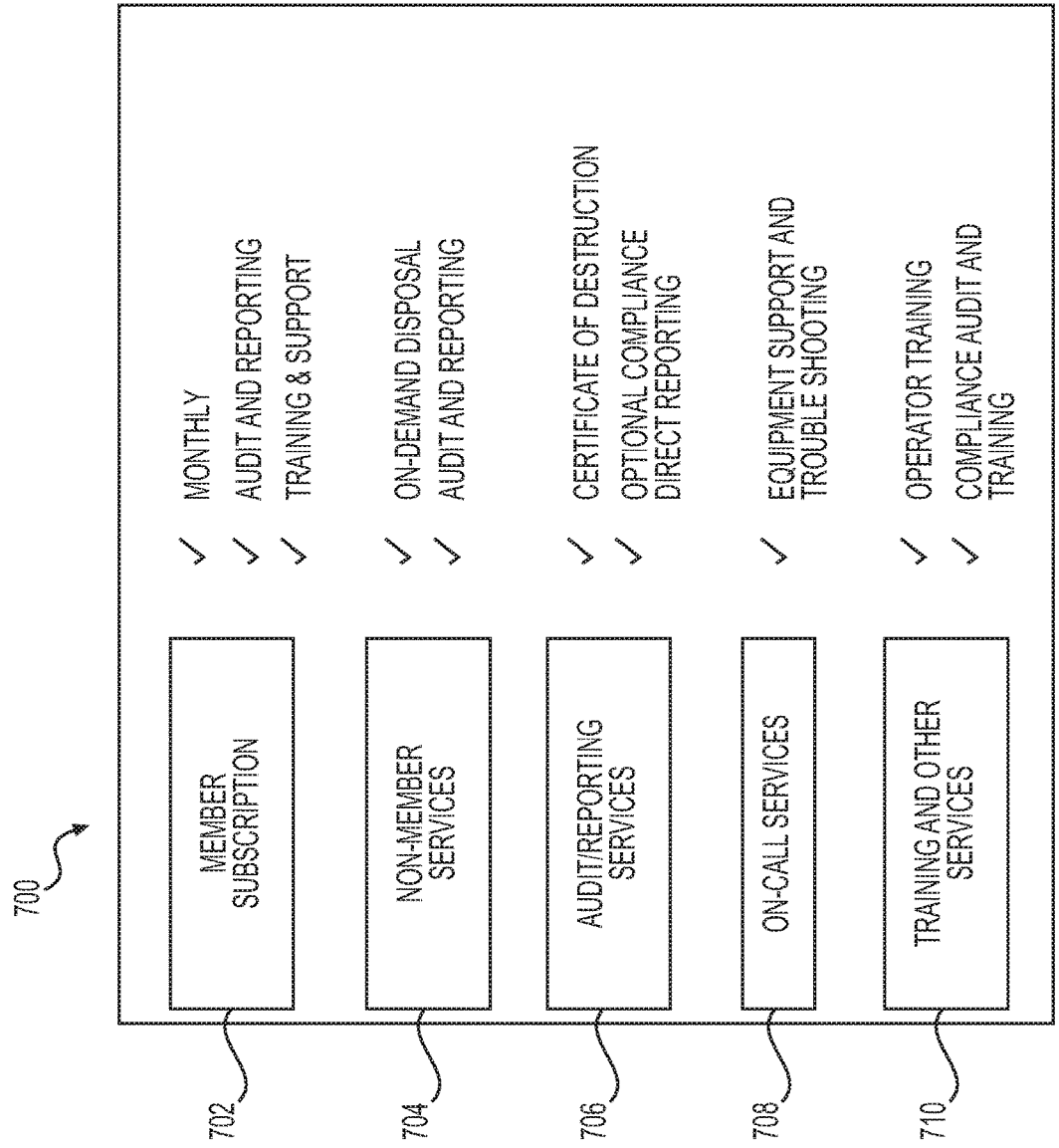
FIG. 7 illustrates exemplary value added services provided by the disclosed system for providing an unbroken chain of responsible and accountable waste disposal according to one embodiment of the present disclosure.

Value added services of the disclosed system 600 for providing secure collection, re-purposing and/or disposing disposal of waste products, including providing a chain-of-custody audit trail is outlined in FIG. 7. Such services may include member subscription 702, non-member services 704, audit/reporting services 706, on-call services 708 and training and other services 710. Advantages of member subscription 702 include monthly audit and reporting, training, and support. Non-member services 704 includes on-demand disposal of waste product and audit and reporting features. Disclosed audit/reporting services 706 provides certificate of destruction of waste product, optional compliance, and direct reporting. Thus, when compliance to a regulatory body is required or requested, the owner of secure disposal unit 502 will provide an audit of secure disposal unit 502 transactions. This report will be conducted directly from secure disposal unit 502 to the regulatory body and may or may not require facilitation by the owner of secure disposal unit 502 or authorized personnel. On-call services 708 include equipment support and trouble-shooting amenities. Training and other services may include operator training and compliance audit and training.

Figure 8:
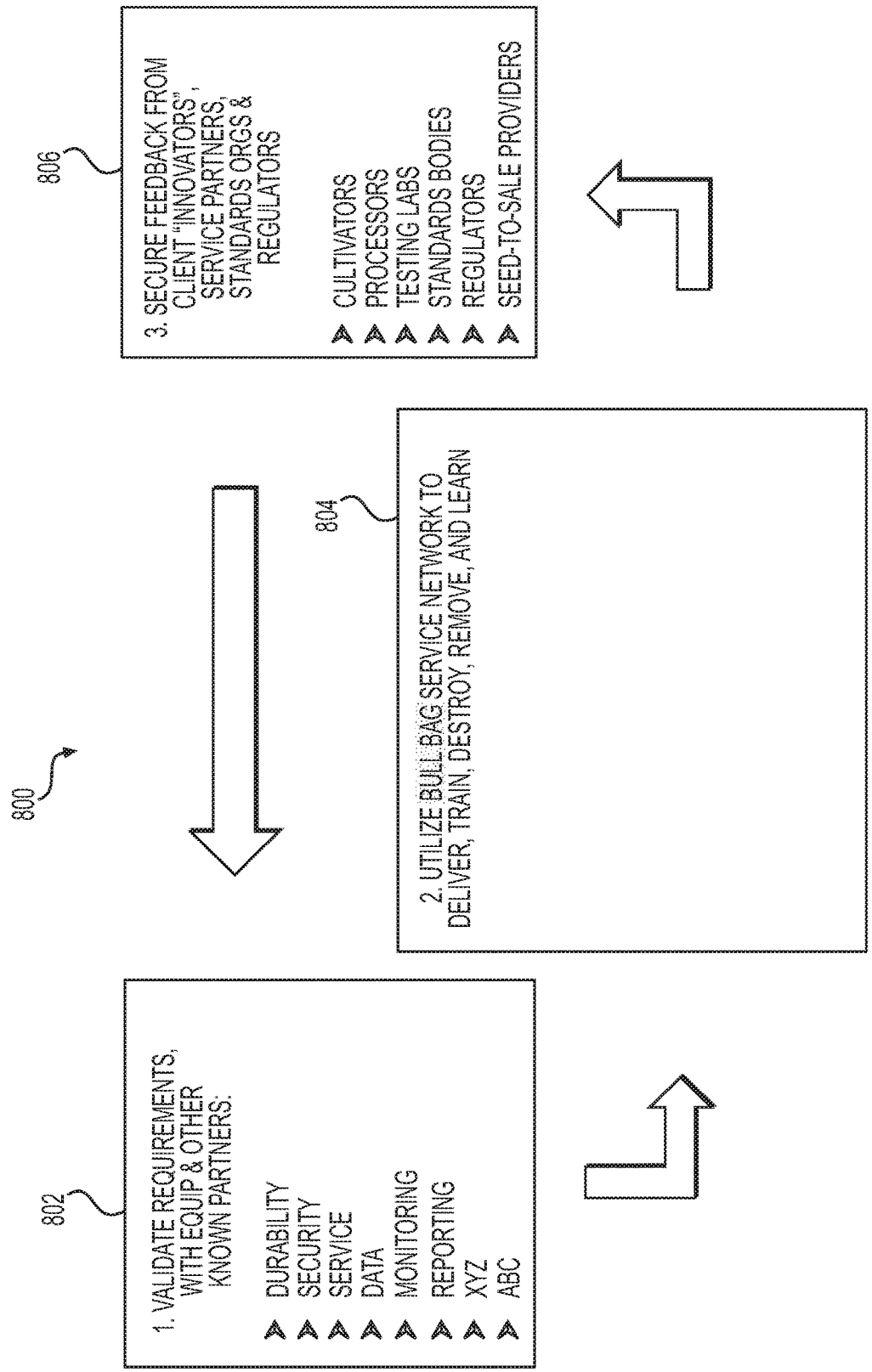
FIG. 8 provides an overview of the disclosed system implemented by a vendor to service users according to one embodiment of the present disclosure.
Figure 9:
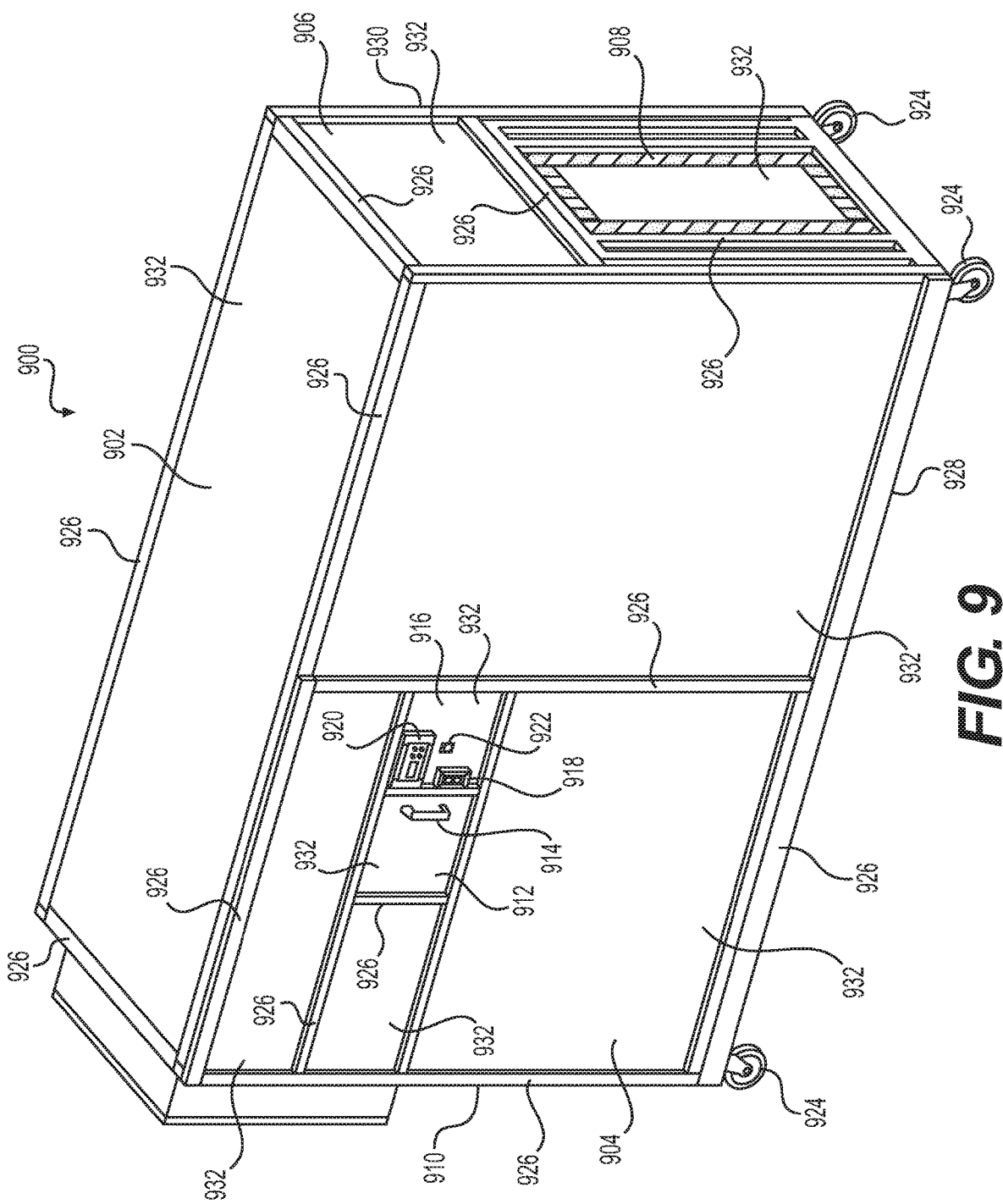
FIG. 9 illustrates a first perspective view of a self-contained smart waste machine according to one embodiment of the present disclosure.
Figure 10:
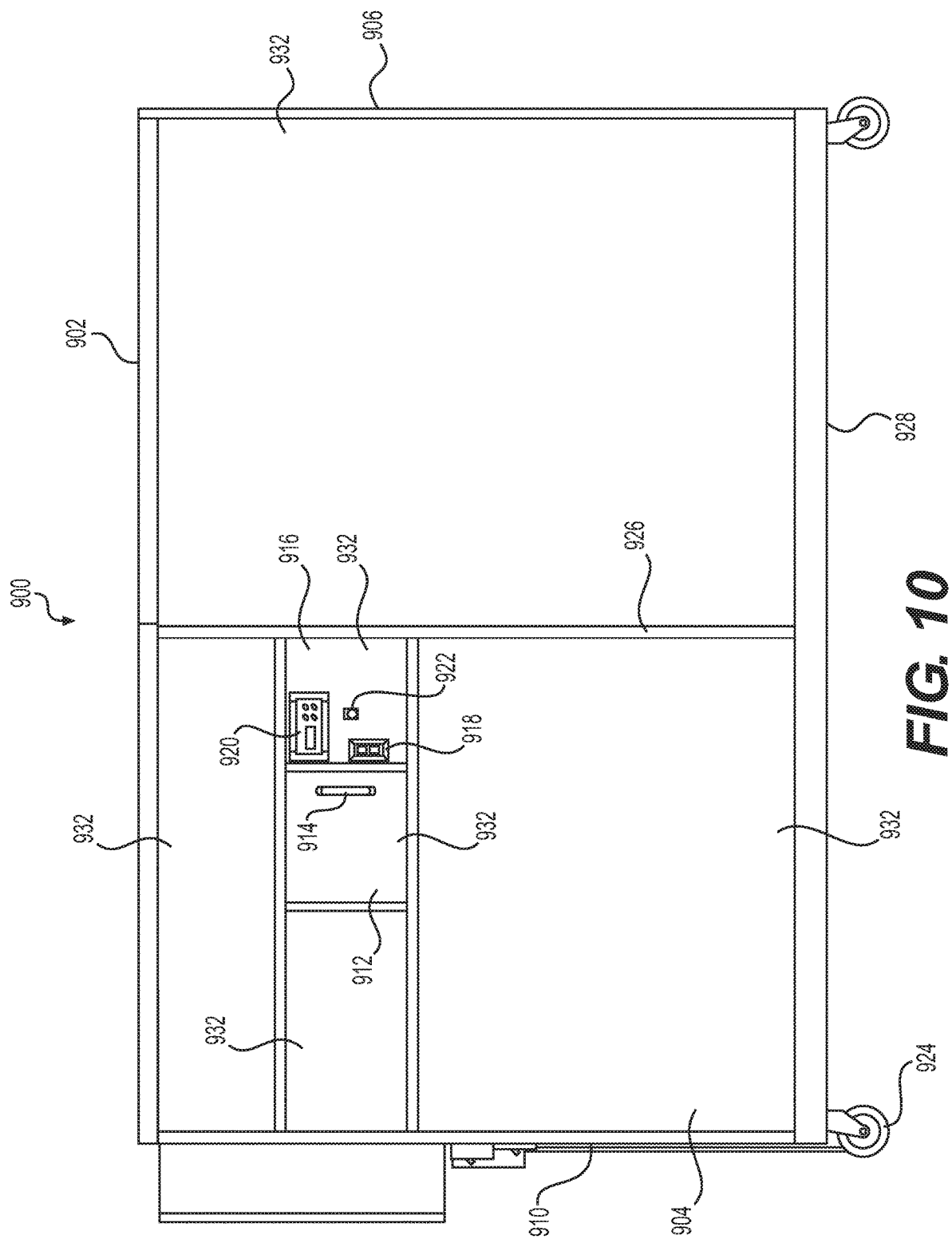
FIG. 10 illustrates a front view of the self-contained smart waste machine of FIG. 9 according to one embodiment of the present disclosure.

In this manner, the disclosed system 600 enables a strategy 800 for building with trusted experts as illustrated, for example, in FIG. 8. Providing validation requirements 802 with equipment and other known partners facilitates establishing: durability, security, service, data monitoring, reporting, XYZ, ABC. A prescribed service network 804 may be utilized as part of the disclosed system 600 to: deliver accountability and assurance of meeting requirements; training service personnel with technical skill to process and remove destroyed waste products, destroy unwanted/unused waste materials in a manner that precludes sale to black market and prohibits theft by community/non-cannabis business personnel such as by "trash-diving;" learning more about potential uses of the residual products—fibrous material, etc. as well as learning alternate mechanisms of chemical destruction such as denaturing by ultraviolet rays. Additional advantages of disclosed system 600 include capability for secure feedback 806 from client "innovators," service partners, standards organizations and regulators. These non-limiting entities may include cultivators, processors, testing labs, standards bodies, regulators and seed-to-sale providers.

In one disclosed configuration, machine 900 may comprise a formation including a top side 902, front side 904, right side 906, left side 910, bottom side 928, and rear side 930. It is noted that certain sides of machine 900 may incorporate additional components and/or features. For example right side 906 may comprise a sealable/lockable toter access door 908 for accessing an interior of machine 900. In one disclosed embodiment, access door 908 may be configured with a hinged connection to machine 900 such that it may swing downwardly from the frame structure of machine 900 thereof (e.g., see FIGS. 32 and 33). It is readily appreciated that any appropriate alternate connection means may be utilized for attaching access door 908 to machine 900.

Panels 932 may be utilized form top side 902, front side 904, right side 906, left side 910, bottom side 928, and rear side 930 of machine 900. Panels 932 may also be considered as paneling or panel sections. In addition, panels 932 may serve to encase internal components of machine 900. In some disclosed embodiments, panels 932 comprise stainless steel having a prescribed thickness for providing rigidity, protection from foreign contaminants and security against unwanted access and/or breaches to within the interior structure of machine 900. Framing supports 926 may be provided to appropriately frame machine 900 and provide strength and support to the same. Framing supports 926 may include steel materials. Thus, in a final assembly panels 932 and framing supports 926 may be securely fitted together to form an exterior structure of machine 900, for example, thereby forming top side 902, front side 904, right side 906, left side 910, bottom side 928, and rear side 930 of machine 900. Examples of attaching panels 932 with framing supports 926 may include welding, fasteners, bolts, nuts, adhesives, interlocks or other appropriate connection techniques for securely attaching the aforementioned components together. In a preferred technique, the resulting exterior structure of machine 900 is rigidly sealed and secured together. Casters 924 may be provided and mounted such as to the bottom of machine 900 via framing supports 926 to provide mobility to machine 900.

Thus, in one disclosed embodiment, machine 900 may have an overall dimension of approximately 97L×77H×32 W (measurement in inches) and a weight of approximately 1250 lbs. Framing supports 926 may comprise 2×2 (inch) 0.08 Carbon Steel and 1×1 (inch) 0.60 Carbon Steel components. Panels 932 serving as an exterior skin may comprise Carbon Steel 0.04. The finish of machine 900 may include a single stage PPG Automotive Urethane (Baked).

In an exemplary configuration, front side 904 may include a repository access door 912 having a handle 914 attached thereto. In one disclosed configuration repository access door 912 includes approximately a 12×12 inch material access door. In one disclosed embodiment, control panel area 916 may include a number of switches/buttons and/or display panel for operating machine 900. Such switches/buttons may include, for example, cycle start and stop button 918 and cycle run button 922. Cycle start and stop button 918 may be configured with two separate control buttons. For example, one button may be specifically configured to allow machine 900 to "start" while the other button may be specifically configured to allow machine 900 to "stop" such as when either one of the respective "start" or "stop" buttons is depressed. Additional controls may include control and display panel 920, such as for generating and confirming scale information, malfunctions and other alerts.

Figure 11:
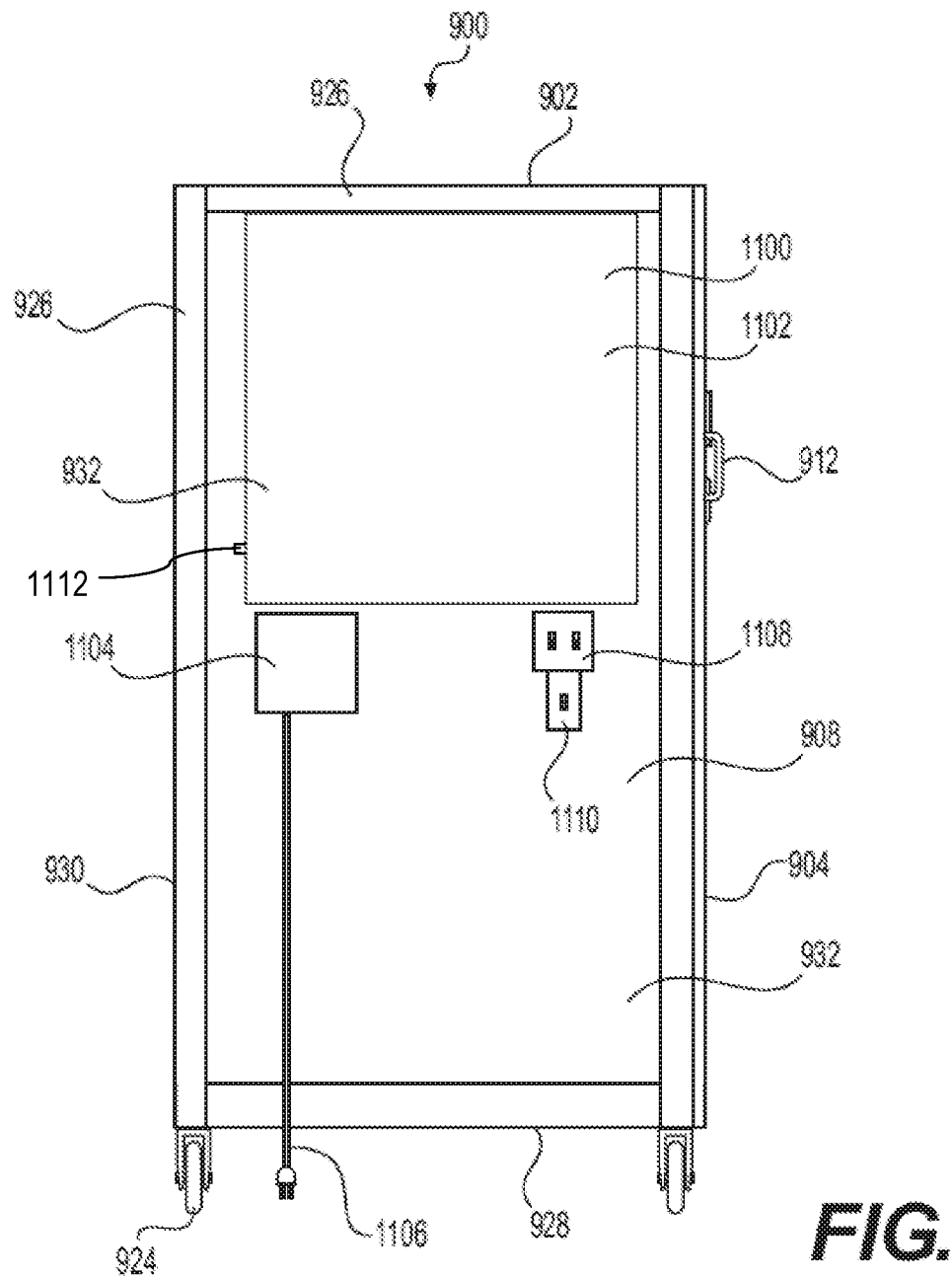
FIG. 11 illustrates a left side view of the self-contained smart waste machine of FIG. 9 according to one embodiment of the present disclosure.
Figure 12:
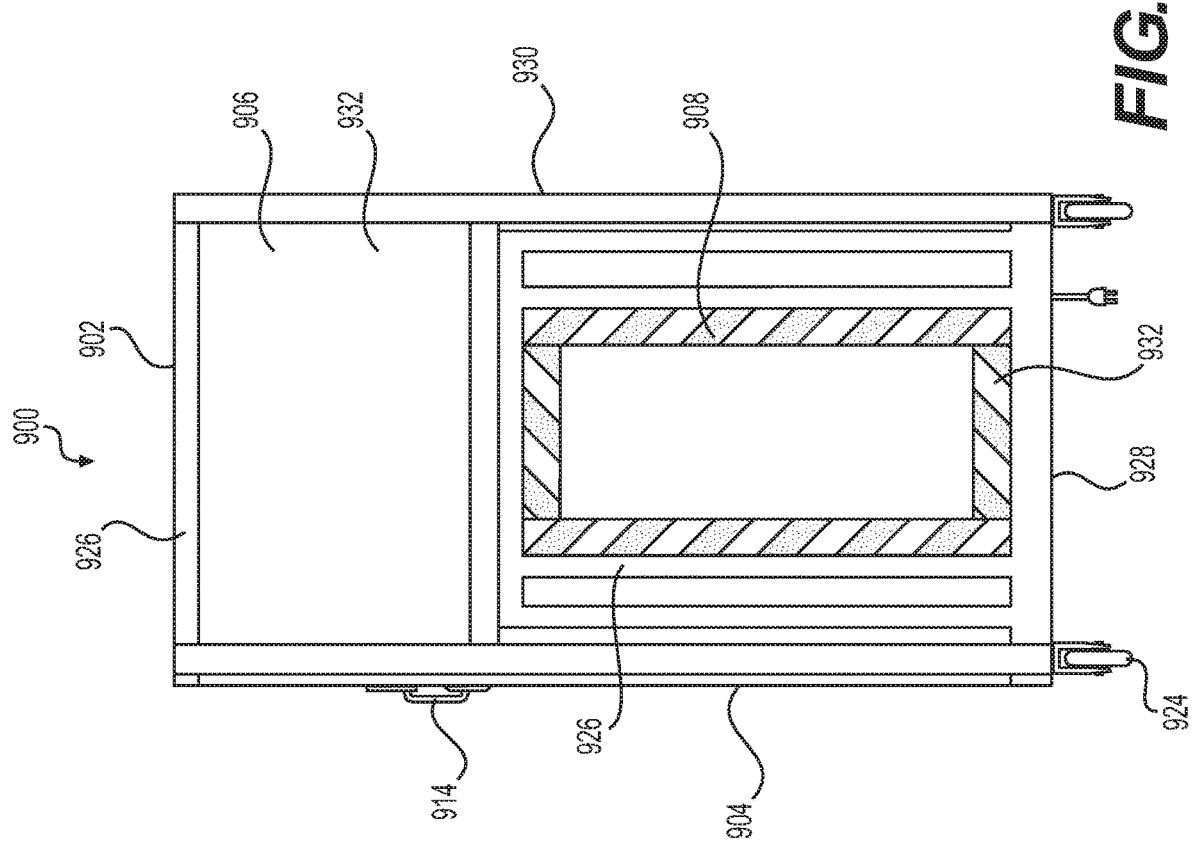
FIG. 12 illustrates a right side view of the self-contained smart waste machine of FIG. 9 according to one embodiment of the present disclosure.
Figure 15:
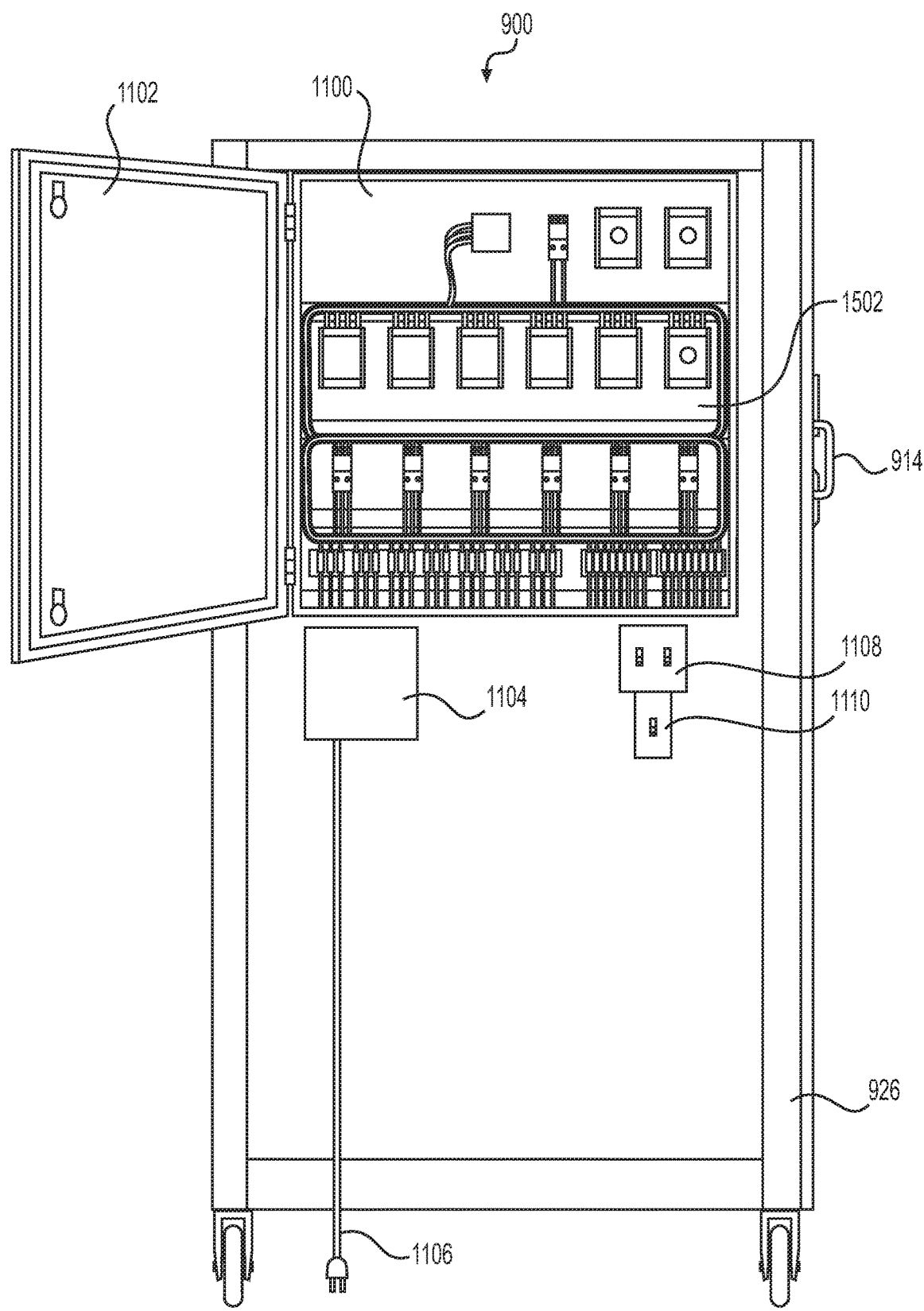
FIG. 15 illustrates the left side view of the self-contained smart waste machine of FIG. 11 with an opened electrical access panel according to one embodiment of the present disclosure.
Figure 16:
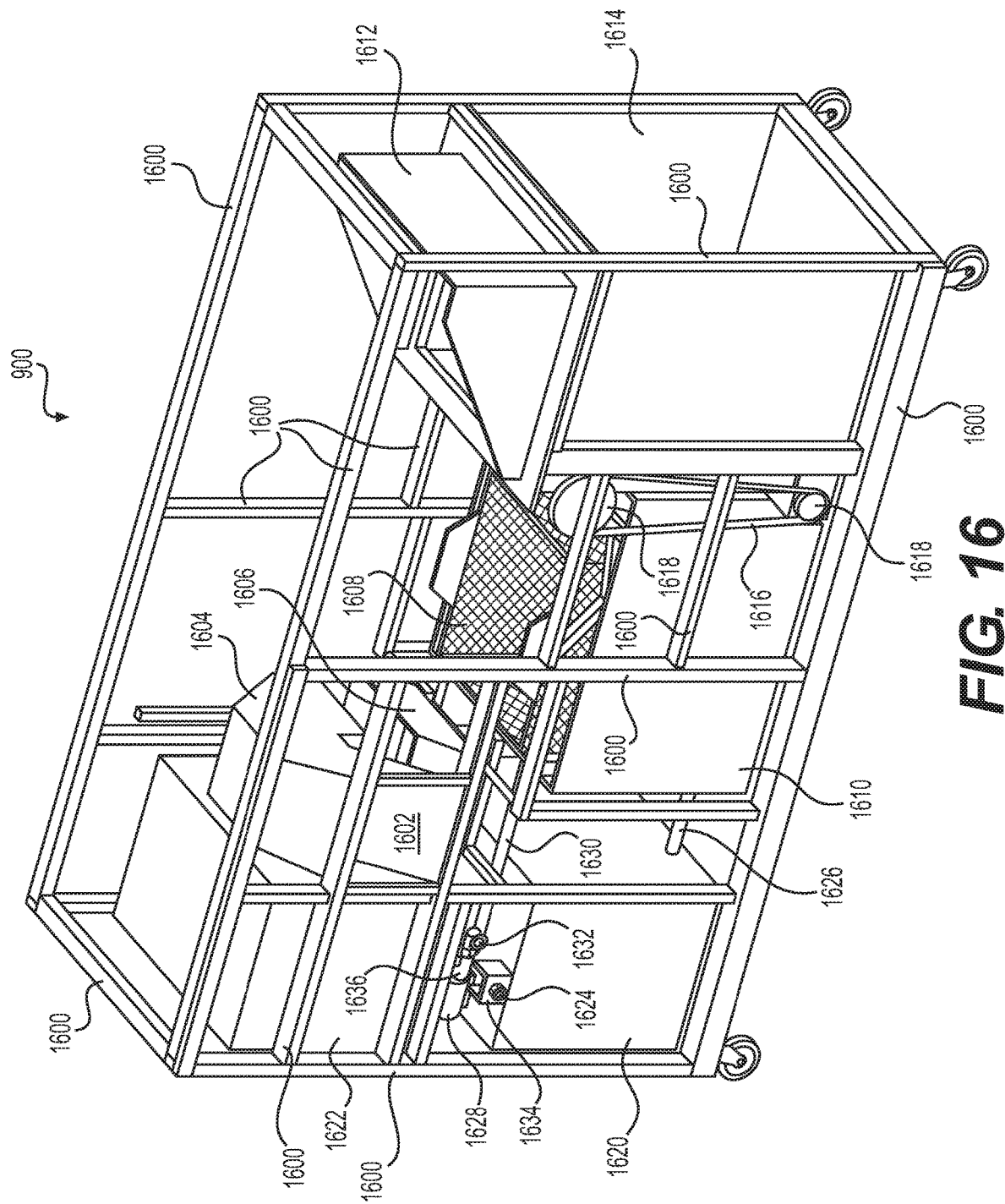
FIG. 16 illustrates a perspective view of an interior configuration and components of the self-contained smart waste machine of FIG. 9 according to one embodiment of the present disclosure.
Figure 17:
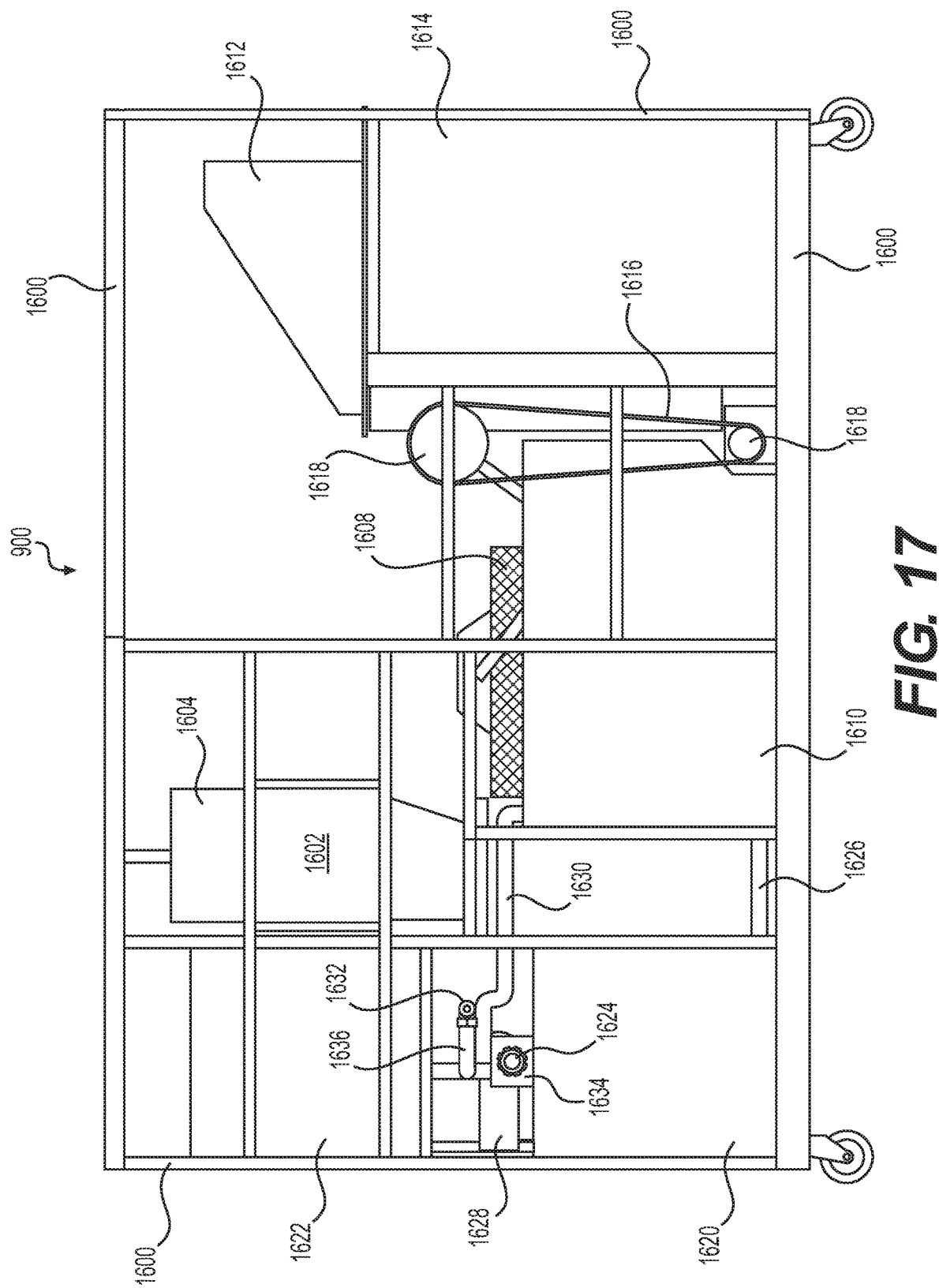
FIG. 17 illustrates a front view the interior configuration and components of the self-contained smart waste machine of FIG. 16 according to one embodiment of the present disclosure.
Figure 34:
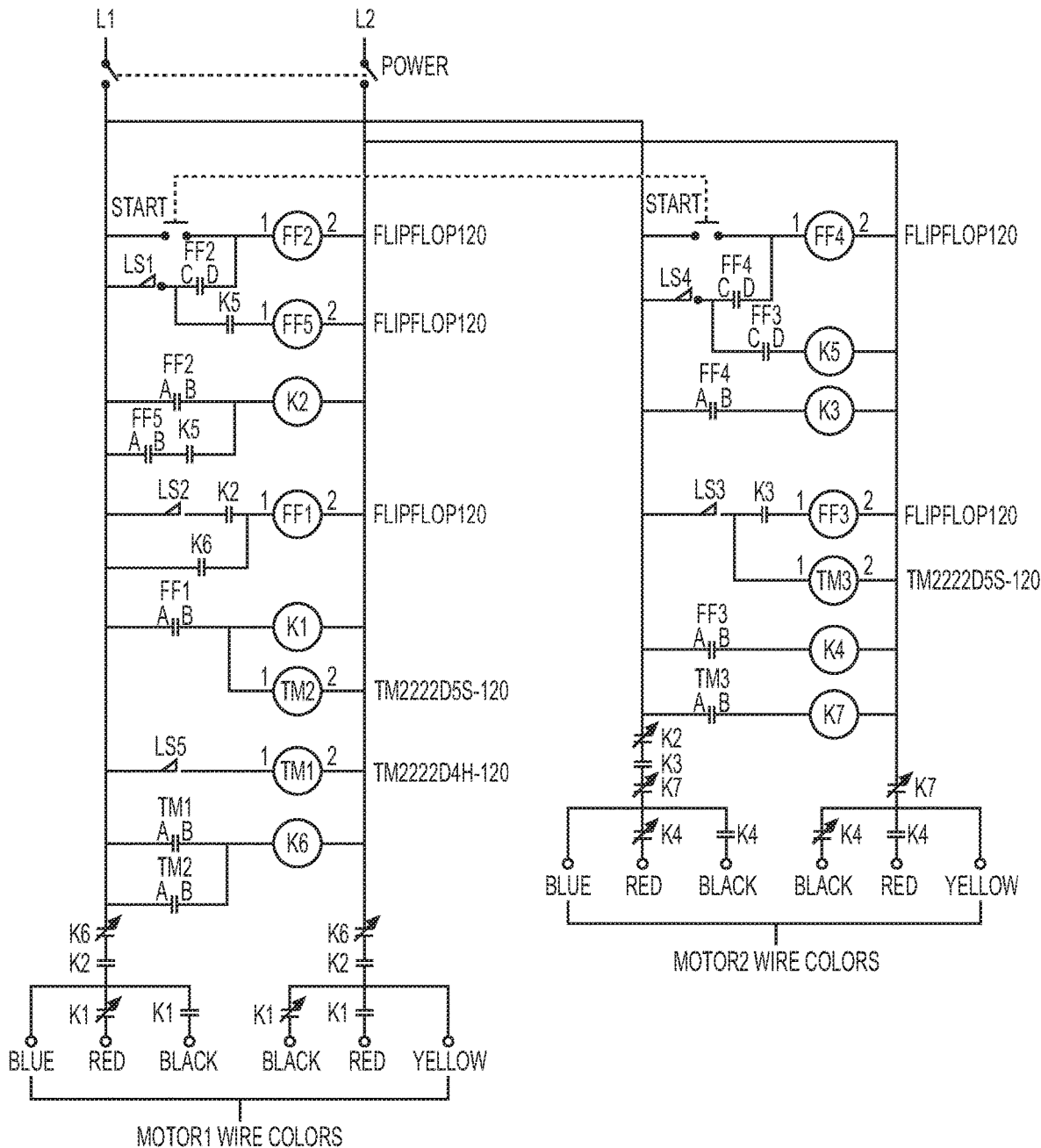
FIG. 34 illustrates an exemplary ladder diagram of the electrical configuration of the disclosed self-contained smart waste machine according to one embodiment of the present disclosure.

Turning to FIG. 11, a control panel 1100 is configured to machine 900 having a lockable control panel access door 1102. When control panel access door 1102 is opened (see FIG. 15), the internal electronic components 1502 are easily accessible within control panel access door 1102. Control panel 1100 and control panel access door 1102 serve to house, for example, most internal electronic components 1502 and protects them from damage and water. In general, machine 900 may be electrically wired via relay logic including a plurality of switches wherein enablement of switches triggers respective enablement of corresponding components. In one disclosed embodiment, the electrical wiring of machine 900 may be in accordance with the circuit ladder diagram, for example, as provided in FIG. 34.

A main power switch 1112 is electrically connected to control panel 1100 and serves as the main on/off switch for the entire machine 900 (including every component of machine 900). An electrical connector cord 1106 is supplied from a main power supply 1104 and may be connected to a standard electrical connection to provide power to machine 900. Ideally, machine 900 may operate under a 120V/15 A load. Separate electronic control switches, such as first electronic control switch 1110 and second electronic control switches 1108, may be coupled to control panel 1100 and configured to operate additional equipment of machine 900 as discussed below.

FIGS. 16-21 illustrate multiple views of an interior configuration and components of machine 900 according to one embodiment of the present disclosure. With panels 932 removed from the top, front, left, right, and rear sides of machine 900, all of the internal components of machine 900 may be configured and supported on the bottom of machine 900, to one another, as necessary, and to framing structure 1600. A non-retrievable chute 1604 may be generally mounted to one side of the interior of machine 900. Non-retrievable chute is regarded as a security hopper for preventing accessibility to contents placed through the chute as described below. Non-retrievable chute 1604 may include an entrance access area 1602 disposed at a level for a user to access entrance access area 1602 from the outside of machine 900. A first receiving bin 1606 is configured to receive contents from non-retrievable chute 1604. First receiving bin 1606 may be regarded as a scale basket. In one disclosed embodiment, first receiving bin 1606 may include a scale or be configured as a scale for determining a weighed measurement of contents received therein. In another embodiment, a scale may be directly integrated into first receiving bin 1606. An exemplary scale employed herein may comprise an ADAM Lab Inspection Scale (2 g-6 kg). The scale basket may comprise 0.04 Stainless Steel.

In one disclosed embodiment, first receiving bin 1606 is configured into motion via a series of electronics and machinery including, for example, one or more gears 1618 and pulleys 1616 system for manipulating first receiving bin 1606 to rotate and flip in a prescribed direction internally within machine 900. One or more appropriately sized and configured arms or levers may be utilized to generate movement of first receiving bin 1606 to generate moving such as raising and lowering first receiving bin 1606 or producing horizontal and/or rotational movement. Other appropriate electronics equipment including, for example, electrical connectors, one or more motors or actuators and controllers may be employed to facilitate movement of first receiving bin 1606 to receive material, weigh the material, rotate and flip the contents within first receiving bin 1606 and return first receiving bin 1606 to a home position disposed below non-retrievable chute 1604. One or more motors to drive movement of first receiving bin 1606 may include, for example, Dayton Gear Motor ¼ hp, 1115v, 4a, 5.4 rpm, 315/1 ratio, Disc Brake.

Figure 31:
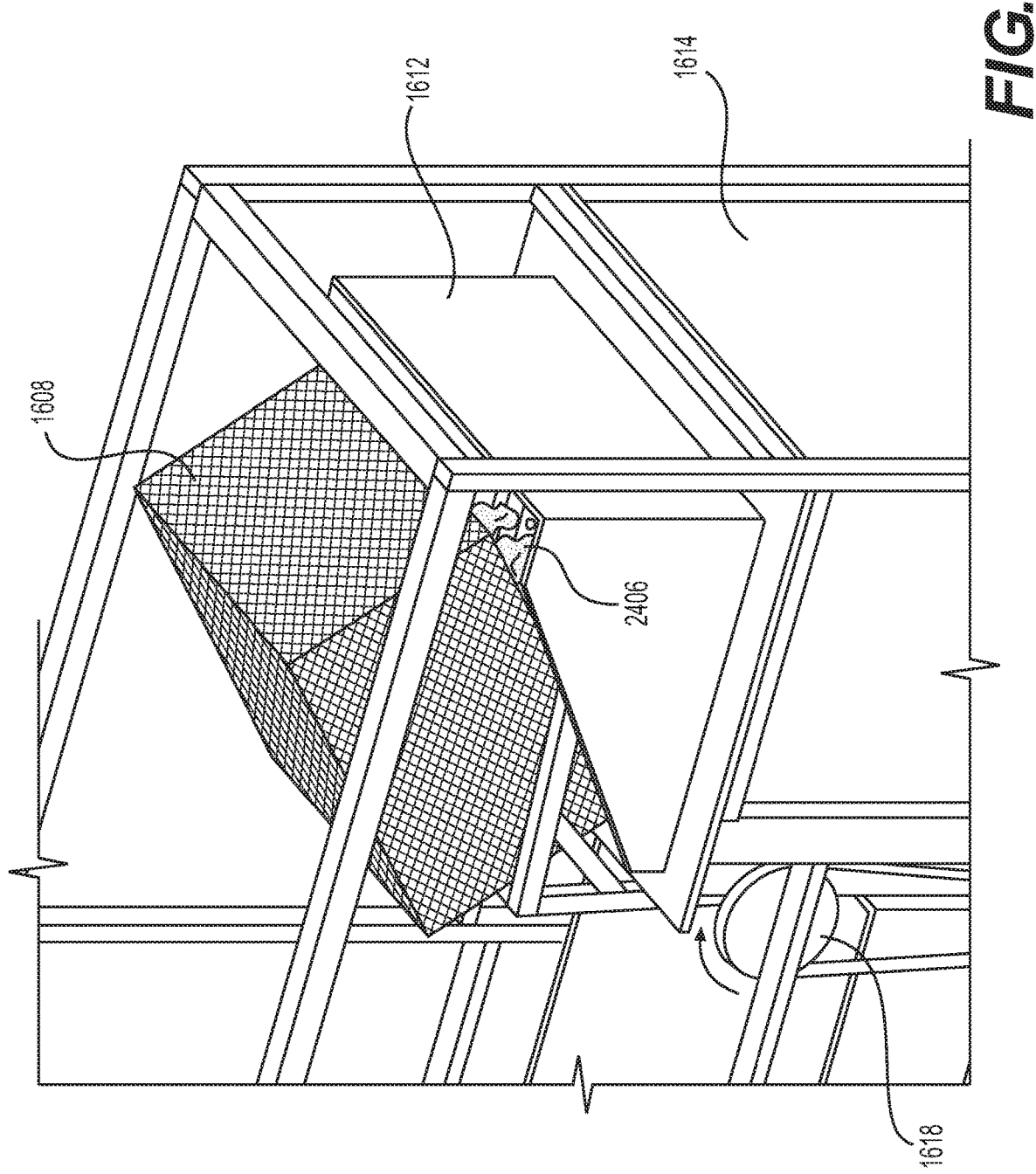
FIG. 31 illustrates the transfer of green waste material into a toter of the disclosed self-contained smart waste machine to a processing bin according to one embodiment of the present disclosure.

Disclosed embodiments may also include a second receiving bin 1608 mounted internally within machine 900 in proximity to first receiving bin 1606. In a select embodiment, second receiving bin 1608 comprises a mesh drip basket comprising, for example, Mesh Carbon Steel. In some embodiments, the mesh drip basket may comprise drip basket arms comprising 1×1 (0.12) Carbon Steel. Second receiving bin 1608 is configured to receive material from first receiving bin 1606 such as when first receiving bin 1606 is actuated to rotate and flip its contents into second receiving bin 1608. Second receiving bin 1608 may be configured into motion via a series of electronics and machinery including, for example, one or more gears 1618 and pulleys 1616 system for manipulating second receiving bin 1608 to rotate and flip in a prescribed direction internally within machine 900. One or more appropriately sized and configured arms or levers may be utilized to generate movement of second receiving bin 1608 to generate moving such as raising and lowering second receiving bin 1608 or producing horizontal and/or rotational movement. Other appropriate electronics equipment including, for example, electrical connectors, one or more motors or actuators and controllers may be employed to facilitate movement of second receiving bin 1608 to receive material, rotate and flip the contents into a toter 3200 (FIGS. 31 and 32) (as described below) and return to a home position such as being disposed at a location above a first holding tank or processing holding tank 1610. One or more motors to drive movement of second receiving bin 1608 may include, for example, Dayton Gear Motor ¼ hp, 1115v, 4a, 5.4 rpm, 315/1 ratio, Disc Brake.

A toter shield 1612 may be configured above a toter access area 1614 internal to machine 900. Toter shield 1612 provides protection and guidance of the contents within receiving bin 1608 into toter 3200 as receiving bin 1608 is flipped into position to transfer contents as described below.

In one disclosed embodiment, second receiving bin 1608 is configured to lower into processing holding tank 1610. Processing holding tank 1610 may comprise 0.09 stainless steel and be configured as a stainless steel bin dimensioned to hold, for example, at least 42 gallons. A second holding tank or supply holding tank 1620 is connected to supply a processing fluid 2700 (e.g., see FIG. 27) to processing holding tank 1610 such as via a first fluid connection or first fluid connection 1626 such as a conduit. A third holding tank or discharge holding tank 1622 is further connected to receive processing fluid 2700 from processing holding tank 1610 such as via a second fluid connection or second fluid connection 1630 such as a conduit. In one disclosed embodiment, discharge holding tank 1622 may be regarded as a grey waste bin. Additionally, supply holding tank 1620 and discharge holding tank 1622 may be dimensionally identical 42 gallon poly holding tanks in an exemplary embodiment.

An inlet connection fitting 1624 for an inlet connection 1634 of supply holding tank 1620 is provided to supply processing fluid 2700 into supply holding tank 1620. Inlet connection fitting 1624 may be appropriately dimensioned to connect to a standard garden hose. A first pump or processing fluid supply pump 1628 may be configured to supply a processing fluid 2700 to processing holding tank 1610 such as via a plurality of fluid connections or conduit connections. In one disclosed embodiment, supply pump 1628 may comprise a Baco Model FL4 40a Diaphram Pump, 115v, 4.5 Gpm or other appropriate pump for supplying processing fluid 2700 into a supply holding tank 1620 of the present disclosure.

A second pump or retrieval pump 1902 may be configured to pump used or contaminated processing fluid 2700 from processing holding tank 1610 to discharge holding tank 1622 such as via a plurality of fluid connections or conduit connections. Retrieval pump 1902 may be considered as a contaminated or used chemical tank pump. In a disclosed embodiment, retrieval pump 1902 may comprise an Everbuilt ⅒ hp, 115v, 360 Gph or other appropriate pump for pumping contaminated processed fluid into a discharge holding tank 1622 of the present disclosure.

An outlet connection fitting 1632 for an outlet connection 1636 of discharge holding tank 1622 is provided to discharge used processing fluid 2700 from discharge holding tank 1622. Outlet connection fitting 1632 may be appropriately dimensioned to connect to a standard garden hose. A third pump or discharge pump 1904 may be configured to discharge holding tank 1622 to discharge used or contaminated processing fluid from discharge holding tank 1622 through outlet connection 1636 such as via a plurality of fluid connections or conduit connections. In a disclosed embodiment, discharge pump 1904 may comprise Sumpmarine Transfer Pump 115v, 330 Gph or other appropriate pump for pumping used or contaminated processed fluid from a discharge holding tank 1622 of the present disclosure.

It is readily appreciated that fluid supply pump 1628, retrieval pump 1902, and discharge pump 1904 may be electrically connected and enabled to active the aforementioned respective pumps individually by a respective one of first electronic control switch 1110 or second electronic control switches 1108 as further described below.

Figure 18:
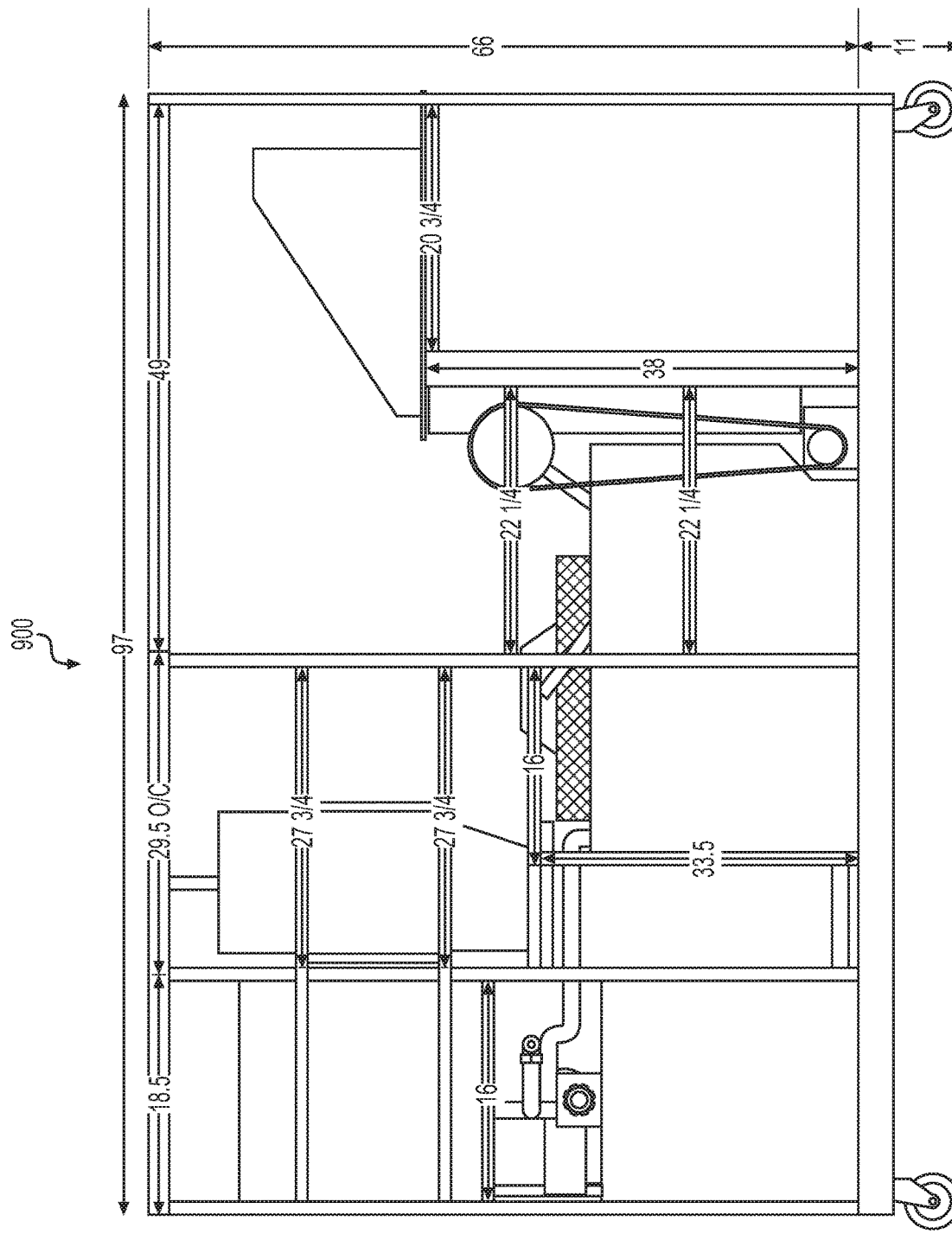
FIG. 18 illustrates exemplary dimensions of the self-contained smart waste machine of FIG. 16 according to one embodiment of the present disclosure.
Figure 19:
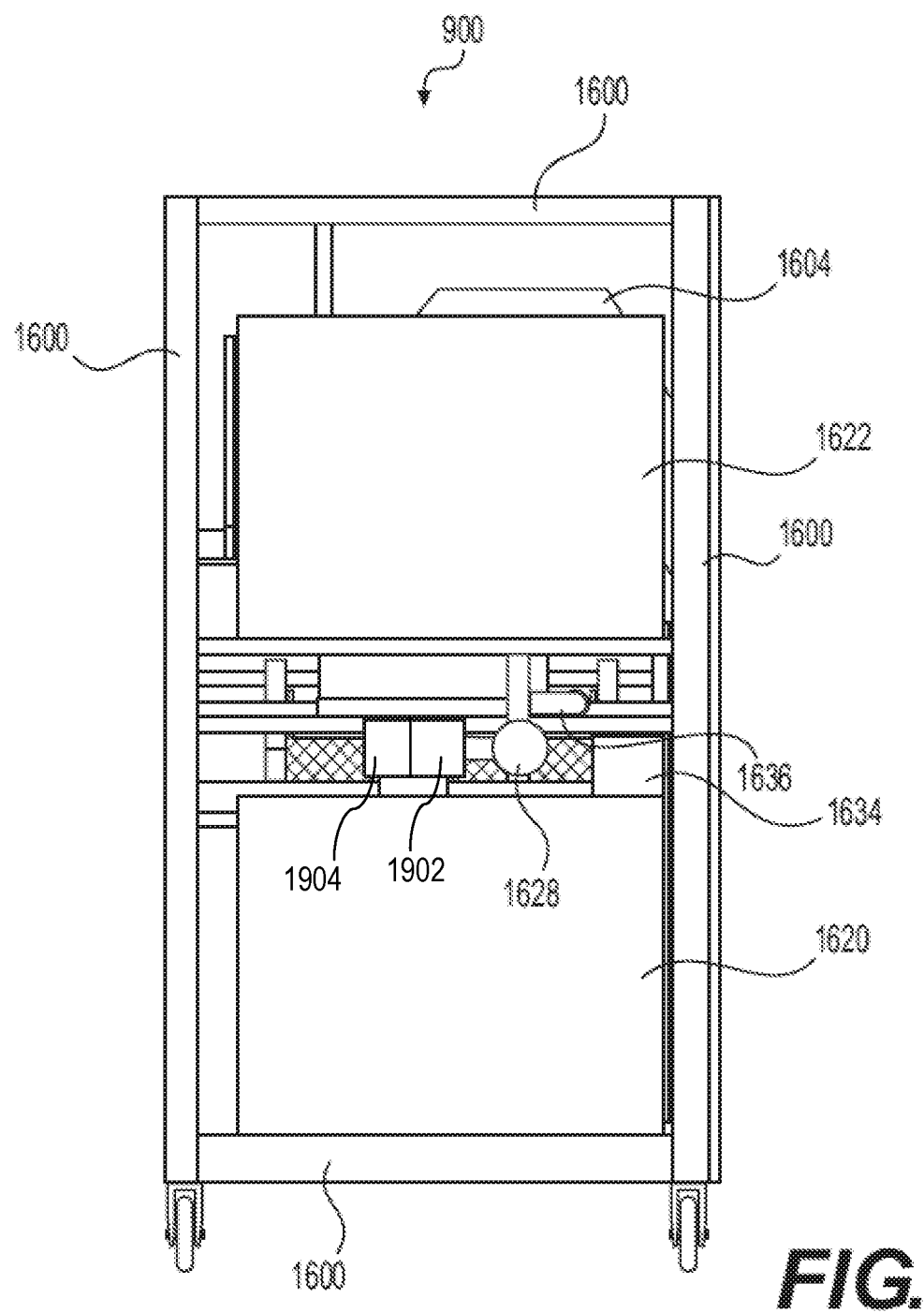
FIG. 19 illustrates an interior left side view of the interior configuration and components of the self-contained smart waste machine of FIG. 16 according to one embodiment of the present disclosure.
Figure 20:
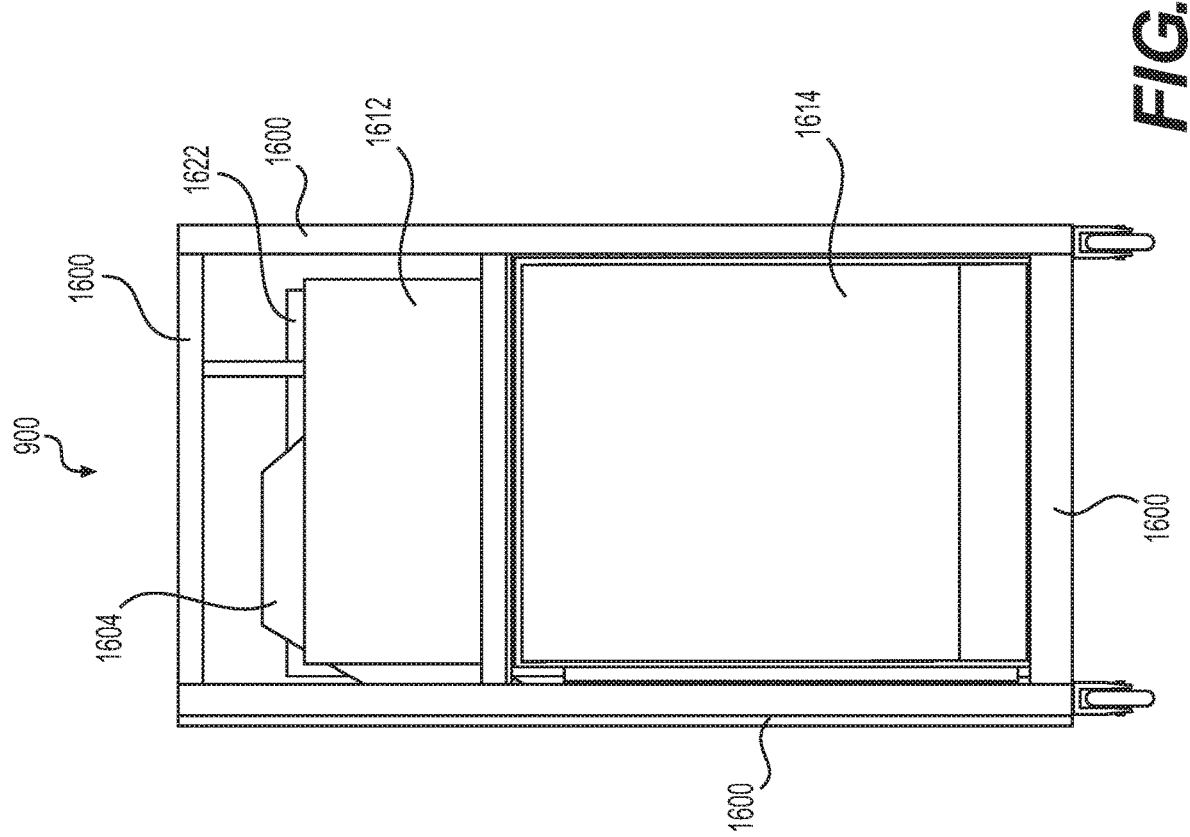
FIG. 20 illustrates an interior right side view of the interior configuration and components of the self-contained smart waste machine of FIG. 16 according to one embodiment of the present disclosure.
Figure 21:
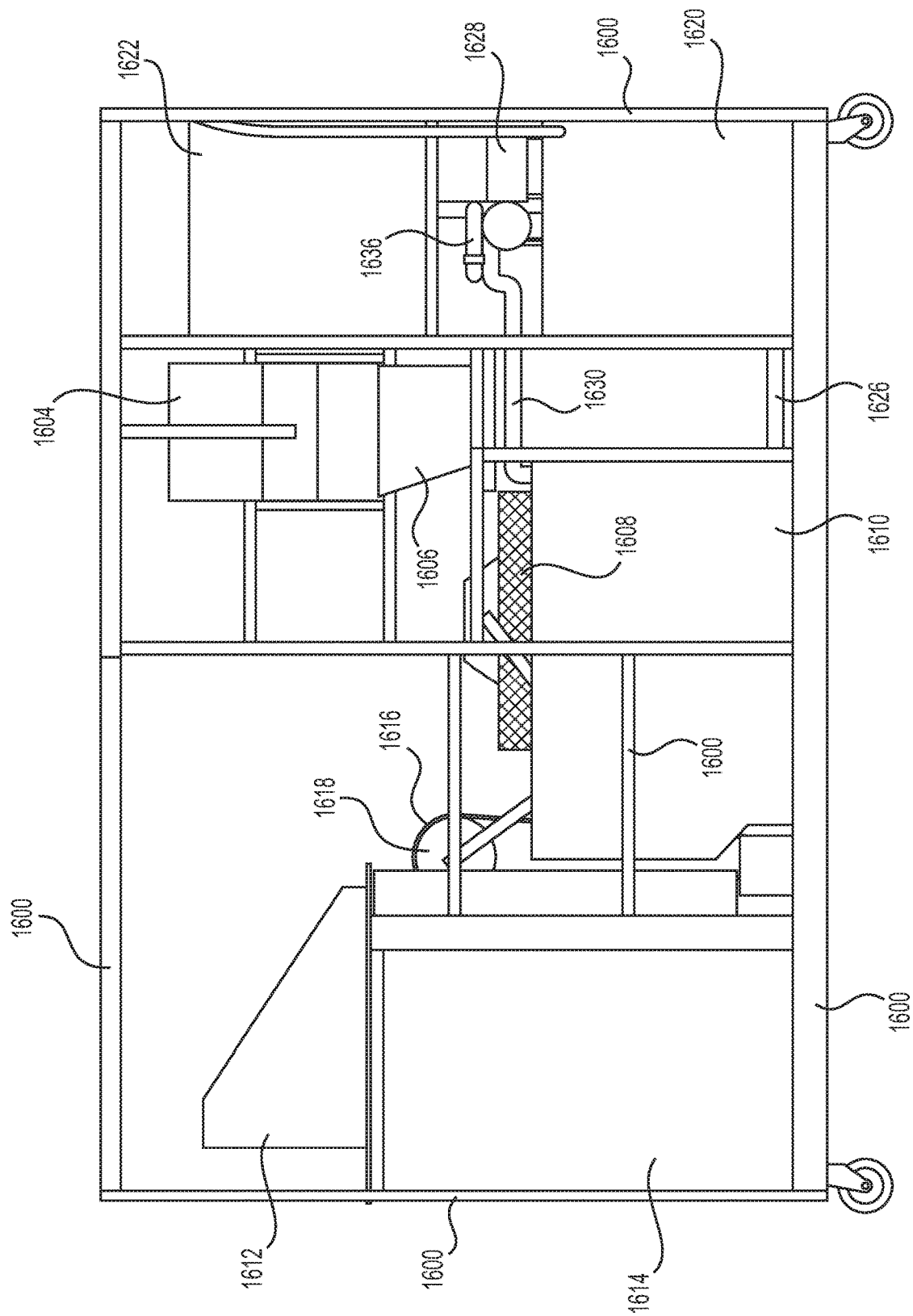
FIG. 21 illustrates an interior rear view of the interior configuration and components of the self-contained smart waste machine of FIG. 16 according to one embodiment of the present disclosure.

FIG. 18 illustrates dimensions of machine 900 according to one exemplary embodiment of the present disclosure. It is readily appreciated that illustrated dimensions may be altered as deemed necessary by skilled artisans.

Figure 22:
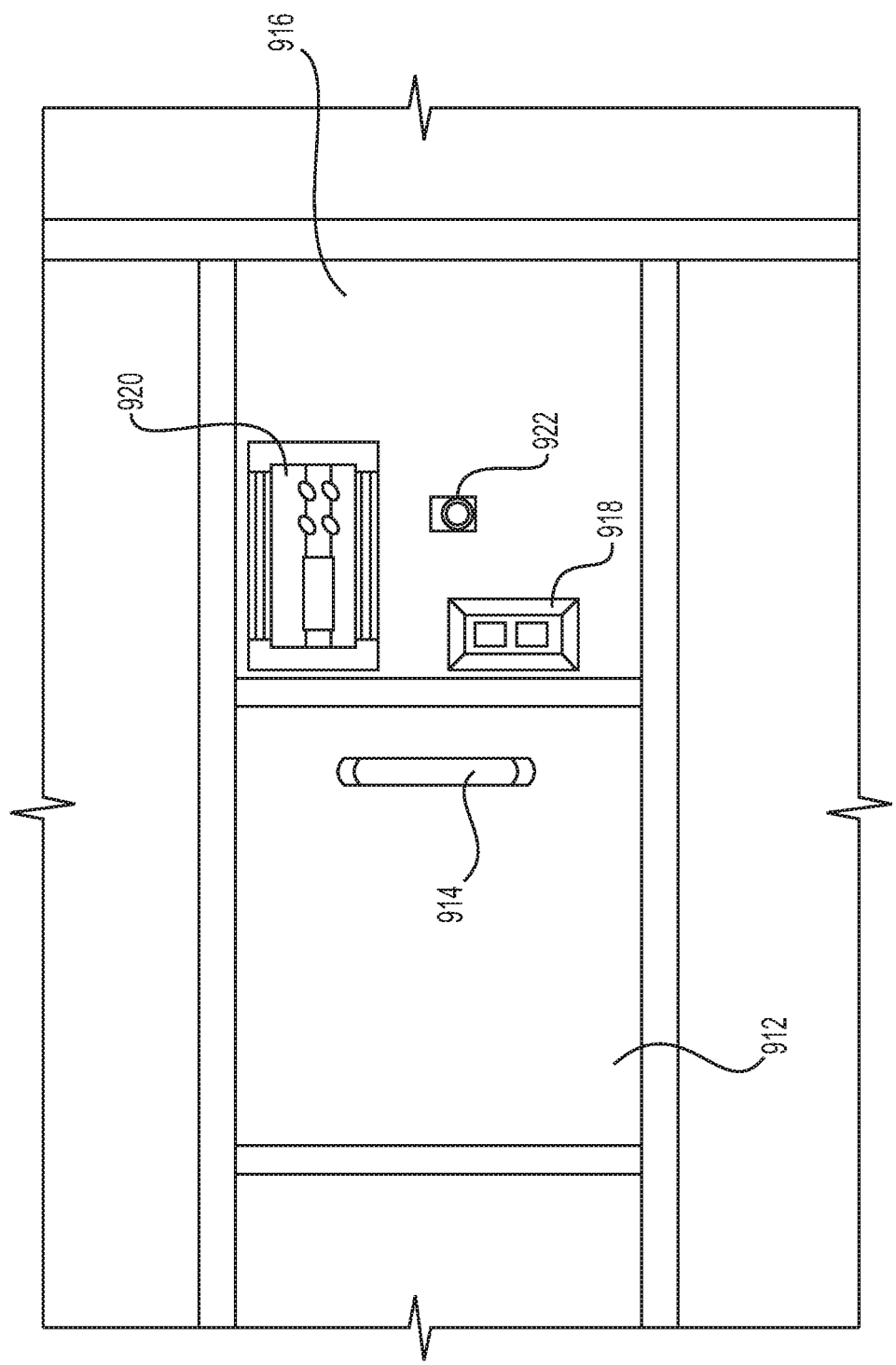
FIG. 22 illustrates an exploded view of a repository access door and control panel of the self-contained smart waste machine according to one embodiment of the present disclosure.
Figure 23:
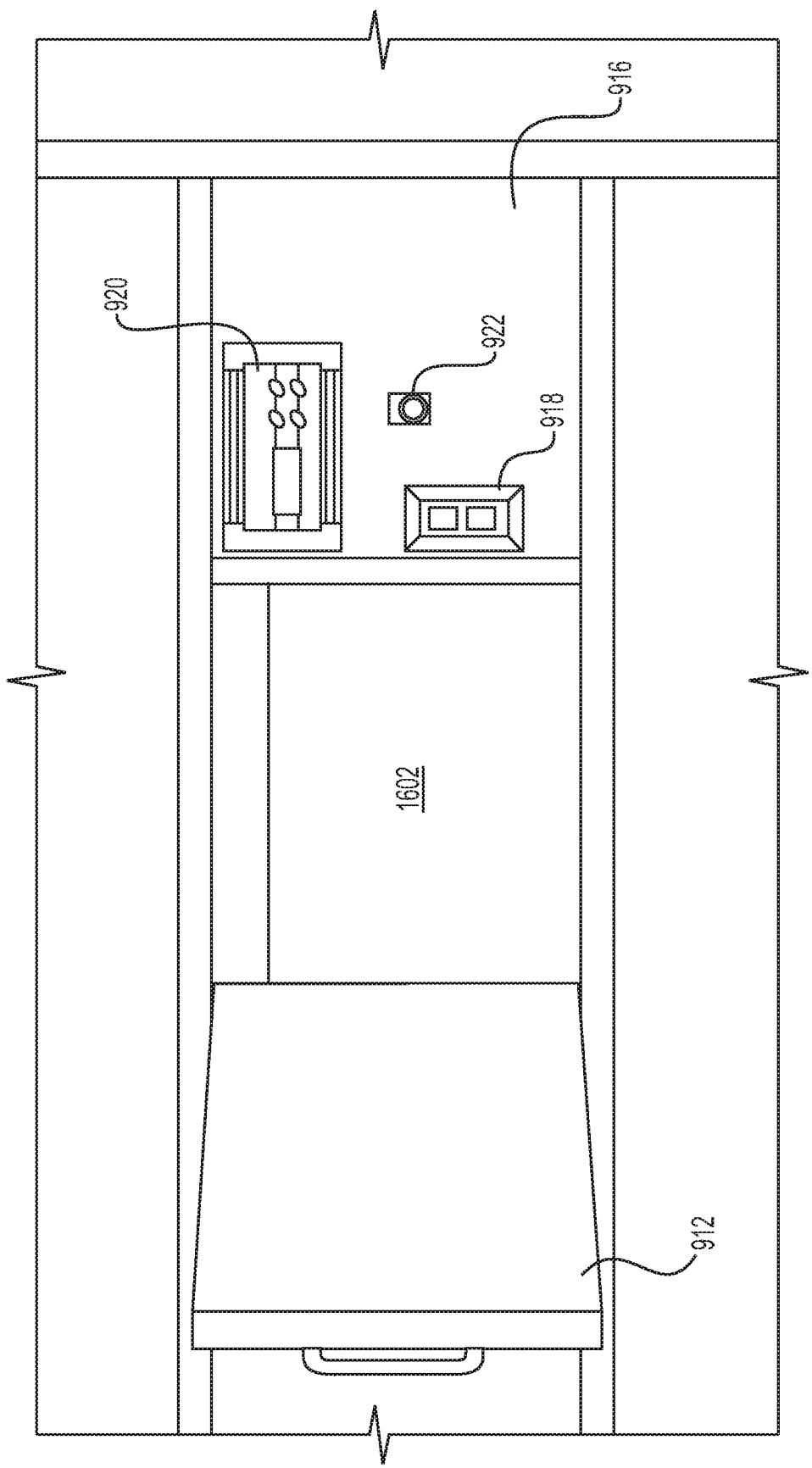
FIG. 23 illustrates an exploded view of a repository access door in an open configuration and control panel of the self-contained smart waste machine of FIG. 22 according to one embodiment of the present disclosure.
Figure 24:
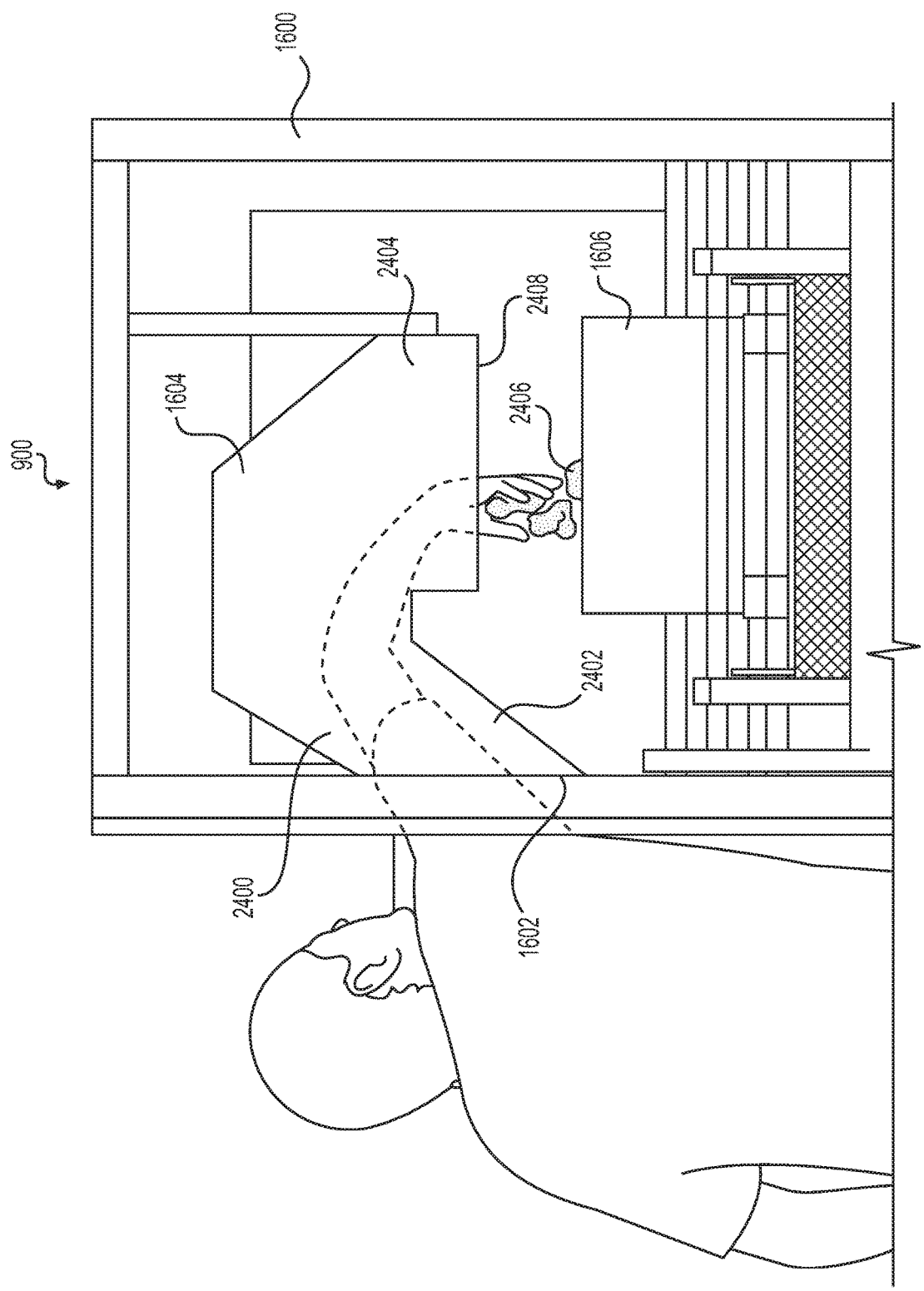
FIG. 24 illustrates a user depositing green waste material within the disclosed self-contained smart waste machine according to one embodiment of the present disclosure.

In operation, machine 900 is plugged in via electrical connector cord 1106 to an electrical outlet. Main power switch 1112 is enacted to provide power to all respective components of machine 900. Turning to FIGS. 22 and 23, repository access door 912 is opened via handle 914 to expose entrance access area 1602 of non-retrievable chute 1604. As shown in FIG. 24, a user may insert an extremity (such as user's arm and hand) into entrance access area 1602 of non-retrievable chute 1604. In one disclosed embodiment, non-retrievable chute 1604 is configured as a security hopper wherein a user is able to manually extend their hand into non-retrievable chute 1604 to place green waste material 2406 therein. In an exemplary configuration, an entrance passageway 2400 of non-retrievable chute 1604 may be configured having an upward incline 2402, wherein a user must reach through passageway 2400 and manipulate their extremity and/or hand into a subsequent downward incline 2404 and through an exit opening 2408 of non-retrievable chute 1604. In an exemplary embodiment, non-retrievable chute 1604 may be configured with an overall dimension of 22L×18H×12 W (inches).

Figure 25:
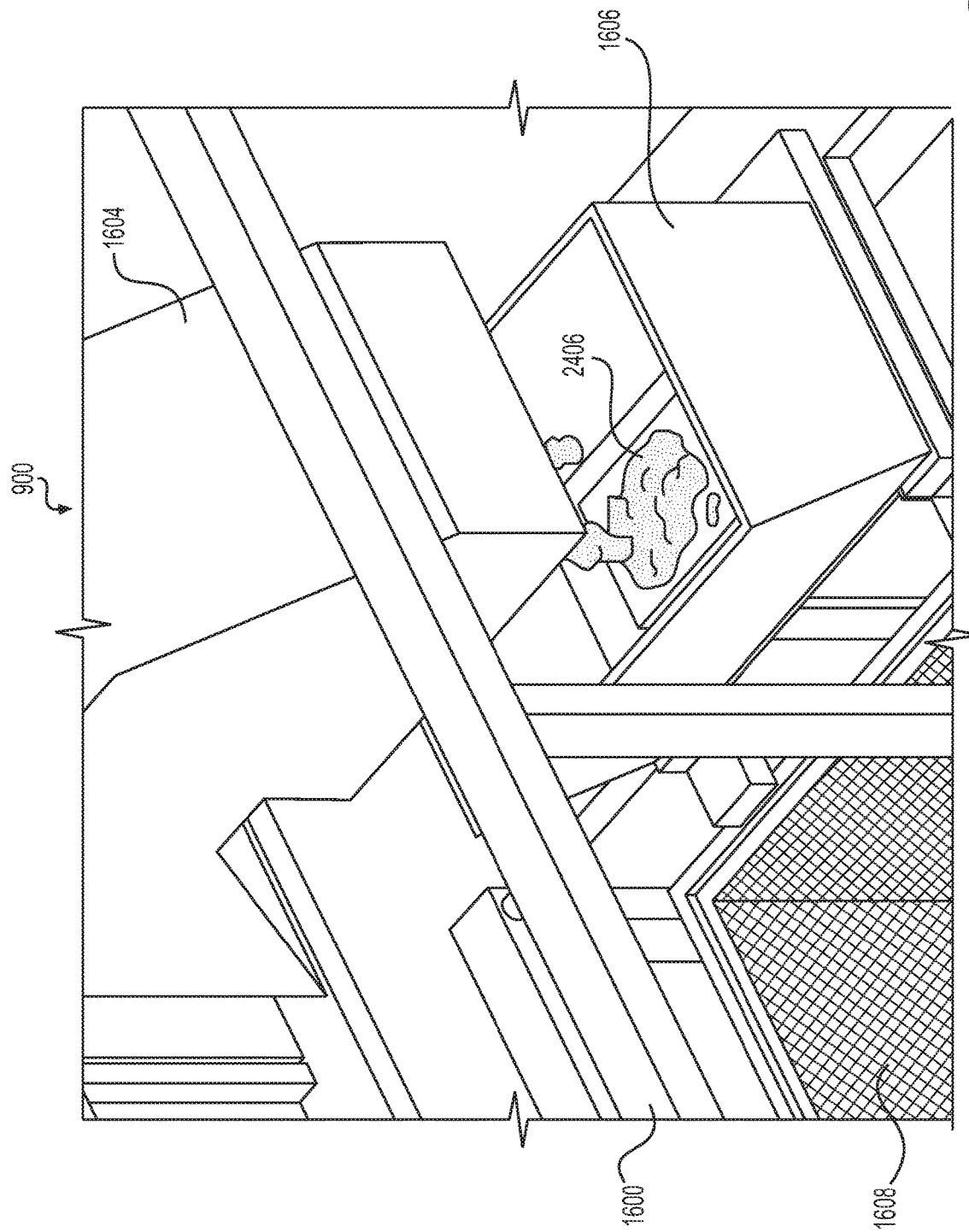
FIG. 25 illustrates a green waste material deposited on a scale of the disclosed self-contained smart waste machine according to one embodiment of the present disclosure.

As shown in FIGS. 24 and 25, a user may then drop green waste material 2406 through exit opening 2408 onto first receiving bin 1606 which may be configured as a scale basket as described above. First receiving bin 1606 is preferably disposed a distance away from exit opening 2408 as an added security feature. In one embodiment, the aforementioned distance may be approximately 8-10 inches. The dimensions of non-retrievable chute 1604 (including entrance passageway 2400, upward incline 2402, and downward incline 2404) and the distance of first receiving bin 1606 from exit opening 2408 are preferably design to ensure that a user is unable to reach back through entrance passageway 2400 of non-retrievable chute 1604 to retrieve any previously submitted green waste material 2406. Thus, such dimensions may be adjusted and measurable to achieve this end goal. In addition, the design and configuration of non-retrievable chute 1604 makes it awkward and/or uncomfortable for a user to attempt to retrieve any previously submitted green waste material 2406.

Turning again to FIG. 22, once green waste material 2406 is deposited into first receiving bin 1606, a user closes repository access door 912. It is readily appreciated that HMI technology may be employed within, at least, the configuration of repository access door 912 and control panel area 916. Control panel area 920 serves to zero out scale of first receiving bin 1606 and provide a weight verification of green waste material 2406 such as through a visual and/or audio display. Next, a user ensures the "start" button of the cycle start and stop button 918 is depressed. The cycle run button 922 is enacted to process green waste material 2406 by machine 900 as described herein.

Figure 26:
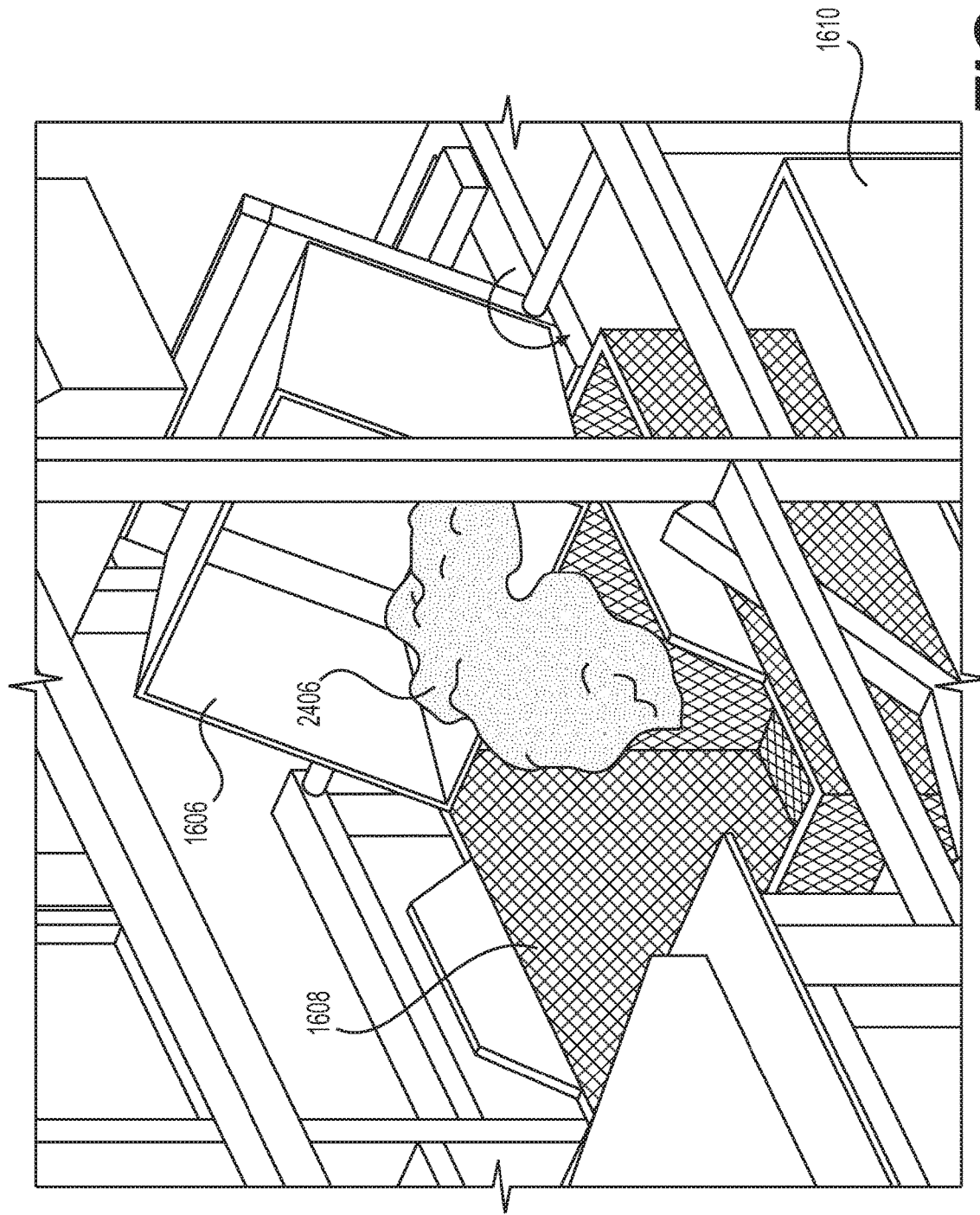
FIG. 26 illustrates the transfer of green waste material from a scale of the disclosed self-contained smart waste machine to a processing bin according to one embodiment of the present disclosure.

Turning to FIG. 26, first receiving bin 1606 is enabled and actuated (for example, employed HMI technology processes enacted via prescribed software and hardware designs) to transfer green waste material 2406 into second receiving bin 1608. In a disclosed embodiment, first receiving bin 1606 is configured to translate motion within machine 900, such as to clear non-retrievable chute 1604 and rotate to deposit green waste material 2406 within second receiving bin 1608. Once deposited, first receiving bin 1606 is actuated to return to a home position such as for receiving additional green waste material 2406 in another separate run cycle (e.g., see FIGS. 16, 21, 24 and 25) (again, HMI technology processes enacted via prescribed software and hardware designs may be employed).

Figure 27:
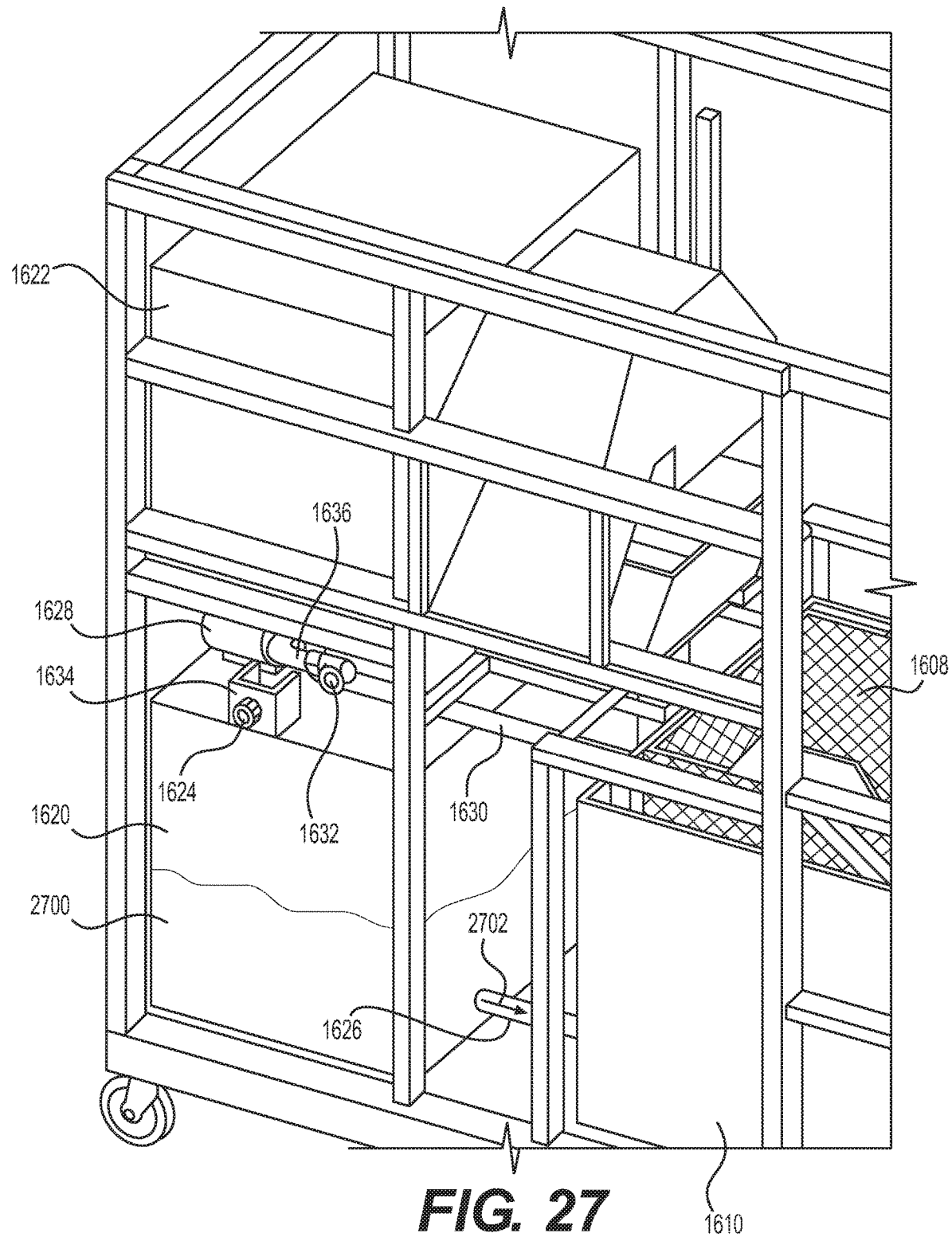
FIG. 27 illustrates a process for transporting processing fluid from a supply tank into a processing tank in the disclosed self-contained smart waste machine according to one embodiment of the present disclosure.

FIG. 27 illustrates an exemplary process for transporting processing fluid 2700 from supply holding tank 1620 into processing holding tank 1610. According to one disclosed embodiment, processing fluid supply pump 1628 is enabled to provide processing fluid 2700 from supply holding tank 1620 through first fluid connection 1626 in flow direction 2702 into processing holding tank 1610. In one preferred embodiment, processing fluid supply pump 1628 is configured to be enabled by first electronic control switch 1110 (see FIGS. 11 and 15). In one example, approximately 22 gallons of processing fluid 2700 is supplied to processing holding tank 1610 from supply holding tank 1620.

Figure 28:
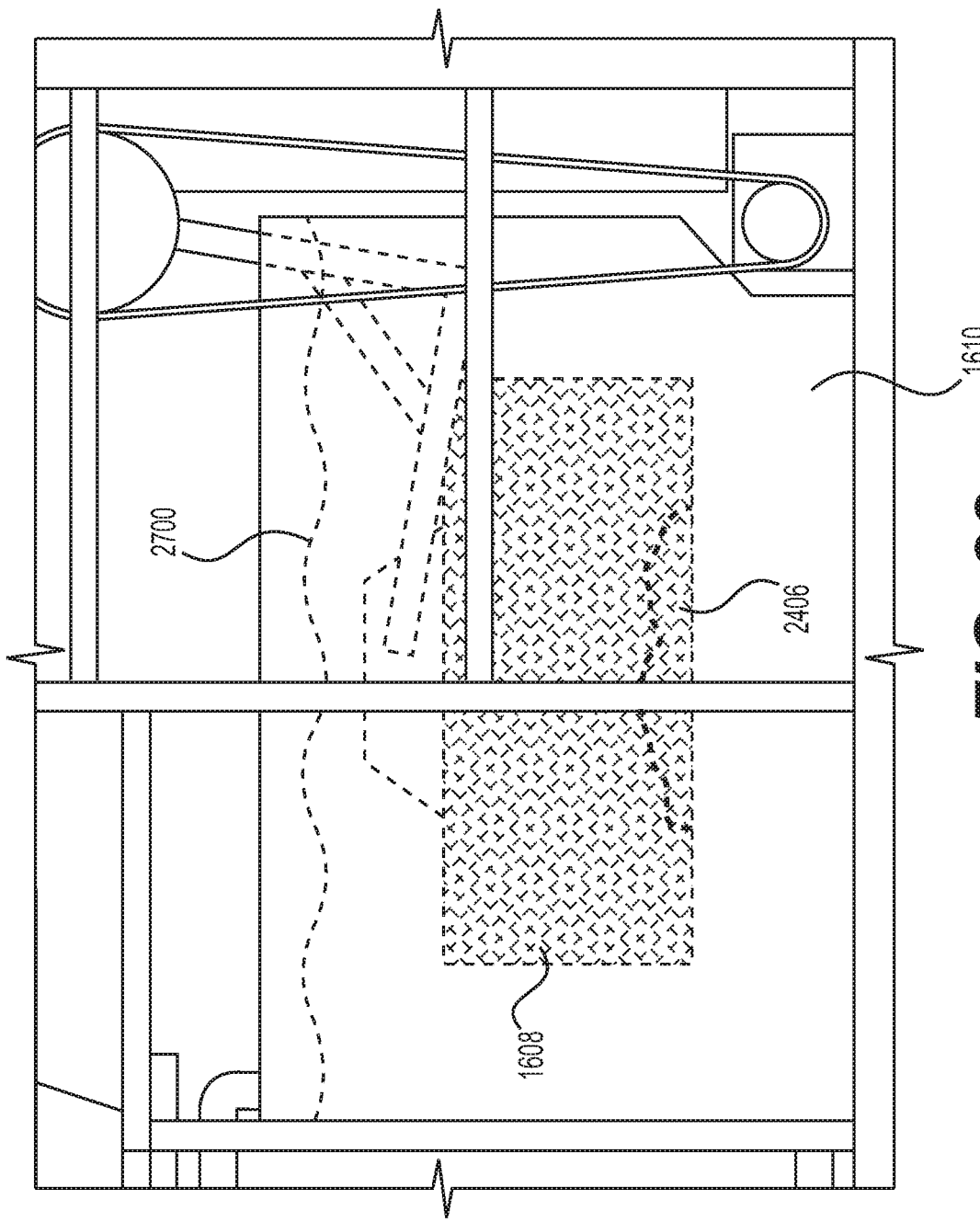
FIG. 28 illustrates a chemical degradation process of green waste material in the disclosed self-contained smart waste machine according to one embodiment of the present disclosure.

With processing holding tank 1610 having received the prescribed amount of processing fluid 2700, FIG. 28 illustrates second receiving bin 1608 enabled and enacted to be lowered into processing holding tank 1610 (for example, via employed HMI technology processes enacted via prescribed software and hardware designs). Configured as a mesh drip basket, the green waste material 2406 disposed within second receiving bin 1608 is immersed in processing fluid 2700. In one disclosed embodiment, second receiving bin 1608 is immersed at a depth of approximately 10-12 inches.

Processing fluid 2700 may comprise a solution of predominately water and 10-15% sodium hypochlorite. In a disclosed embodiment, the water and sodium hypochlorite mixture forms a bleach solution and is utilized within a chemical degradation process of the disclosed invention to degrade cannabinoids of any active ingredients within green waste material 2406. Thus, any active chemical compounds of the cannabis in green waste material 2406 are effectively neutralized within machine 900. In select embodiments, the disclosed processing fluid 2700 has a duty cycle of approximately one to a couple of months before servicing is required (i.e., when processing fluid 2700 is replaced and/or refreshed). In other select embodiments, processing fluid 2700 within processing holding tank 1610 may be expected to provide approximately 25 uses or duty cycles. According to one embodiment, second receiving bin 1608 may be configured to immerse green waste material 2406 in processing fluid 2700 for approximately 1-10 hours at ambient temperature. In one preferred embodiment, green waste material 2406 is immersed in processing fluid 2700 for approximately 4 hours at ambient temperature.

Figure 30:
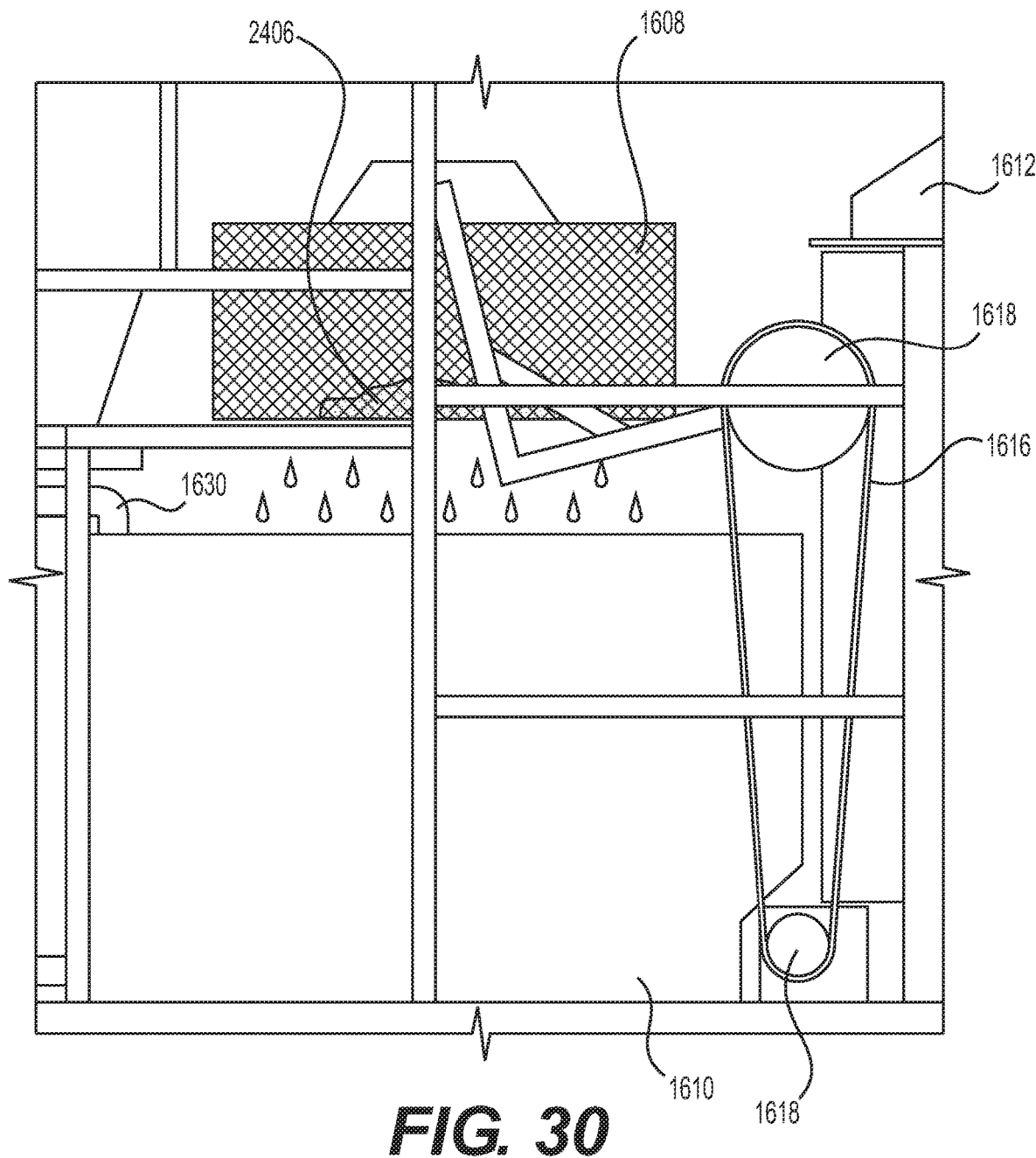
FIG. 30 illustrates a drip dry process of green waste material in the disclosed self-contained smart waste machine according to one embodiment of the present disclosure.

As illustrated in FIG. 30, after the select immersion time is completed, and the green waste materials 2406 is effectively rendered inert, second receiving bin 1608 is actuated and enabled to lift from processing holding tank 1610 (for example, via employed HMI technology processes enacted via prescribed software and hardware designs) such that green waste material 2406 is positioned, for example, at a home position, to drip dry, for example, within mesh drip basket.

It is noted that after the immersion treatment to processing fluid 2700, the solid waste of green waste material 2406 has no utility or viable value such as to anyone interest in cannabis. Upon processing and drip drying in accordance with disclosed embodiments, green waste material 2406 is non-hazardous and acceptable for immediate disposal such as being thrown away, composted directly and/or sent to a land fill. In addition, the processed green waste material 2406 generally has no functional, monetary, or recreational value to anyone who may want to intercept the same.

Figure 29:
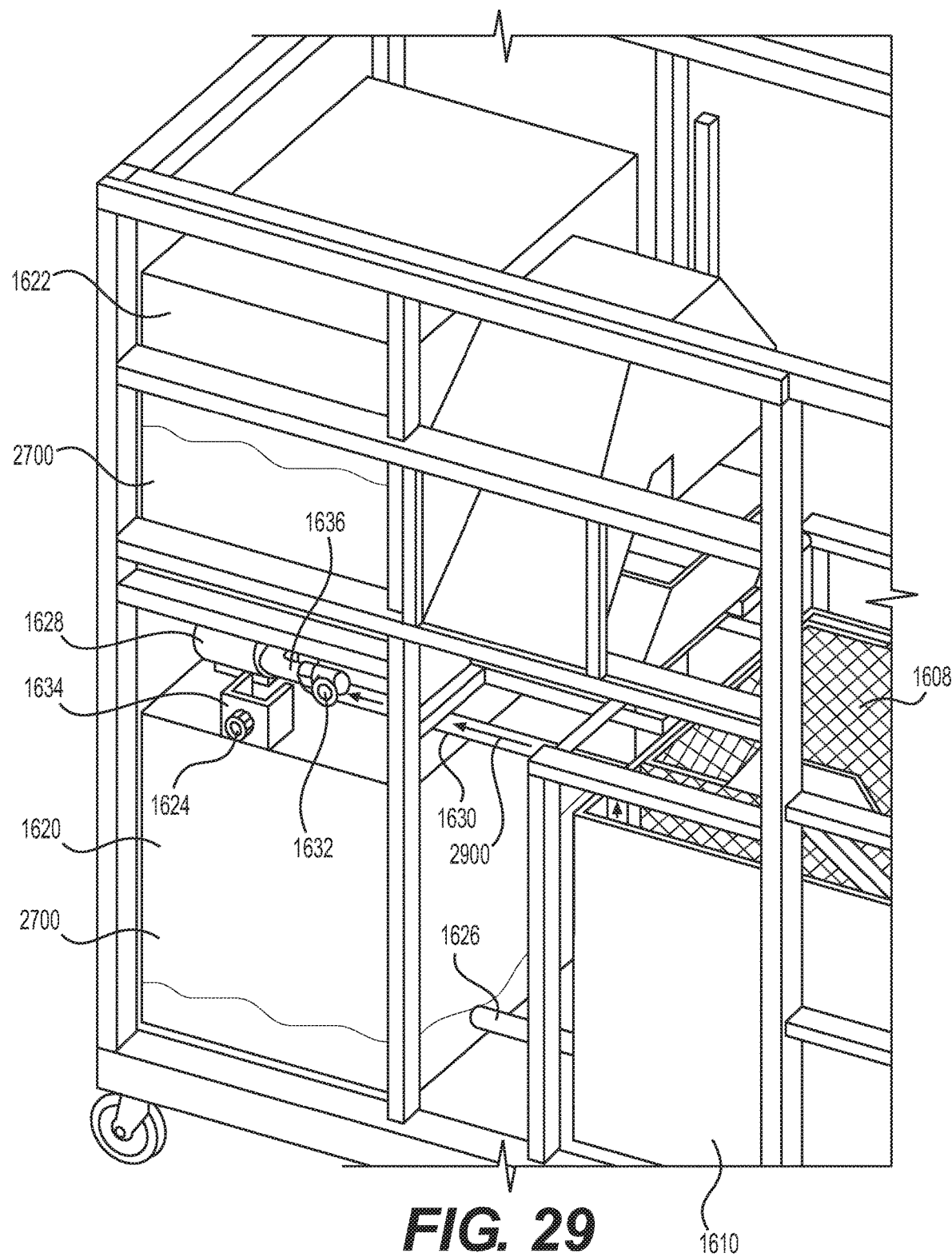
FIG. 29 illustrates a continuing process for extracting chemical degradation solution into a grey waste bin of the disclosed self-contained smart waste machine according to one embodiment of the present disclosure.

Machine 900 may be configured to track numerous metrics including, for examples, performance, maintenance schedules, diagnostics, performed duty cycles, amount of green waste material 2700 received and processed, performance duty cycle of processing fluid 2700 within processing holding tank, etc. Once the duty cycle of processing fluid 2700 within processing holding tank 1610 is up, the used or contaminated processing fluid 2700 may be eliminated from processing holding tank 1610. Thus, according to one disclosed embodiment, retrieval pump 1902 may be enabled to pump used or contaminated processing fluid 2700 from processing holding tank 1610 to discharge holding tank 1622. In one preferred embodiment, retrieval pump 1902 is configured to be enabled by one of second electronic control switches 1108 (see FIGS. 11 and 15). Thus, when enacted retrieval pump 1902 pumps used or contaminated processing fluid 2700 from processing holding tank 1610 through second fluid connection 1630 in flow direction 2900 into c as shown in FIG. 29.

At this time, a fresh supply of processing fluid 2700 may be delivered from supply holding tank 1620 into processing holding tank 1610 in the similar manner as described above. In addition, supply holding tank 1620 may be refilled such as via inlet connection fitting 1624 of inlet connection 1634 with additional processing fluid 2700. Furthermore, used or contaminated processing fluid 2700 may be eliminated from discharge holding tank 1622 such as via outlet connection 1636. Accordingly, in one disclosed embodiment, discharge pump 1904 may be configured to discharge holding tank 1622 to discharge used or contaminated processing fluid from discharge holding tank 1622 through outlet connection 1636 such as via a plurality of fluid connections or conduit connections attached, for example, to outlet connection fitting 1632. Discharged used or contaminated processing fluid 2700 may be directly eliminated or serviceable by a third party arrangement suitable for receiving and handling the discharged grey matter.

Upon drying for a prescribed time period, second receiving bin 1608 is enabled and actuated (for example, via employed HMI technology processes enacted via prescribed software and hardware designs) to transfer green waste material 2406 into toter 3200 disposed, for example, in toter access area 1614. As illustrated in the disclosed embodiment, for example, shown in FIGS. 30 and 31, second receiving bin 1608 is configured to translate motion within machine 900, such as to clear processing holding tank 1610 (such as via applicable linear and vertical motion) and rotate towards toter shield 1612 to deposit green waste material 2406 into toter 3200 (disposed below toter shield within toter access area 1614). Once deposited, second receiving bin 1608 is actuated to return to a home position such as relative to the location of processing holding tank 1610 (e.g., FIGS. 16, 17, 26 and 27) and ready for receiving additional green waste material 2406 in another separate run cycle (again, HMI technology processes enacted via prescribed software and hardware designs may be employed).

As mentioned above, machine 900 is configurable for tracking an amount of green waste material 2700 received and processed. Embodiments may employ systems for how much green waste material 2700 has been processed such as via initial scale weight measurement. Based upon the aforementioned collected data, machine 900 may alert a user or authority as to when, for example, a toter is full and/or should be removed. In select embodiments, toter 3200 may comprise a 65 gallon (65R 001249) toter or any other appropriate receptacle for transporting green waste material 2700. In a disclosed example, an employed 65 gallon toter may handle up to 300 lbs of processed green waste material 2700.

Figure 32:
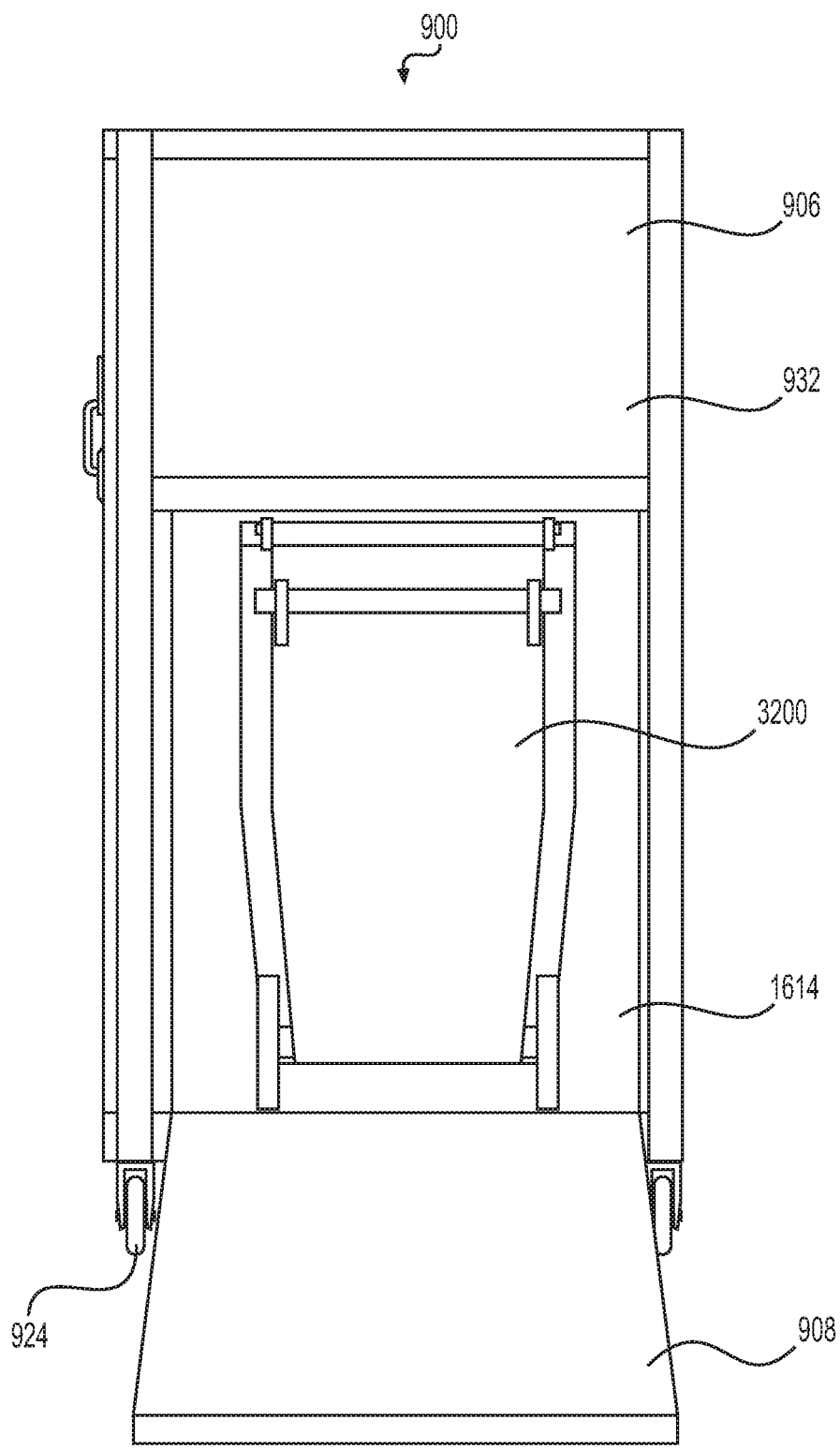
FIG. 32 illustrates the self-contained smart waste machine of FIG. 12 with the access door in an open configuration exposing a toter disposed therein according to one embodiment of the present disclosure.
Figure 33:
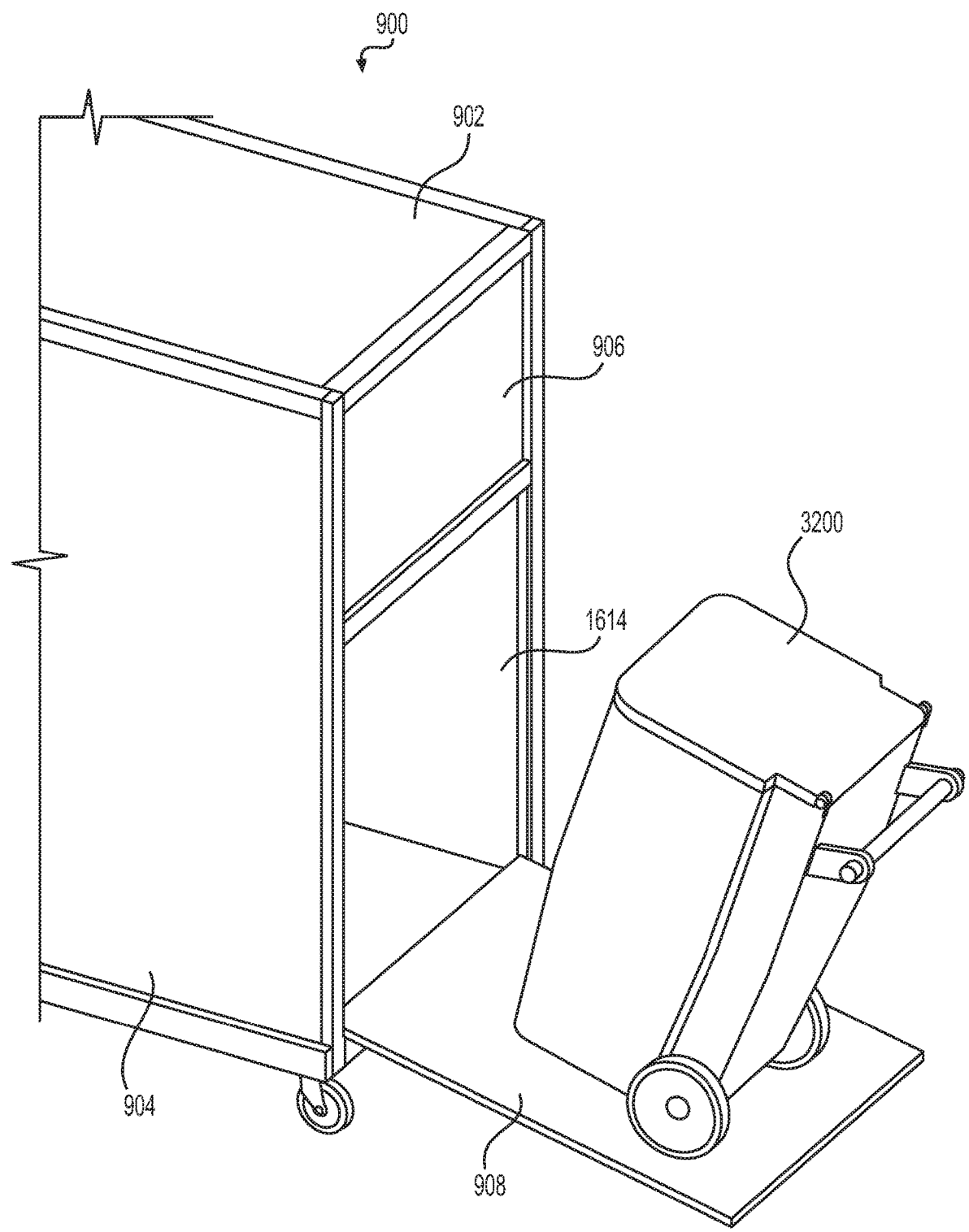
FIG. 33 illustrates the removal of the toter from the disclosed self-contained smart waste machine according to one embodiment of the present disclosure.

When full, machine 900 is serviceable by releasing and/or unlocking access door 908. In some preferred embodiments, access door 908 is an auto lock door. As shown in FIGS. 32-32, toter 3200 is exposed and capable of being removed, emptied and/or replaced. Manicple solid waste authority may be employed to pick up processed green waste material 2700. Toter 3200 may be standardized so that multiple waste management companies/services may be utilized to readily handle the toter for disposal of contents. Machine 900 is also configured to accept other standardized size toters such as 24 gallon.

It is readily appreciated that additional equipment may be implemented within the process(es) of handling the green matter waste 2406. For example, the aforementioned employed equipment may include heating elements, and fans, for example for the purpose of further processing green matter waste 2406, before, during or after exposure to processing fluid 2700. Additional elements may include a grinder useful, for example, in grinding foreign contaminants such as glass, plastic, etc. Such feature not necessary being applied as part of the disclosed audit train, but rather as a convenience application that is built into machine 900 as an optional equipment feature. Additional optional equipment may include a second repository access door for receiving non-green waste materials. In another embodiment, only one repository access door 912 is utilized which separates green waste material 2406 from other materials (e.g., plastics, glass, paper products) and sorted and collected separately.

Components of machine 900 may be configured as an interlock system such that when components or access panel 932 is removed or tampered with, machine 900 will shut down and provide notification of a breach, for example. Such notification may include what was opened and how it was opened. Thus machine 900 may be configured to trace the breach or tamper event. Likewise, if anyone unscrews one of the panels 932, machine 900 becomes inoperable and provides/sends a notification.

Accordingly, machine 900 may implement HMI technology with added features including, but not limited to, internal and/or external cameras, access codes, interlock systems, and other security measures. Cameras are useful in disclosed embodiments for providing verification of what a user is claiming to deposit (e.g., one pound of green waste material 2406 versus one pound of stones). In a security breach event, such as removal of panel 932, internal and/or external cameras may be utilized to provide photographic or video evidence, as well as traceability and chain of custody and audit trail verification.

It is further conceivable that a smart tablet is or other smart electronic device is implemented to provide functionality to machine 900. In one exemplary embodiment, such smart tablet is or other smart electronic device may integrate with machine 900 such as via HMI technology and replace and/or supplement physical controls such as one or more controls and switches disclosed in control panel area 916 (including, for example, cycle start and stop button 918, control and display panel 920 and cycle run button 922). In this example, control of machine 900 and functionality may be driven by applications based software tied to the smart tablet is or other smart electronic device. Thus, as an example, a user accesses the application software on the smart tablet is or other smart electronic device and provides an authorized personal access code. The user opens repository access door 912 on a prescribed date, location and time. The application software may query what the user is putting into machine 900 and how much. An internal scale of machine 900 verifies the entered information and quantity of the same. Additionally an internal camera may be configured to provide additional verification, for example, of green waste material 2406 being deposited for processing. Implemented HMI technology may facilitate an audit trail for verification and may be accessed to report any discrepancies or anomalies including any verification certificates. Additionally, HMI technology may be implemented to provide wireless capability or Bluetooth® connection and link machine 900 as a cloud based system.

Thus, featured implemented HMI capacity of machine 900 lends itself to chain of custody and audit trail capability. Disclosed HMI software data may be uploaded into a registry and accessible, for instance, to only select personnel. The select personnel may have access to the HMI software data 24 hours a day 365 days a year in case it is require or requested by additional customers or other cannabis regulatory bodies for upload into their respective databases. Such tracking capability is essential, since all laboratories, cultivators and dispensaries are all required to track the production and processing of cannabis products by same identification number into these databases. Additionally, machine 900 is configured and implemented to with the capability to upload data into state regulatory databases as requested and/or required. The disclosed machine 900 generates all of the aforementioned data and may be regulated and/or manually uploaded by an authorized owner of machine 900 into precise databased as may be required.

Figure 35:
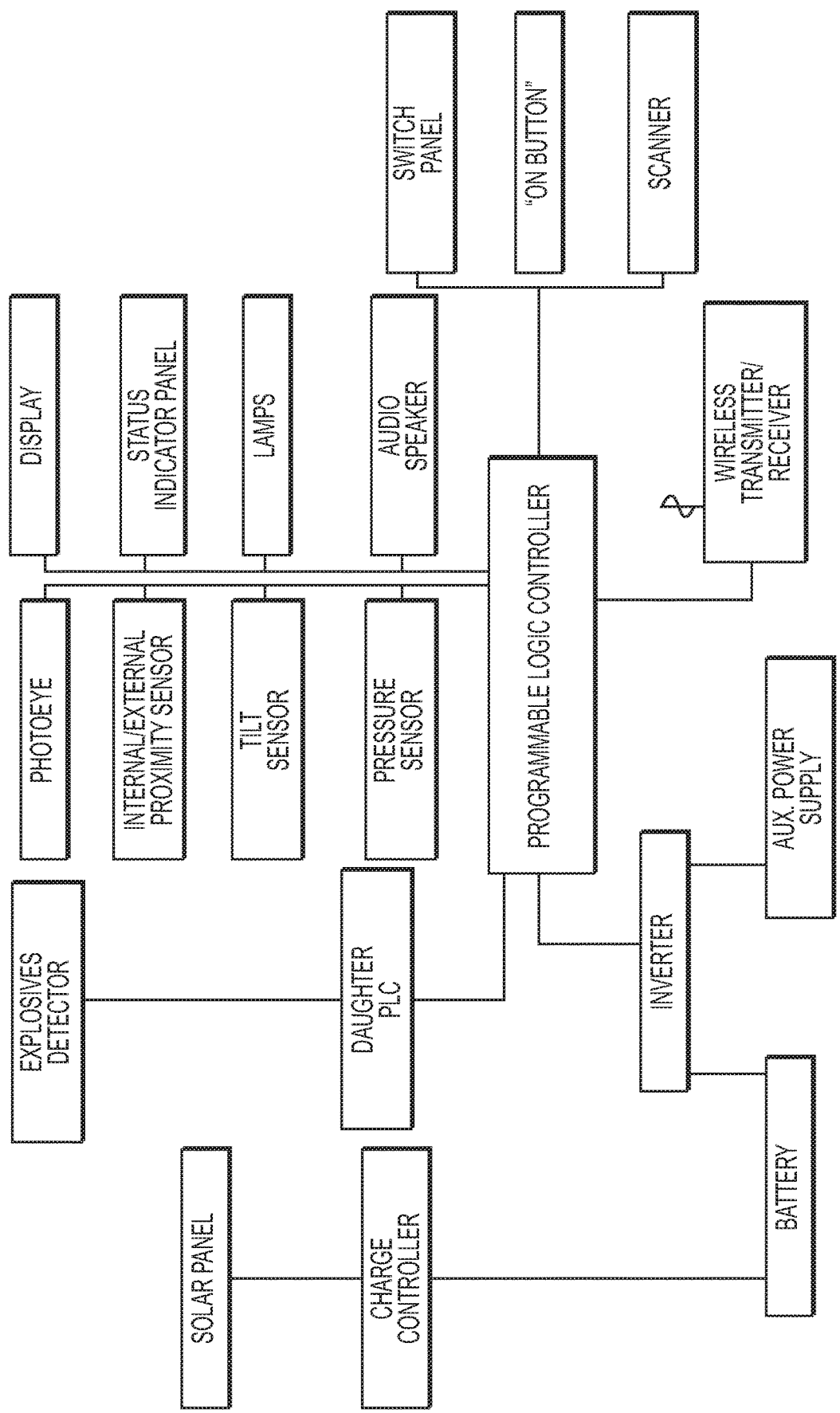
FIG. 35 is a schematic of one embodiment of an electrical system of the disclosed self-contained smart waste machine according to one embodiment of the present disclosure.

Turning to FIG. 35, an exemplary schematic for one disclosed embodiment of machine 900 is illustrated. Additional optional features of machine 900 may include a scanner situated to scan items being deposited, for example, through entrance access area 1602. A solar panel system may be arranged, for example, mounted on top of machine 900. In alternate embodiments, as described herein, the solar panel may be electrically connected by wires (typically an electrical cable) and located apart from machine 900, for example, on a pole or rooftop nearby.

It is readily appreciated that other features and functionality of control panel area 916 may be provided in machine 900 in conjunction with integrated HMI technology. For example, control panel area 916 may be configured to provide a display of information such as a system malfunction or an indication of toter capacity used and available or other notices, such as "low battery," "toter collected," "plastic materials present," "device broken," or other messages. In an included embodiment, a display of control panel area 916 may show instructions, announcements, or advertisements to the user or passersby. In another embodiment, an image projector may be integrated and utilized, for example, to project images onto nearby surfaces, such as the sidewalk. Image projector and display may be activated and deactivated, for example, via the PLC when the PLC detects the presence of passersby via the external proximity sensor. In the pictured embodiment, solar panel produces power for data logging, wireless data transmissions and intermittent lighted advertising shown on the display and image projector, and for electrical operations carried out by ancillary components. In this embodiment, electrical operations are managed by a central PLC.

In one disclosed embodiment, the PLC is programmed to display operational instructions, here being to energize the image projector or display when a passerby is detected by the external proximity sensor. In one embodiment, the PLC is configured to rotate the projected image so that it is readable by the passerby. In this embodiment, it is programmed to rotate the image so that it is inverted when passersby approach from opposite directions. It may also be programmed such that the image precedes or follows the passerby for a distance. Image reflector may be utilized to reduce space constraints and to improve vandal resistance of the image projector. In an alternate embodiment, the image projector is located deep within a protective hole or inset. Internal proximity sensor may be used to detect the volume of green waste material inside of machine 900, instead of photo eyes.

A battery may be provided to provide power even when there is no sunlight. The photovoltaic cells are electrically connected to the battery, which stores power to drive the sensors and PLC and scanner and sensor for insert opening. A waste material chamber may be configured into machine 900. Front panel insertion openings may be shaped to prompt users to deposit the correct materials (i.e. round hole for bottles and cans, rectangular hole for paper). In this embodiment, Hall Effect sensor senses usage. Electronics area contains most of the electronics and protects them from damage and water. Photoeye may detect waste levels just above the toter, where green waste material levels can be sensed immediately after toter is full. In alternate embodiments, internal proximity sensor may be used to detect bin fullness before the green waste material has filled the toter.

Storage battery or batteries can be up sized or downsized for different climates, energy demands, or for or auxiliary functions, such as providing AC electricity through an inverter. The battery or batteries may also be located separately from the machine 900 and electrically connected to the PLC. Alternate embodiments do not have PV panels and batteries, but are instead powered directly by the usual energy grid with AC power, and AC energy consumption is managed by PLC, which operates and disables sensors and auxiliary electrical functions to save energy. As noted, an electronics area is designed to be substantially weatherproof. Electronic components to be located within electronics area include a PLC, battery charging controller, user interface, audio speaker, and sensors, as will be described below. The access opening to the electronics area may be provided with a lock. When access opening to the electronics area is unlocked, the battery may be configured to automatically disengage by mean of safety relay, which is usefully configured to be fault-tolerant and non-energy consuming in its normal state (i.e. "off" in default mode, but turned "on" by the PLC when functions are being performed and door is locked).

In an illustrative embodiment, a deep cycle battery is employed to drive photo eye or limit switch sensors for insertion opening and sensor for waste identification, which sense the presence or absence of the materials, and other important characteristics. Particularly noted is battery being a "deep-cycle" battery designed to be regularly discharged to most of its capacity. The battery may also be used to power sensors for insert opening at insertion opening said sensors usefully capable of user or waste identification. Internal proximity sensor measures level of waste inside the waste chamber. PLC controls electricity to sensors and scanners to efficiently use energy from the storage system. The PLC may be configured to specifically monitor changes ("trends") over a period of time. Measurement of trends is useful because usage and environmental factors are constantly changing. For example, in the northern hemisphere from October to December the amount of available light will diminish until December 21st. Configuring the PLC to monitor battery voltage over several weeks and to compare the battery voltage in one week versus the week prior is useful. If battery voltage is going down week after week, the battery could be in danger of becoming "critically diminished." In other words, the battery voltage could fall to below 11-12 volts. At this low voltage, the battery can suffer permanent damage. In addition, functions of the device may become impossible to support (i.e. a data transmission) if voltage drops below the 11-12 volt range. In one trending embodiment, the PLC is configured to monitor the battery level, ambient temperature and the sunlight levels over a time period such as one week. Then the PLC compares such levels the previous time periods (e.g., the previous one or two weeks). Such calculation identifies battery trends. Based on a downward trend, prophylactic action (i.e. reducing the energy load by eliminating some functions) is taken in advance of the battery reaching a critically diminished state.

Figure 13:
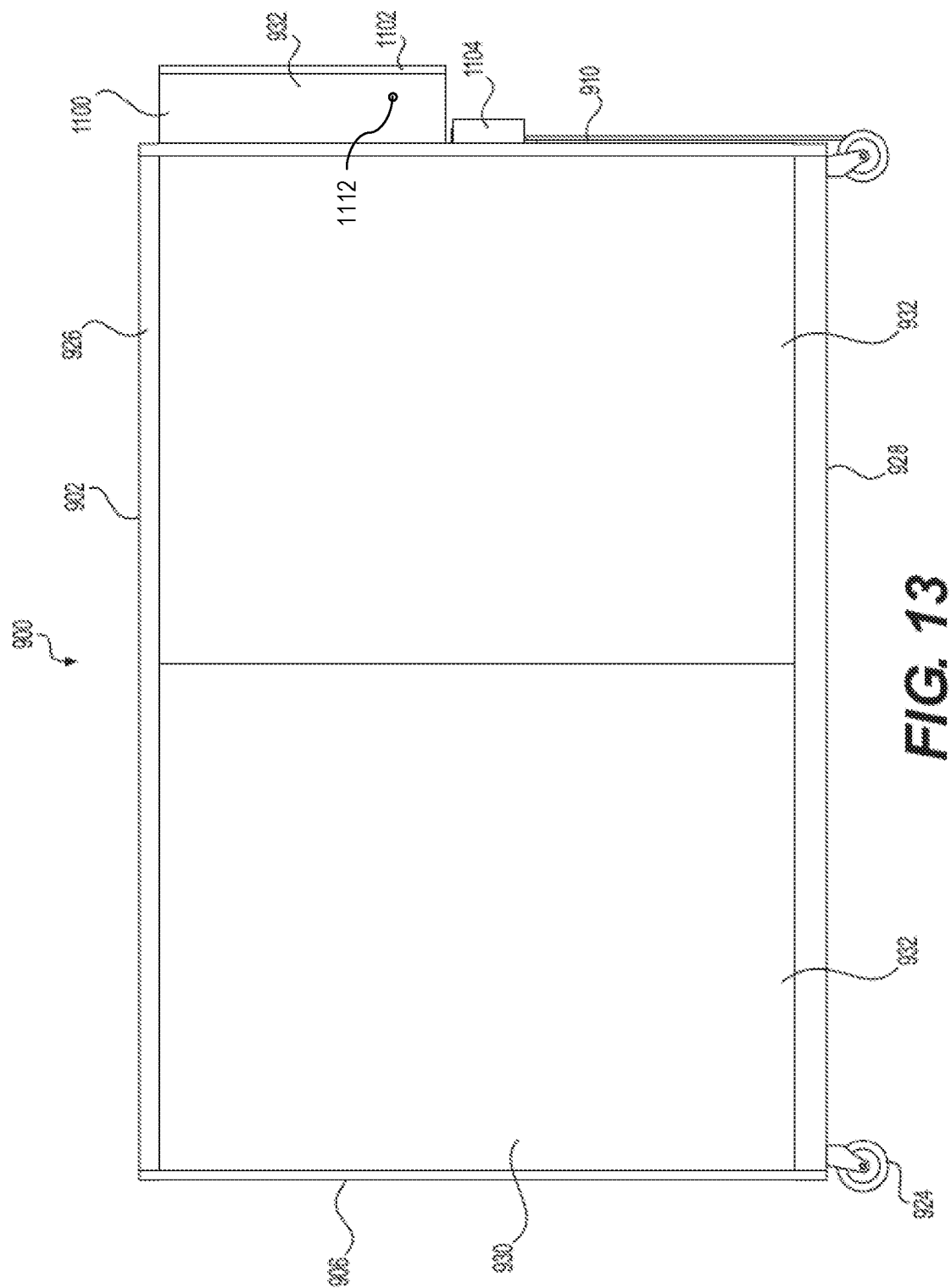
FIG. 13 illustrates a rear view of the self-contained smart waste machine of FIG. 9 according to one embodiment of the present disclosure.
Figure 14:
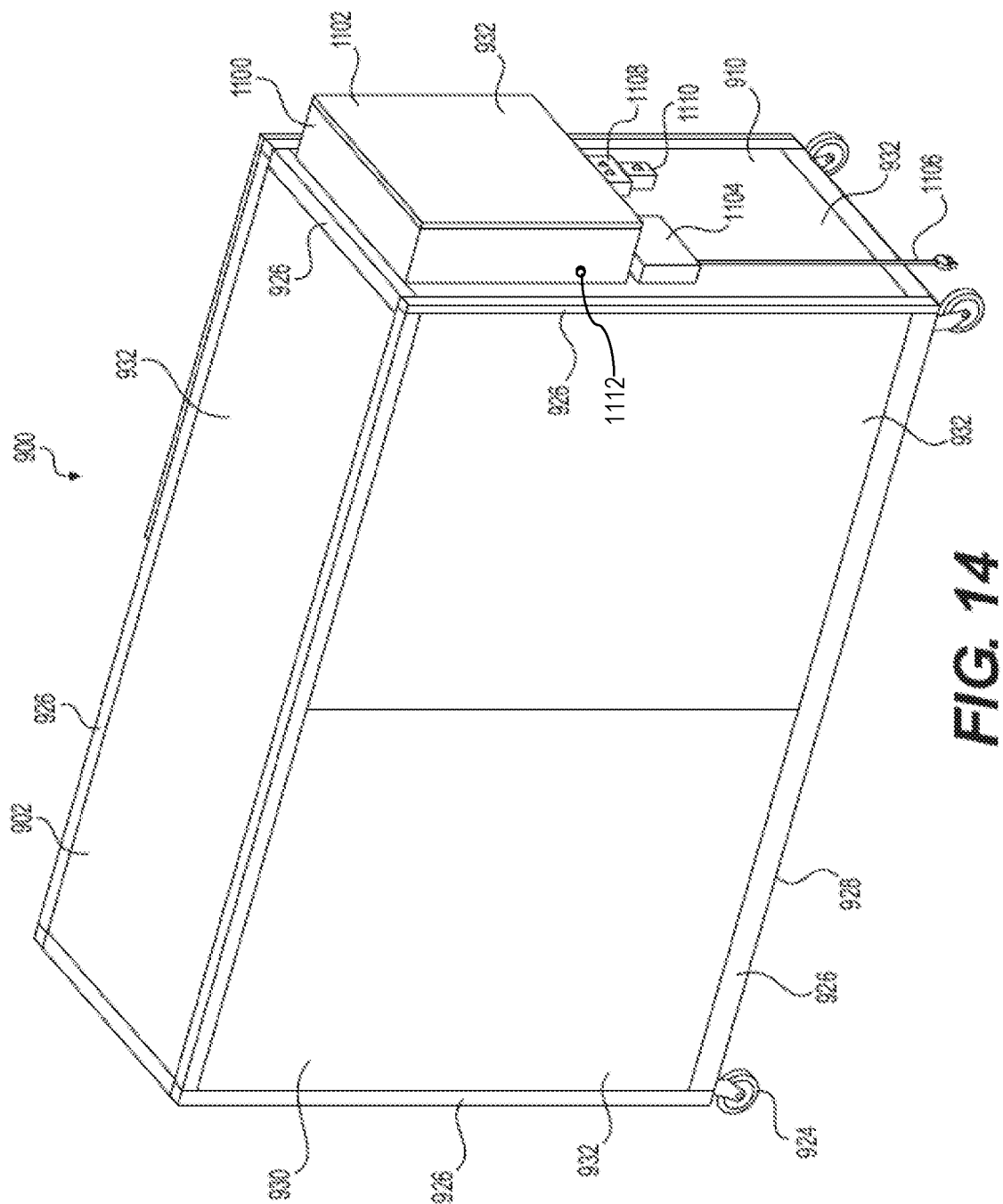
FIG. 14 illustrates a second perspective view of the self-contained smart waste machine of FIG. 9 according to one embodiment of the present disclosure.

Machine 900 is configured to prevent unauthorized insertion of materials. In one embodiment, an insertion opening (repository access door 912) lock is opened when the lock receives a message from PLC. In this embodiment, PLC sends a message to open or unlock the insertion opening when it receives input from a Scanner 80, FIGS. 11, 13. This input is given when, for example, a piece of waste with the appropriate material type (i.e. aluminum) is inserted. In an alternate embodiment, the lock is disengaged when a valid Bar Code, RFID tag, credit card, secret code or PIN number or other identification symbol enters data in the switch panel. In an alternative embodiment, the insertion opening (repository access door 912) is automatically opened or unlocked when a valid material type or permitted RFID tag, bar code, PIN number, credit card swipe, or other identifier is entered or alternatively scanned by a scanner. In an alternate embodiment, the insertion opening (repository access door 912) is automatically opened when a user with a wireless technology used for exchanging data over short distances (using short length radio waves e.g., Bluetooth® enabled phone) or handheld computer communicates with the waste enclosure. Other such methods of communicating data from user to machine and machine to user when waste is deposited are contemplated in the practice of this invention. In another embodiment, additional components such as an audio speaker may be provided, for example, on the front panel.

Figure 36:
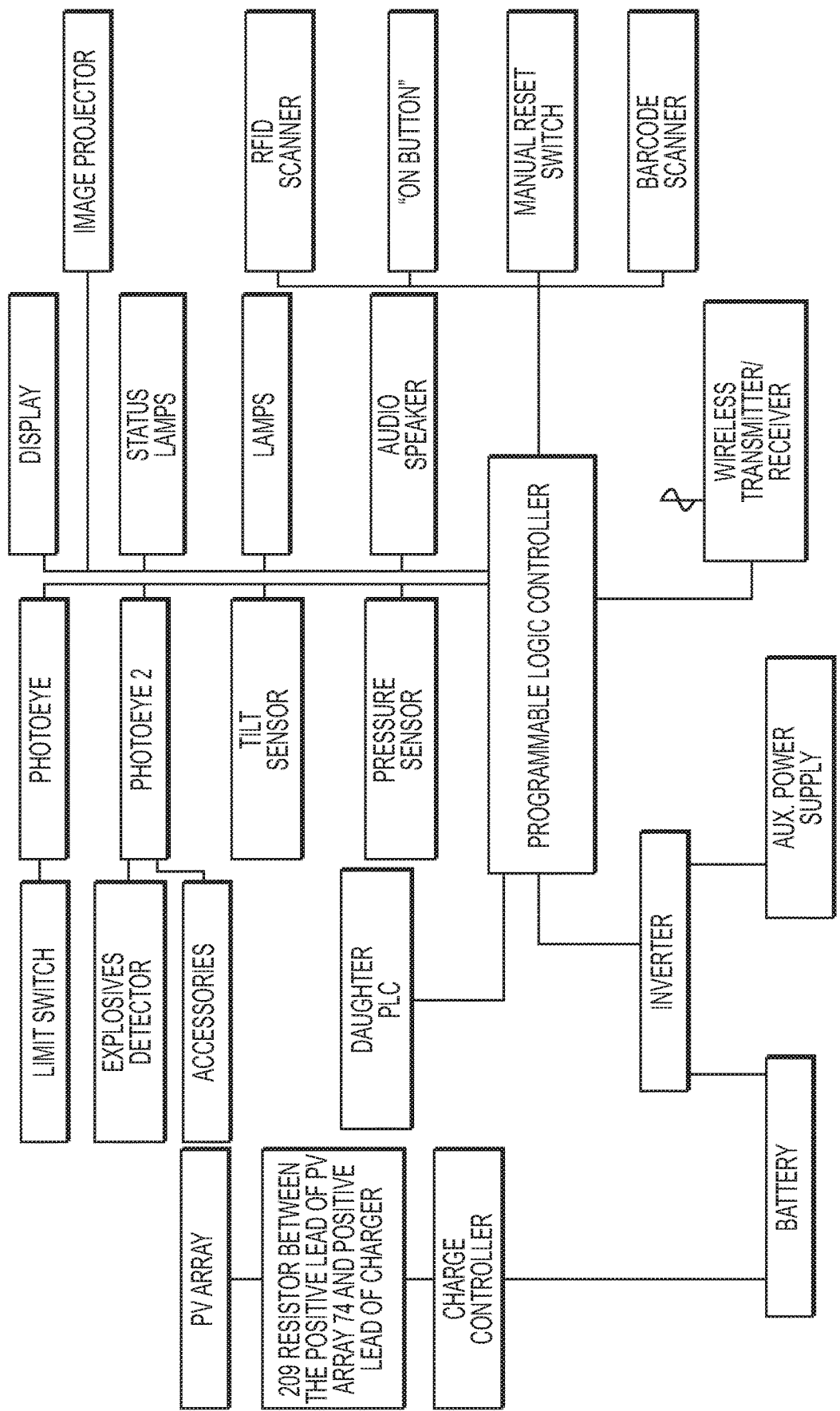
FIG. 36 is a schematic of an embodiment with augmented functions of the electrical system of the disclosed self-contained smart waste machine according to one embodiment of the present disclosure.

FIG. 35 is a schematic of one embodiment of an electrical system of machine 900 according to one embodiment of the present disclosure. FIG. 36 is a schematic of an embodiment with augmented functions of the electrical system of machine 90 according to one embodiment of the present disclosure. A control apparatus for an illustrative embodiment is shown in FIG. 35. The programmable logic controller (PLC) is a central microprocessor, which is capable of managing all operations, detecting all inputs and providing outputs for running the device. It is also capable of controlling power to the photo eyes/proximity sensors, by relays or contactors, (mechanical or solid-state) or other switching means. In different embodiments, photo eyes are used in place of limit switches or vice versa, without changing the nature of the present disclosure. A tilt-sensor is actuated when, for example, the machine 900 is vandalized or tipped by a car or accident, or when the device is collected by a "front-loader" truck and tipped or jostled in handling. Photo eyes/proximity sensors are turned on when PLC senses that the repository access door 912 has been opened, or alternatively when the main power switch 1112 has been turned on or when the scanner is engaged, or when the receiver senses the presence of a computer configured to communicate data with the PLC. Activation is programmed thus to save energy when no materials are present, and to reduce energy consumed by sensing objects unnecessarily. When turned on, in one embodiment, the photo eyes or limit switch sensors will determine whether materials block the light rays between this photo-eye sensor and a reflector on the opposite side of the channel above the waste chamber or when the limit switches FIG. 36 are pressed. The photo-eyes signal the programmable logic controller (PLC) when waste blocks the light beam for a measured amount of time, indicating that a particular quantity of waste is present. When sufficient waste is present, a message will be sent by the wireless transmitter/receiver, FIG. 35 connected to the PLC as shown schematically in FIG. 35. Other sensors may be used to detect the number of uses of repository access door 912 or the scanner in FIG. 35.

Pressure sensors, FIG. 35, may be used along with or instead of photo eye sensors, and alternatively are used to sense waste presence, absence or inventory levels. Alternatively, an internal proximity sensor may be used to detect waste. Tilt Sensor can transmit a message to PLC if machine 900 has been vandalized, stolen or tipped over. Display, FIG. 36 is used to display messages to users. Image projector, FIG. 36, is turned on when passersby are in the vicinity of the device, as detected by external proximity sensor. In this embodiment, the PLC intermittently connects the proximity sensor to the power source, to sense passersby at regular intervals. For example, the proximity sensor would be turned on for 0.5 seconds every five seconds. This would reduce power consumption to the proximity sensor by a factor often, compared to continuous sensing. Of course other intervals are contemplated. These images shown by the projector or display may be transmitted to the PLC from the wireless transmitter/receiver or may be programmed into the PLC manually by service personnel. Also in FIG. 35, in addition to a display, Status Indicators are used to convey messages including but not limited to "on," "low battery," "collected," and "broken." Also, an Audio Speaker may be used to convey messages. Programming the PLC will enable Audio levels to be controlled by staff on site or remotely via the transmitter. When PLC is not being used, it may be put to "sleep," a low energy mode, and reengaged by a Daughter PLC that responds to inputs. When in operating mode, the PLC uses more energy than in "sleep mode."

As seen in FIG. 35, solar panel is connected to a charge controller, which controls charging to the battery. An inverter is connected to the battery to provide auxiliary power through a supply port or power to AC devices, as diagrammed schematically in FIG. 35. Finally, there is a manual reset switch connected to the PLC in FIG. 35. The manual reset can be actuated remotely through use of the transmitter, FIG. 35.

In this embodiment, the projected solar panel output is 30-Watts Peak, and generates up to about 90 Watt-hours of energy per day, given an average of 3 hours of full sunlight available per day. Sunlight energy is collected by the solar panel and is converted by the charge controller, into a battery charging current and voltage. Battery reserve is approximately 800 Watt-hours, and each data transmission will use approximately ⅕ Watt-hours. Thus, the energy reserve in the illustrative embodiment is enough to run up to 4,000 message transmission cycles. When large data sets are transmitted, such as when a graphic or photograph is downloaded to the device, fewer data transmissions are possible. Therefore, the PLC is able to adjust energy usage to match energy generation and energy storage over time, by reducing the frequency of un-prioritized operations. Optionally, in some situations, instead of charging from the solar panel, batteries are charged off-site and swapped into the device as needed. In these instances, slightly larger batteries than described above are useful. The controller is programmed to permit data transmission cycles, audio and other functions and lighting such that downtime and battery over-discharge and thus battery damage are avoided. The controller is also programmed to sense a battery losing capacity and to send a data transmission to personnel before the battery loses all power in advance of failure.

A feature of another illustrative embodiment is that the PLC, when in charging mode, is a maximum power tracker, regulating the charging of the battery from the solar panel. The power tracker has the ability to vary the level of voltage and amperage based on the characteristics of the solar panel, the sunlight level and the battery condition. The power tracker has the ability to balance current and voltage inputs to optimize battery charging. The PLC has the ability to optimize the charging regimen of the battery, by tracking the level of photovoltaic energy available and the battery charge and use of the device. When the battery is fully discharged, the controller will output low voltage and high amperage. When the battery is almost completely charged, the controller will output a higher voltage and lower current. When the battery is fully charged, the controller will not output any charge to the battery, or will simply output a trickle charge. In addition, the controller is configured to output higher voltage when temperatures are low, and lower voltage when in hot weather. Thus, the battery will avoid being overdischarged when it is cold and more susceptible to failure and damage. A temperature sensor shown schematically as, FIG. 36, informs the PLC which is programmed to regulate charge current according to temperature-controlled thresholds. The PLC may also control lighting and the frequency of operations of ancillary components based on temperature data. In this embodiment, the nominal 12 Volt battery will be maintained at 13-14 Volts in cold weather (i.e. about 10 to 40° F.; −12 to 5° C.), and 12V-12.5 Volts in hotter weather (i.e. about 80 to 90° F., 27-32° C.). Conversely, when the battery is undercharged, the controller delays or skips a data logging or transmission event or limits lighting or audio levels until adequate charge is attained or until a new battery is installed. This serves to extend battery life and avert battery or operational failure.

This PLC directed duty cycle is usefully determined by low power timing circuitry contained in a section of the PLC, or in the "daughter PLC," FIG. 36. Said circuitry governs the rate of energy usage by the ancillary components by turning components on, off or initiating low-power modes at regular intervals. The circuitry regularly initiates functions carried out by the ancillary components, and the time lag between functions is programmed in the PLC to adjust to battery voltage levels, or is modifiable on the unit, or is programmable by means of a wireless communication device or by electrical connection between the programming device (i.e., computer) and the PLC, or by configuring the PLC to adjust power levels automatically based on environmental information such as temperature, light levels or noise levels. In some embodiments the controller includes data logging to gather usage history for analysis or transmission.

Certain embodiments may include additional controlling components. For example, a secondary controlling component, herein shown schematically as Daughter PLC in FIG. 35, is programmed to reduce or increase the clock speed (processor speed) of the primary processor is usefully implemented to save energy. Logic of the controlling component slows the clock speed when no functions are being run. During a period of high use, the clock speed of the PLC is increased so that data transmission or sensor monitoring occurs quickly and accurately. Failure to slow clock speed of the PLC after high-energy use results in wasted energy, and failure to increase clock speed results in waste streams being missed or miscounted, or data transmission time lengthened thus increasing airtime costs and transmitter energy use. A microcontroller, such as a PIC processor, is usefully used in conjunction with PLC. As noted, a Daughter PLC may be configured to increase the clock speed of the main PLC, as shown schematically in FIG. 35. The Daughter PLC may be configured to speed up the primary processor when it receives a signal that the system is being used from Scanner, from transmitter, from the insertion opening (repository access door 912) sensor, or by other sensors that indicate system usage. Alternately, the Daughter PLC may activate the primary PLC when it senses a potential user is nearby. In this case, the external proximity sensor senses proximity of a passerby. During data transmission and sensor activation, a typical PLC processor operates at approximately 4 MHz. Otherwise it operates at approximately 32 KHz. Of course other clock speeds are contemplated.

Other components that may be turned on for only limited periods are sensors such as pressure sensor and scanner that are on only as they need to gather the required data. Certain sensors, such as photo eye/proximity sensor, are turned on for minimum periods, for example up to 0.05 seconds, to respond reliably to the input signal while not consuming more energy than needed. This saves energy because the sensors consume energy only when they are on, provided that their normal state is off. Also, most data gathering events can be processed quickly, so very low duty cycles can be achieved with this innovation. Logs may be stored in hard drive memory and sent by the wireless transmitter to staff. These logs may be uploaded wirelessly to a central server so status information to users via cell phone or email or SMS (text message) can be relayed. Another point of energy saving control is an insertion opening sensor configured to engage photo-eye sensor or scanner when pressure sensor responds to waste as deposited, rather than checking at intervals, or continuously, or on another basis. The PLC is programmed to trigger photo eye sensor and scanner after insertion-opening has been opened or pressure sensor activated. In this embodiment, there is a transducer, such as an inductive sensor or pressure transducer or Hall Effect sensor, located on insertion opening (e.g., repository access door 912) to allow for a signal to be sent to the controlling component indicating each usage.

In a specific embodiment, the controlling component is programmed to shut down unused circuits within PLC or other circuits when any are unneeded. Specifically, the controlling component is programmed to disable certain sections of the circuit board, thereby turning off electricity to the waste and user sensors, Display and projector when the external proximity sensor detects no passersby. The PLC is programmed to turn the ancillary components on when users are present. This intermittent use of ancillary components saves energy. Certain areas of the controlling component may be activated or deactivated according to different methods. In certain embodiments, the activation of discrete controlling components is through different pins on the processor directly for areas of the circuit with lower current requirement. By intermittently monitoring and turning off circuits of the controller when those circuits are not required for operation, the device conserves energy.

Another embodiment includes a controlling component, a PLC, programmed to regulate the battery charger to eliminate battery charger energy consumption when solar power is insufficient for charging. The PLC is programmed to actively monitor wattage from the solar panel and to turn off the controller when the wattage drops below a threshold voltage. The battery charger is turned on when adequate voltage on the panel is reached, and off when it is not. Since many battery chargers require some activation energy from the battery to begin the charging process, the controlling component is programmed to supply the activation energy when solar energy is available. Alternatively, a blocking diode is used to keep current from flowing from the battery to the battery charger. In such configuration, no energy is able to pass from the battery to the battery charger; it is only able to come from the solar panel when it has sufficient voltage to charge the battery.

The battery charger typically requires activation energy to charge the battery. Without this activation energy, it blocks any current from going through the charger to the battery. By placing a resistor between the positive lead of solar panel and positive lead of charger, solar panel provides activation energy when there is sunlight reaching the solar panel. Once operating, the charger is the lower resistance path, so energy flows through the charger to the battery.

In one embodiment, a display is incorporated. In particular configurations, the display is a lighted sign, a scrolling panel, or other display method exhibiting information or advertising, which may include sound. The display may be activated intermittently. The intermittent powering reduces the energy budget. In this embodiment, the intermittent-use feature may be used in controlling the lighting of the device. Cycling the lighting at very rapid duty cycles that are invisible to the human eye, energy can be conserved. In an alternative embodiment, the lighting may be pulse modulated at slower cycles, thereby conserving energy and permitting variations in the level of display illumination. In addition, the display is illuminated in segments. In a related embodiment, the display is programmed to be on only when a person passes by. This is accomplished by use of a proximity sensor 85*a*, which engages the light to turn on when a user is within a predetermined distance away from the container. In yet another embodiment, the display may be controllable via wireless receiver from a base location. For example, the base station may want to post an electronic message such as an advertisement or emergency message on each receptacle, for example, "evacuation route: head south," or a message that, for example, the waste will next be collected at 2 PM on Tuesday, or a bus schedule with real-time updates.

Another illustrative embodiment includes a PLC that is able to disengage energy draws when voltage is low. For example, in many settings, the device powers displays as discussed above. The PLC is programmed to disengage these displays from the electricity source (e.g., battery) when the voltage is low.

In some embodiments, it is useful to employ a PLC to disengage electricity to the motors of a scrolling display when voltage is insufficient to power the display's motors. The PLC-powered a relay to connect electricity to a display comprising signage with a motor, only when there is sufficient voltage to power said motor. Additionally, the PLC can be programmed to power the sign's motors only when the information to be displayed is likely to be beneficial. For example, a restaurant advertisement might be usefully displayed at lunch hour (and not at other times). In addition, such a sign can be programmed to scroll the sign at greater intervals if power is insufficient to do so more often. In addition, the PLC can be programmed to rotate or change the Display for different audiences and times of day.

Another embodiment includes a PLC programmed to search for a particular source of energy. In a device that is intermittently connected to the power grid, for example, the PLC is programmed to default to solar power source unless the device is connected to the grid. When connected in, the unit's energy-storing capability absorbs large fluctuations in energy use, which lowers the peak current that the machine draws. This is advantageous because utility-supplied electricity charges may be based on both total draw and peak draw. In some embodiments, this programming reduces peaks, resulting in lower electricity costs. For a device that is, at times, charged by a utility-supplied electrical source, the PLC a real time clock program could usefully charge the battery during "off peak" times when electricity rates are lower. Alternatively, it may charge the battery when AC power is connected, and use photovoltaic energy when not plugged in. This may be accomplished with a PLC programmed to engage and disengage relays to connect a particular power source to a charging circuit or operating circuit. Alternatively, the relays may be wired to automatically provide activation energy to the relay with the highest energy.

An embodiment is usefully implemented in situations where devices are placed temporarily at a particular location that may or may not have access to sun light or to grid power. In other situations where the device is searching for the best source of energy, it may be programmed to use sunlight whenever there is sufficient sunlight and to use utility electricity when sunlight is not adequate to charge the battery. On PLC, program logic would direct using sunlight during the day, and utility power at night, if both are available all the time and the power demand were beyond that available from sunlight. Alternatively, when the battery is charged off-site and replaced periodically, the PLC determines the optimal replacement frequency of the battery and displays that information on the display, the status indicator panel, or transmit the information wirelessly via transmitter/receiver.

A PLC and electronics that enable recharging of the energy storage system by another source, such as from power provided by a collection truck, are implemented in an additional embodiment contemplated. Also contemplated as another source of power is one utilizing ambient radio waves. Use of ambient radio waves as a power source is further set forth in US Pat. Pub. No. 20050153754 "Magnetic field device" (Shanks et al.). These additional sources are particularly useful when devices are in storage or in transport regularly.

In another embodiment, multiple machines 900 according the embodiments described herein can be placed adjacent to one another. This could either be in a very busy location that requires more than one machine 900, or in a location where different machine 900 types are suitable for different materials. In the one such embodiment, the multiple containers are electrically inter-connected so that data, stored energy and electrical components can be shared, thereby decreasing redundancy and cost.

Another embodiment includes a PLC programmed to track solar derived voltage over a period of time, and if voltage is falling, the PLC turns on an indicator (on the device or at a remote location) telling staff that the device or attached solar panel is placed in an unsatisfactory location or orientation and must be moved, or that the battery is failing and must be replaced. This is advantageous because there are often natural peaks and valleys in voltage that must be "averaged out" in order to determine if a location or cell/reflector orientation requires alteration. By monitoring voltage over three weeks, for example, cloudy weather lows and sunny weather highs are incorporated into a calculation for more accurate placement evaluation.

In yet another embodiment, the PLC is programmed to allow for a variety of settings controlled by the staff personnel. In this embodiment, the PLC receives a signal from a potentiometer, which is used to adjust the desired display lighting levels, voice volume, microphone sensitivity or other setting. In a related embodiment, these settings can be controlled wirelessly via the PLC, transmitter, and receiver.

Another embodiment incorporates a controlling component that is programmed to engage a relay to turn on a wireless transmitter when it needs to transmit a "full" or "malfunction" signal. The controlling component can also engage a relay to turn on the receiver, so that the PLC can have new information up loaded remotely by a user. The controlling component is programmed to disconnect the transmitter or receiver from the electrical system to save energy, after the data event. The electrical system is attached to the transmitter via relays so this disconnect is physically possible. In all such embodiments, disconnection can be achieved though input/output pins on the controlling component, without changing the nature of the electrical disconnect described in this invention.

Another embodiment includes bomb-sensing logic in the PLC. The PLC is programmed to engage a relay to turn on an explosives detector when the machine is used (FIG. 36). The PLC is programmed to disconnect the detector from the electrical system to save energy, and the electrical system is attached to the detector via relays so this disconnect is physically possible. In this embodiment, the explosives detector is connected directly to the Daughter PLC so that if malicious substances are detected, the main PLC can be removed from sleep mode immediately. The device may be outfitted with a camera that is activated by the opening of the insertion opening. The device may store a photo of everyone who deposits anything into the machine or of vandals who abuse the device (e.g., kicking, placing lit paper in the device). Picture storage may be by, for example a flash memory device. Photos may be wirelessly transmitted to a remote location, particularly if a sensor detects that the device suffered abuse.

In yet another embodiment, a tracking system, such as a global positioning system ("GPS") or other suitable tracking device is included, as shown as an "Accessory" schematically in FIG. 36.

The ability to locate a device provides theft recovery capability, quick logistical analysis, among its advantages. Such functions are also configured to be switched on and off by the PLC to reduce energy consumption. Additionally, in another embodiment a PLC is programmed to engage a solenoid or other actuator which locks the repository access door 912 when the toter is full. This reduces toter overflow/overfilling and provides security benefits. In an additional embodiment, the device may include certain fitments that allow for the automated removal of a removable toter 3200. The fitment may include a bar or a handle at certain height, or reinforcing ribs so that a mechanical hand can safely grab the removable bin without breaking it or causing to flex inward to such a degree that the waste streams inside are damaged or that they cannot be removed. Importantly, the sizing of the fitment and design of the interface between the bin and the lifting apparatus preferably matches the mating features of commonly used fitments on trucks. This typically includes a ledge and a bar at specific locations.

Particular configurations of the device address keeping the solar collection capacity and device access undiminished by snow accumulation. These are characterized by curved or angled top side, by heat conservation or by heating elements. Heating elements are controlled to be activated when the battery is near full charge. Further, heating, mechanical movements such as shaking or other snow dislodgement tactics (e.g., air compression/air blast elements, fans, pumps to remove liquids from inside the enclosure are placed above, beneath, near, or within the solar panel or underneath the mechanics of the insertion opening, in order to dispose of snow or ice that is covering the solar panel or clogging mechanical devices designed to allow materials to drop into the enclosure below, as shown positioned between the solar panel and the insertion opening. Sensors detect moisture, temperature, or a lack of light reaching the solar panel and activate the snow dislodgement elements. Curved and angled tops naturally shed snow and moisture without energy use.

In some configurations, the device includes placard attachment elements on the exterior to allow advertisement placards to be placed on the outside of the containers. Placard attachment elements are available in a variety of forms such as clips, corners, hook-and-loop fasteners (e.g., Velcro®), and magnets. Other features include wired or wireless communications equipment installed with the device, such as a transmitter, which is electrically connected to components mounted within the container or attached to the container. Radio or other wireless signals are transmitted by the device at specific points such as when the device waste container is full and no more deposits are possible, or if the device malfunctions or being vandalized. Further, the device can report on conditions including battery charge, cycle counts etc. The device also receives signals, including commands to immediately perform tasks such as changing or engaging the display or audio message. The device is also configured to report conditions by an indicator panel and by wireless transmitter, which indicates when the device is full or malfunctioning. Such indicator lights and methods allow the containers to be inspected 40 from a distance (such as through binoculars or over the internet) to allow service personnel to determine whether it is necessary to make a service trip to the device.

Along with solar power, the present disclosure contemplates other sources of power. This includes windmill or waterwheel electric generators or a compressor located proximate to the container, or located at an optimal location for collecting power. Alternatively, a human powered generator such as with a hand or foot crank or pump is positioned with the device, with instructions inviting users of the device to add human power such as crank the handle or pedal or pump to help store energy. Alternatively, the collection vehicle may recharge the energy storage mechanism. For such generators, whether by windmill, waterwheel or human, or heat-differential-powered, alternative energy generation means and energy storage means may be used, for example pumping air into a pressure tank for driving a pneumatic motor or piston, winding up a spring mechanism, or a pulley system, the present disclosure is configured to be energy efficient, to use energy intermittently to save power, and to be able to be run off of stored energy.

Along with the container, the present disclosure contemplates a server-based information storage system capable of receiving data from the enclosure. In one embodiment, the server is a programmable and searchable database which enables the user to display such information as average fullness, peak fullness, collection statistics derived over a period of time, such as collection efficiency, a measure of collections rendered versus collections actually required. It may also display statistics relating to waste handling cost, such as waste audits, which compare hauling charges to services rendered, industry benchmarks or comparative hauling charges if bin capacity or collection frequency were changed. It may display recommendations to reduce hauling costs by varying collection frequency or bin size. The server may also automatically consolidate information and relay said information to another server, such as a server located at a client site. In one embodiment, the information is uploaded directly to the accounting database of a client, so that the invoice paid to the collector can be automatically audited to ensure accuracy. In other embodiments, there is software code configured to determine useful statistics, such as optimal routes for collections or servicing each bin, the optimal configuration of bins of different volumes, so that optimal waste capacity and location of each bin on a collection route can be recommended, reducing wasted fuel and time stemming from collections rendered on bins that are not full. Such software may also include programs to track assets, such as trucks or dumpsters, using data mined from the database, which may be further informed by GPS tracking devices on each asset in a group.

Thus, embodiments of the present disclosure provide methods for deploying, collecting, transporting, re-purposing, and disposing of used, unused, and/or green waste material 2406. The methods include deploying one or more machines 900 at one or more locations. The methods also include collecting and transporting one or more toters and disposing of or re-purposing the green waste materials 2406.

Disclosed embodiments of machine 900 may include anti-tampering subsystems to guard against external tampering with or removal of waste such as from an inner container during collection, transportation and re-purposing or disposal of the used, unused, and/or green waste material 2406.

In certain embodiments, the disclosed machine 900 includes a surveillance subsystem to monitor collection of the used, unused, and/or green waste material 2406. In other embodiments, the disclosed machine 900 also includes an anti-tampering subsystem. In other embodiments, the disclosed machine 900 includes a processing subsystem for monitoring the integrity of machine 900 and for collecting data associated with the same. In other embodiments, the processing subsystem includes communication hardware and software for transmitting the disclosed machine 900 data to a remote monitoring subsystem. In other embodiments, the processing subsystem may receive instruction from the remote monitoring subsystem to indicate an alarm condition signifying a tamper state in the disclosed machine 900. In certain embodiments, the tamper state may be indicated by visually such as a flashing light indicator such as an LED. In other embodiments, the tamper state may be indicated audibly such as via beeper, buzz, siren, or other audible indicator. In other embodiments, the tamper state may be indicated visually and audibly.

In certain embodiments, the inner container includes a monitoring subsystem for monitoring the filling, transporting, and repurposing or disposing of the used, unused, and/or green waste material 2406 deposited within the disclosed machine 900. It should be recognized that the disclosed machine 900 may be filled with other materials beside cannabis waste material. In other embodiments, the disclosed machine 900 includes a tamper resistant sealing member. In other embodiments, the disclosed machine 900 also includes a pressure sensing subsystem for sensing a pressure of the collected materials therein.

Unidirectional Opening Members

Suitable machine 900 shapes may include, without limitation, a polygonal solid such as a rectangular solid, such as a box; a cylinder such as a barrel; a sphere; an ellipsoidal solid; a trapezoidal solid; any other geometrically shaped container or mixtures or combinations thereof.

Suitable opening shapes of the disclosed machine 900 may include, without limitation, circular, ellipsoidal, polygonal such as a triangular opening, a square opening, a rectangular opening, a hexagonal opening, etc., any other opening shape, and/or mixtures or combinations thereof.

A suitable unidirectional machine 900 apparatus may include, without limitation, any structure that permits deposing into an interior of a container, while resisting normal attempts at withdrawal of materials deposited therein. Without limiting the structures of the unidirectional machine 900 apparatus suitable for use in this disclosure, a set of structures are set forth below referred to herein is first type, second type, third type, fourth type, fifth type, sixth type and seventh type unidirectional apparatus designed to permit deposition into an interior of the disclosed machine 900, while resisting normal attempts at withdrawal of materials deposited therein. The disclosed machine 900 may include one unidirectional apparatus or combination of unidirectional apparatuses. For additional details concerning unidirectional apparatuses for depositing source pharmaceutical material into the inner container of the collection apparatuses, the reader is referred to U.S. Pat. No. 8,324,443 issued 4 Dec. 2012 which is herein incorporated by reference.

A first type of unidirectional apparatuses of the present disclosure may include having a plurality of radial slits, where the member can be any regular or irregular shape and the radial slits extend from a center of the member outward to a boundary for affixing the member into the top of the container. The first type of unidirectional apparatuses may be referred to as radially slitted unidirectional apparatuses.

A second type of unidirectional apparatus includes a flat or substantially flat member (less than about 5% deflection from flat) having one longitudinal, lateral, or slanted slit or a plurality of such slits, where the member can be any regular or irregular shape, and the slits extend between a boundary for affixing the member into the top of the container. The second type of unidirectional apparatuses are sometimes referred to as non-radially slitted unidirectional apparatuses. When a member includes a plurality of slits, the slits may be arranged in a pattern.

A third type of unidirectional apparatus includes a housing having an opening in its top and a slidable member disposed in an interior of the housing. The slidable member includes a hollow cavity within which material can be placed. The slidable member is slidable within the housing by a handle attached to the slidable member and movable within a longitudinal slot in the housing. Once material is placed within the hollow cavity, the slidable member is moved so that the hollow member aligned with an opening in the top of the container such that the material falls into an interior of the container. This type of unidirectional apparatus restricts normal attempts to withdraw deposited materials. The third type of unidirectional apparatuses are sometimes referred to as slidable unidirectional apparatuses.

A fourth type of unidirectional apparatus includes a rotatable member having an opened interior. Material is placed in the interior of the rotatable member. The rotatable member is rotated 180° resulting in the material in the interior being deposited in the interior of the container. This type of unidirectional apparatus restricts normal attempts to withdraw deposited materials. The fourth type of unidirectional apparatuses are sometimes referred to as rotatable unidirectional apparatuses.

A fifth type of unidirectional apparatus includes a flat or substantially flat member (less than about 5% deflection from flat) having one or a plurality of arcuate slits and tabs, where the arcuate slits form portions of member that can rotate about tabs allowing material to pass into the interior of the container, while resisting normal attempts of withdrawal of deposited material. The fifth type of unidirectional apparatuses are sometimes referred to as arcuate slitted unidirectional apparatuses.

A sixth type of unidirectional apparatus includes at least one biased slidable member including a handle mounted in an opening in the top of the container. When the slidable member is moved to open the opening, the biased member is compressed. Once material is placed into the container through the opening, the slidable member is released and the biased member quickly restores the slidable member to its closed state. This type of apparatus permits material deposition, while resisting normal attempts of withdrawal of deposited material. The sixth type of unidirectional apparatuses are sometimes referred to as biased unidirectional apparatuses.

A seventh type of unidirectional apparatus includes a chute including baffles mounted in an opening in the top of the container. The seventh type of unidirectional apparatus also includes a chute having a spiraled configuration. The seventh type of unidirectional apparatus also includes a chute having a zig-zag configuration. The seventh type of unidirectional apparatus also includes a chute having any other configuration that resists normal attempts at withdrawal of deposited materials from the interior of the container.

For unidirectional apparatus that include a flat member, suitable flat member can be, without limitation, rigid members, semi-rigid members, flexible members, resilient members, and/or mixture or combinations thereof. In certain embodiments, the members may be constructed out of, but not limited to: corrugated plastic materials, steel, stainless steel, PVC, copper, bronze, plastic mold injections, plastic molds such as via 3D printing, high density polyethylene (HDPE), and low density polyethylene (LDPE).

Locks

Suitable locks for use with the disclosed machine 900 or with a n inner container if they are locked include, without limitation, any lockable apparatus including combination locks, shielded combination locks, key pad locks, pad locks, shielded pad locks, ring locks, key locks, biometric locks that use fingerprints, palm prints, retinal scans or other biometric features that may be used to open or close a lockable apparatus. The disclosed waste container or lockable apparatuses may combination of any of these lock types. Thus, the lockable apparatus may include a key pad and a finger print recognition pad or a retinal scan and a combination lock. The lockable apparatus may use a member or members that rotate into slots, a dead bolt or dead bolts that insert into apertures, a spring loaded member or spring load members, a magnetic and/or electromagnetic locking member or members, or combinations thereof.

Monitoring, Tracking and Communications Hardware and Software

Suitable monitoring, tracking and communications hardware and software include, without limitation, cameras, IR imaging apparatuses, sonic imaging apparatuses, passive and active radio frequency tags, IR transmitters, sonic transmitters, lasers, masers, wireless communication hardware and software such as cell phone technology, radio transmitting hardware and software, wired communications hardware and software such as telephone lines, high speed data lines, or similar wired hardware or software equipment, intranet wired and/or wireless communication networks, internet wired and/or wireless communication networks, or mixtures thereof.

Digital Processing Units

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Erricsson, HP, Samsung, Hitachi, NRC, Applied Materials, AMD, Cyrix, Sun Microsystem, Philips, National Semiconductor, or any other manufacture of microprocessors or microcontrollers. The DPU devices are capable to receiving, transmitting and analyzing data from collections apparatuses, outer containers, and/or inner containers.

Analog Processing Units

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc. The APU devices are capable to receiving, transmitting and analyzing data from collections apparatuses, outer containers, and/or inner containers.

Motion Sensing Apparatus

The optical sensors can also be used as optical touch or touchless pads for notebook computer or drawing tablets. The optical sensors can also be digital or analog camera systems with focal plane set to sense motion within a zone, area or volume in front of the lens. The optical sensors can be operated in any region of the electromagnetic spectrum including, without limitation, RF, microwave, near IR, IR, far IR, visible, UV or mixtures or combinations thereof. Moreover, LCD screen(s) may be incorporated to identify which devices are chosen or the temperature setting, etc. Moreover, the interface can project a virtual control surface and sense motion within the projected image and invoke actions based on the sensed motion. The motion sensor associated with the interfaces of this invention can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion could be used. The interfaces can include mixtures or combinations of any known or yet to be invented motion sensors. Suitable motion sensing apparatus may include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, any other device capable of sensing motion, changes in EMF, changes in wave form, or the like or arrays of such devices or mixtures or combinations thereof.

Biometric Locking Devices

Machine 900 of the present disclosure may incorporate suitable biometric locking devices include fingerprint recognition locking systems, retinal recognition locking systems, palm recognition locking systems, voice recognition locking systems, face recognition locking systems, other biometric recognition locking systems, or mixtures or combinations thereof. Suitable United States manufacturers include, without limitation, Security Solutions, Mustang, Oklahoma; Keri Systems, Inc., San Jose, CA; Time Clocks and More, Deland, FL; Time & Parking Controls, Upper Darby, PA; Vector Security, Lancaster, PA; Control Module, Inc., Enfield, CT; Security Management Systems, Great Neck, NY; Lumidigm Inc, Albuquerque, NM; RF Logics Inc, Torrance, CA; Sielox, Runnemede, NJ; Rayco Security Inc., Van Nuys, CA; Mace Security International, Inc., Mount Laurel, NJ; Access Controls International Awarded Security System, Freehold, NJ; ekeyUSA Systems LLC, Bradenton, FL; Fulcrum Biometrics, San Antonio, TX; David-Link Fingerprint USA Corp., City Of Industry, CA; Hirsch Identive, Santa Ana, CA; Federal Surveillance Systems, Newark, NJ; M2SYS LLC., Atlanta, GA; MAXxess Systems, Inc., Anaheim, CA; Vertex, Inc., New York, NY; Professional Lock Systems, Long Beach, CA; FaceKey Corp., San Antonio, TX; ISSCO Industrial Security Systems & Controls, Westbury, NY; LiGER Security, Toronto, ON; Global Technical Systems, Virginia Beach, VA; Biolock USA, Camarillo, CA; SAMCO Time Recorders, Inc., Bogota, NJ; Sensormatic Hawaii, Inc., Aiea, HI; Acroprint Time Recorder Co., Raleigh, NC; AuthenTec, Melbourne, FL; Identix, Inc., Minnetonka, MN; Dataflo Consulting, Omaha, NE; Wornall, Kansas City, MO; Indigo Systems, Portland, OR; Mid Florida Security, Lakeland, FL; PM Locks, Oklahoma City, OK; Phileo Inc., Fort Lee, NJ; LSI (Lamination Service, Inc.), Memphis, TN; DSX Access Systems, Inc., Dallas, TX; US Biometrics Corp., Naperville, IL; Fingergear, Mountain View, CA; MaxID Corp., Reston, VA; and Identica Holdings Corp, Tampa, FL There are many off source manufacturers as well.

Container Construction Materials

Suitable materials used in the construction of the machine 900 may include, without limitation, pulp materials, polymer materials, fibrous materials, fabric material, metallic materials, ceramic materials, composite materials, and/or mixtures or combinations thereof. The disclosed waste containers may also be coated with a coating material before and/or after being filled. The construction materials may also be coated with a coating material before and/or during construction.

Other Materials

Suitable used or waste materials include, without limitation, any used or waste material. Exemplary examples of used or waste materials include, without limitation, used or waste industrial materials, used or waste municipal materials, used or waste healthcare materials, used or waste medical materials, used or waste agricultural materials, used or waste biomass materials, used or waste metal materials, or mixtures or combinations thereof. Used or waste healthcare and used or waste medical waste can include medical waste, generated by people, doctors, doctor offices, clinics, emergency clinics, hospitals, dentists, dentistry clinics and hospitals, veterinarians, veterinary clinics and hospitals, farms, farmer, ranches, ranchers, or producers of used or waste material and/or other facilities that produce used or waste material. These used or waste materials are generally complex mixtures of components including, without limitation, pulp materials, fiber materials, fabric materials, polymer materials, ash materials, other materials and/or mixtures or combinations thereof.

Pulp materials suitable for use herein include, without limitation, wood, wood chips, sawdust, paper, cardboard, and/or mixtures or combinations thereof.

Fiber materials suitable for use herein include, without limitation, natural fibers, synthetic fibers, or the like and mixtures or combinations thereof. Exemplary fibers include, without limitation, inorganic fibers, carbon fibers, boron-nitride fibers, organic fibers, ceramic fibers, glass fibers, any other fibrous material and mixtures or combinations thereof.

Fabric materials suitable for use herein include, without limitation, any natural or synthetic fabric and mixtures or combinations thereof. Exemplary examples include, without limitation, cotton, wool and other fabrics made from animals or plants, RAYON, DACRON, fabric made of polyamides, or any other fabric or mixtures or combinations thereof.

The metal or metallic materials include, without limitation, any metal or metal alloy including a metal from the periodic table of elements. Exemplary examples include, alkali metals (Group 1 metals), alkaline earth metals (Group 2 metals), transition metals (Group 3-12 metals), Lanthanide metals, Actinide metals, post-transition metals, metalloids, or mixtures or combinations thereof. Certain metals and metalloids may be removed prior to use depending on the use to which the burnable fuels is put. The metals can be in any form include fibers, pieces, devices including metals, etc. and mixtures or combinations thereof. Exemplary examples include waste electronic devices. Of course, it should be recognized to one of ordinary skill in the art, that certain metals and metal alloys either pose a health or environmental concerns or issue or process concern or issues. Exemplary examples of such metals or metal alloys would include mercury, cadmium, lead, and thallium and radioactive elements and/or isotopes.

Ceramic materials suitable for use herein include, without limitation, any ceramic material or ceramic containing material or mixtures or combinations thereof. Exemplary examples include, without limitation, electronic substrates, glass, dishes, clay pots, any other object that contains a ceramic material, and mixtures or combinations thereof.

The polymer materials suitable for use herein include, without limitation, plastics, thermoplastics, elastomers, thermoplastic elastomers, resins, and other polymer or polymeric materials and/or mixtures or combinations thereof.

Agricultural materials suitable for use herein include, without limitation, any agricultural waste, any agricultural packaging material and mixtures or combinations thereof.

Biomass materials suitable for use herein include, without limitation, any plant matter that is left over after processing to produce an end product such as sugar cane and sugar beet processing, and mixtures or combination thereof.

Other materials can include, without limitation, chemicals, ash, pharmaceuticals (e.g., unused pharmaceuticals, expired pharmaceuticals, or any other pharmaceutical compositions), ceramics, binding agents, composites materials of one or more of the components set forth above, any other materials and/or mixtures or combinations thereof. The inventors have also found that ash derived from incinerating certain used or waste materials, where the ash still has material or fuel value can be added to the material to change or augment a compositional makeup of the fuel.

In all of the mixtures, polymer materials from other sources of waste, unused and/or virgin polymer materials can be added as binding agents to the material before burning or before forming the material into a desired compact shape followed by combustion of the fuel. The inventors believe that polymer materials act as binders in the shaping process, e.g., pelletizing, and help to increase the combustible nature of the resulting fuel.

The used or waste material can include any mixture or combination of any of the above identified materials.

Suitable virgin and/or unused materials can be any material that has not been used and is added to the input material to change a property of the resulting fuel including altering a fuel value of the material, altering an ash composition of the material, expired pharmaceuticals, altering a fluidity of the material, altering a bulk density of the material, altering the cohesiveness of the material, altering the wettability of the material, or altering other properties or two or more properties of the material or mixtures or combinations thereof.

Suitable container or packaging include, without limitation, boxes, barrels, sacks, other containers, or mixtures or combinations thereof.

Suitable disinfecting and/or partially or completely sterilizing equipment include, without limitation, any equipment that can disinfect, and/or partially or completely sterilize used or waste material such as autoclaves including those manufactured by OnSite Sterilization, LLC of Pottstown, PA, chemical treatments, thermal treatments, radiant treatments, radiological treatments, or any combination thereof.

Suitable pre-treating equipment includes, without limitation, heating units, vaporizing units, pyrolyzing units, washing units (water or solvent), cracking units, cooling units, magnetic separation units, electrolysis units, air floatation units, screening units, segregating units, sedimentation units, fracturing units, shredding units, ultrasonic units, disinfecting units, sterilizing units, chemical treating units, neutralizing units, quality control units, cryogenic units, condensing units, polymerizing units, and mixtures or combinations.

Suitable sizing and homogenizing equipment includes, without limitation, shredders, grinders, choppers, hammer mills, ball mills, or any other equipment used to reduce the physical size of a complex material or any combination of these equipment in series, parallel or a combination thereof. Shedders including those manufactured by SSI Shredding Systems, Inc. of Wilsonville, Oregon.

Suitable shaping equipment includes, without limitation, pelletizes such as those manufactured by Roskamp Champion of Waterloo, IA or California Pellet Mill Co. of Crawfordsville, IN, extruders, other compressing forming equipment or any combination thereof.

Suitable incinerator equipment include, without limitation, any incinerator equipment, pyrolysis treatments, plasma treatments, or other treatments that can burn or combust a used or waste material to an ash, having a given un-used fuel value from 0 to some finite value. Exemplary examples include CONSUMAT® Incinerators manufactured by Consutech Systems, LLC (CONSUMAT is a registered trademark of Consutech Systems, LLC).

Suitable fuel utilization equipment include, without limitation, cement plants, lime plants, brick plants, power plants, municipal incinerators for steam generation, or any other facility that burn fuels and converts heat derived from the burning of the fuel into a usable form of energy or for use of the heat and ash to make an end product or any combination thereof.

For embodiments of the fuels derived from the present invention that are designed to be formed or shaped into a consolidated structure such as a pellet, the used or waste material compositions include an effective amount of binding agents, sufficient to permit the shaping to maintain its final shape. The binding agents are selected from the group consisting of polymer materials or other materials that have a melting or softening temperature between about 40° C. and about 150° C. In certain embodiments, the binding agents are polymer components in used or waste material having a melting or softening temperature between about 40° C. and about 150° C. Exemplary examples of such polymeric materials include, without limitation, modified cellulose, fabrics, plastics, thermoplastics, thermoplastic elastomers, elastomers, fiber enforced resins, metalized or metal coated plastics or polymers, or other polymeric materials and mixtures or combinations thereof. Exemplary plastics and thermoplastics include, without limitation, polyolefins, fluorinated polyolefins, chlorinated polyolefins, polyurethanes, polyalkyleneoxides, polyethers, polyesters, polyamides, polyimides, polycarbonates, epoxy resins, phenolic resins, alkylide resins, polyacrylates, polylactic acid, polyglycolic acid, other biocompatible polymers, and mixtures or combinations thereof. In other embodiments, the bonding agents can include ash alone or in combination with other binding agents. In other embodiments, binding agents can be added to the material to enhance or improve consolidation, to change or alter final ash composition, to reduce or increase metal content, to change or alter consolidated particle properties, to modify or change final particle appearance, or to enhance, improve, alter or change any other final property of the consolidated products of this invention. In specific, materials can be added to the burnable fuel as is, before or after sizing or sizing and shaping to adjust a heat content and/or ash composition of the burnable fuel regardless of its nature or shape.

Suitable transportation subsystems include, without limitation, common carriers, contract carriers, medical waste pick-up service companies, hazardous waste pick-up service companies, or mixtures and combinations thereof. Exemplary examples of common carriers include, without limitation, United States Postal Services, UPS, FedEx, DHL, Lone Star, or any other shipping organization. Exemplary examples of contract carriers include, without limitation, Xpress Global Systems of San Diego, CA; USF of San Diego, CA; GI Trucking Company of Chula Vista, CA; Yellow Transportation of San Diego, CA; Con-Way of Chula Vista, CA; Roadway Express of Santee, CA; Exel of Westerville, OH; UPS Inc. of Alpharetta, GA; Ceva Logistics of Houston, TX; Ryder System Inc. Of Miami, FL; C.H. Robinson Worldwide of Eden Prairie, MN; Genco ATC of Pittsburgh, PA; DB Schenker USA of Freeport, NY; Neovia Logistics of Downers Grove, IL; J.B. Hunt Transport Services of Lowell, AR; Kuehne+Nagel Inc. of Jersey City, NJ; Swift Transportation Co. of Phoenix, AZ; Werner Global Logistics of Omaha, NE; NFI of Cherry Hill, NJ; Expeditors International of Washington of Seattle, WA; APL Logistics of Scottsdale, AZ; Schneider National Inc. of Green Bay, WI; Penske Truck Leasing Co. of Reading, PA; OHL of Brentwood, TN; New Breed Logistics of High Point, NC; Ingram Micro Logistics of Santa Ana, CA; Menlo Worldwide Logistics of San Mateo, CA; UTi Worldwide of Long Beach, CA; Ruan Transportation Management Systems of Des Moines, IA; Jacobson Companies of Des Moines, IA; Panalpina Inc. of Morristown, NJ; Kenco Group of Chattanooga, TN; Greatwide Logistics Services of Dallas, TX; U.S. Xpress Enterprises of Chattanooga, TN; Fidelitone Logistics of Wauconda, IL; 3PD Inc. of Atlanta, GA; Hub Group of Downers Grove, IL; Cardinal Logistics Management of Concord, NC; DSC Logistics of Des Plaines, IL; VersaCold Logistics Services of Vancouver, British Columbia, Canada; Linc Logistics Co. of Warren, MI; FedEx of Memphis, TN; ModusLink Global Solutions of Waltham, MA; Saddle Creek Logistics Services of Lakeland, FL; BDP International of Philadelphia, PA; Agility Logistics of Irvine, CA; Total Quality Logistics of Cincinnati, Ohio; Landstar System of Jacksonville, FL; England Logistics of Salt Lake City, Utah; Damco International of Madison, NJ; Pacer International of Dublin, Ohio; Averitt Express of Cookeville, TN; SCI Logistics of Toronto, Canada; Warehouse Specialties Inc. of Appleton, WI; Yusen Logistics (Americas) of Secaucus, NJ; MIQ Logistics of Overland Park, Kans.; Kane Is Able Inc. of Scranton, Pa.; or any other commercial carrier. Exemplary examples of medical waste pick-up service companies include, without limitation, Stericycle, Inc., Daniels Sharpsmart, Daniels International, Waste Management, any other medical waste pick-up service company, or mixtures and combinations thereof. Exemplary examples of hazardous waste pick-up service companies include, without limitation, Veolia Environmental Services, Clean Harbors, Heritage Environmental Services, any other hazardous waste pick-up service company, or mixtures and combinations thereof.

Pre-Treatments

In certain embodiments, some or all of the input material or a material to be included in the input material is pre-treated to augment, change or remove components of a source pharmaceutical material. Such pre-treatments can include quality control testing, heating to remove volatile components, washing to remove water soluble components, solvent washing or extraction to remove solvent extractible components, pre-screening to remove materials having a certain size or construction for separate processing, partial pyrolysis to alter properties of the source material, drying to remove water, crushing of large objects into smaller objects for subsequent processing, any other pretreatment designed to condition a particular source material for use as a component in the input material used to produce the burnable fuels of this invention and any combination of these pre-treatments. Such pre-treating or pre-processing includes those set forth above. The pre-treatment may also be devices to added desired other materials such as binding agents, fuels, liquids, oxides, etc. to augment the composition of the source pharmaceutical material so that the augmented source pharmaceutical material has desired properties such as augmented fuel valve, augmented ash content, augmented properties to insure that the unused pharmaceuticals including over-the-counter (OTC) pharmaceuticals, prescription pharmaceuticals and controlled pharmaceuticals may not be readily extracted and/or otherwise used if the material is designed for landfilling.

Disinfecting Pre-Treatment

In certain embodiments and for certain materials, some or all of the input material or materials that will ultimately be included in the input material is disinfected and/or partially or completely sterilized using any methodology known to render a disinfected material, substantially free of any harmful pathogens. In certain embodiments of this invention, disinfecting and/or partial or complete sterilization is performed via autoclave sterilization. The source used or waste material is placed in an autoclave at a temperature and pressure and for a time sufficient to render a disinfected material, free or substantially free of any harmful pathogens. The temperature is generally greater than at least 121° C., at a pressure of at least 15 psig and for a time of at least 30 minutes. In certain embodiments, the temperature is between about 121° C. and about 150° C., the pressure is between about 15 psig and about 50 psig and for a time between about 30 minutes and 60 minutes. In certain embodiments, the temperature is between about 121° C. and about 125° C., the pressure is between about 15 psig and about 25 psig and for a time between about 30 minutes and 60 minutes. In certain embodiments, the temperature is between about 121° C. and about 123° C., the pressure is between about 15 psig and about 20 psig and for a time between about 30 minutes and 40 minutes. Although specific embodiments have been set forth on temperature, pressure and time, higher temperatures and/or pressures can be used as well as shorter or longer times depending on a desired outcome or property of the disinfected material.

Particle Distribution

The used or waste material, regardless of its makeup, is sized or sized and partially or completely homogenized or otherwise processed to reduce the particle size of the material and to form a particulate material having a certain particle size distribution and a certain degree of homogeny. The exact particle size distribution depends on the nature of the sizing or sizing and partially or completely homogenizing equipment used and on the screens or other size exclusion means used to control the particle size of the exiting particulate material and end use needs. The distribution of the present invention includes particles having a smallest dimension of between about 0.1 µm and about 1000 mm In certain embodiments, the particles have a smallest dimension of between about 1 µm and about 500 mm In certain embodiments, the particles have a smallest dimension between about 10 µm and about 500 mm In other embodiments, the particles have a smallest dimension between about 100 µm and about 500 mm In other embodiments, the particles have a smallest dimension between about 1 mm and about 500 mm In other embodiments, the particles have a smallest dimension between about 1 mm and about 250 mm In other embodiments, the particles have a smallest dimension between about 1 mm and about 100 mm In other embodiments, the particles have a smallest dimension between about 1 mm and about 50 mm In other embodiments, the particles have a smallest dimension between about 10 mm and about 50 mm. The smallest dimension means that the particles are capable of passing through a screen of a desired screen size. The screen size range between openings of about 12.7 mm to about 50.8 mm In other embodiments, the screen opening ranges between about 19.05 mm and about 44.45 mm In other embodiments, the screen opening ranges between about 19.05 and about 38.1 mm.

The term partially homogenized in the context of the present invention means that the particulate material, although being composed of many different material components, has been mixed sufficiently that the bulk composition of components is within about 30% the same throughout the entire particulate material. In certain, embodiments, the partial homogeneity is within 20% or lower. The term completely homogenized in the context of the present invention means that the particulate material, although being composed of many different material components, has been mixed sufficiently that the bulk composition of components is within about 10% the same throughout the entire particulate material. In certain, embodiments, the partial homogeneity is within 5%.

Compressed Shapes

Optionally, the particulate material from the sizing process is then pressed, extruded or similarly processed into a shape to increase the bulk density of the material. The shape can be any shape including a cylindrical shape, a cubical shape, a rectangular solid shape, a spherical shape, an ellipsoidal shape, a tablet shape or any other compact 3D shape. The dimension of these shapes can range between about 0.5 cm and about 20 cm. In certain embodiments, the shape is substantially elongate shape having a diameter less than or equal to its length. The shape can be of a cylindrical type having sharp cut ends or rounded ends depending on the method used to make the elongate shape. Generally, the elongate shapes have a diameter between about 5 mm and about 20 mm and length of about 2 cm to about 10 cm. In certain embodiments, the elongate shape is cylindrical or substantially cylindrical. In other embodiments, the elongate shape has a diameter between about 10 mm and about 20 mm and a length between 3 cm and about 5 cm. In other embodiments, the elongate shape has a diameter between about 10 mm and about 15 mm and a length between 3 cm and about 5 cm. However, the shapes can be larger or smaller depending on end use. In other embodiment, the shape can have a diameter between about 0.5 cm and 20 cm. In other embodiment, the shape can have a diameter between about 0.5 cm and 20 cm and a length between about 0.5 cm and about 20 cm. In other embodiment, the shape can have a length, a width and a height between about 0.5 cm and 20 cm.

Systems

Figure 37:
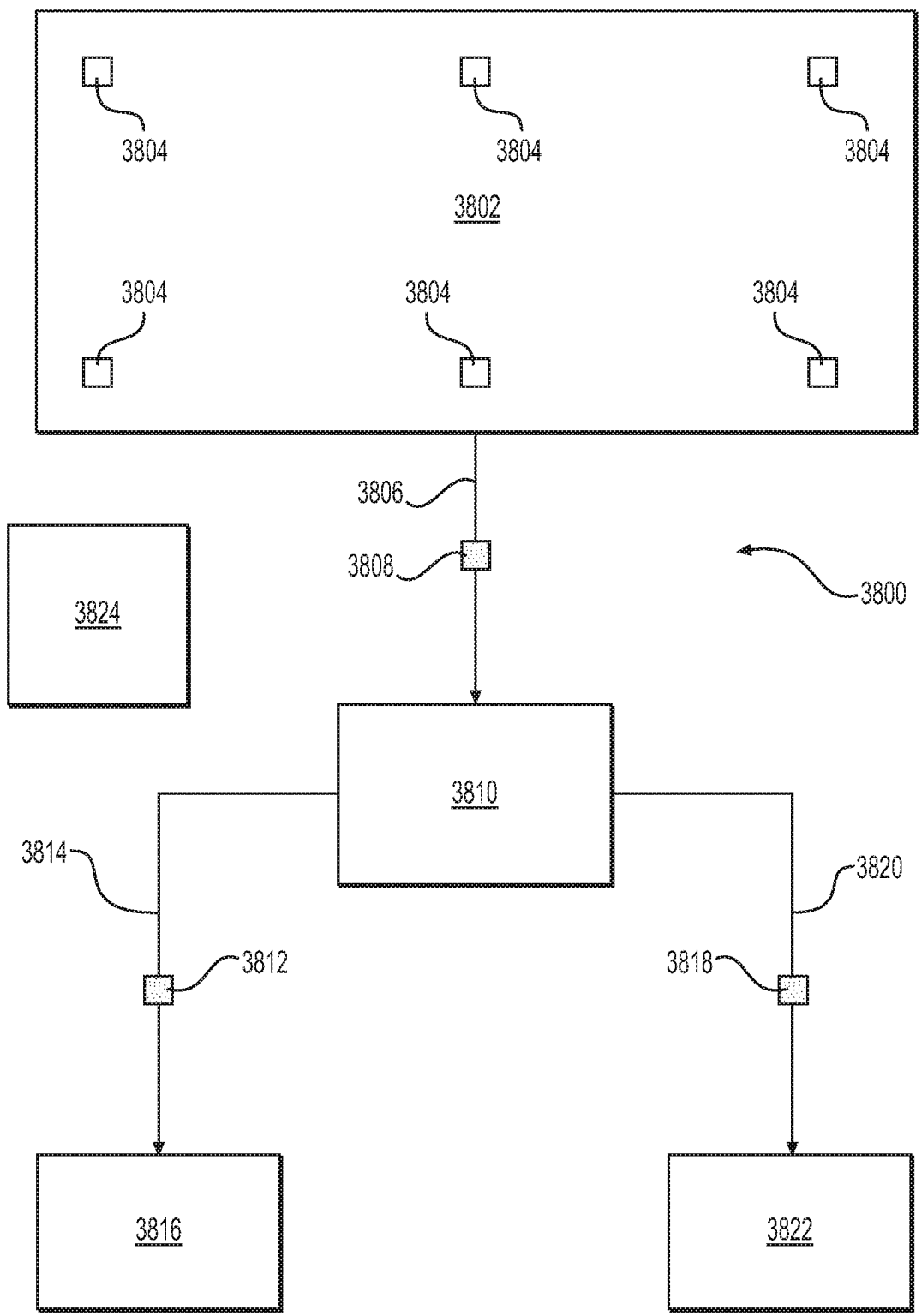
FIG. 37 depicts an embodiment of a system according to one embodiment of the present disclosure.

Referring now to FIG. 37, an embodiment of a collection system of this invention, generally 3800, is shown to include a facility 3802 that generates source waste materials, where the facility 3802 includes one or a plurality of collection apparatuses 3804 distributed in the facility 3802 for ease of deposition and collection of the source waste pharmaceutical containing materials. The system 3800 also includes a first transportation subsystem 3806 comprising a common or contract carrier for shipping the containers 3808 including the source waste materials to a processing subsystem 3810. In the processing subsystem 3810, the containers 3808 are collected and processed to chemically degrade what is considered to be a very valuable waste material that is otherwise susceptible to ending up in the wrong hands and proliferating the use of street drug abuse. The processing subsystem 3810 may include disinfecting and/or sterilizing units such as autoclaves, microwave units, electromagnetic heating units, or mixtures and combination thereof. The processing subsystem 3810 may include also include a comminuting unit such as a shredding unit, milling unit, grinding unit, cryogrinding unit, pulverizing unit, shattering unit, any other unit that comminutes material or reduces its size, or mixtures and combinations thereof. In select embodiments, a compressor and/or hydraulic press may be employed for separating liquid from solid waste materials and for compressing the solid into pellets of some shape and size. Thus, the processing unit 3810 may also including shaping units such as molding units, pelletizing units, extruding units, pressing units, other units that shape particulate materials into shapes, or mixtures and combinations thereof. The fuel material 3812 may be in the form of particulate materials, shaped particulate materials, containerized particulate materials, containerized shaped particulate materials, or a mixture and combination thereof. The fuel material 3812 is transported via a second transportation subsystem 3814 comprising a common or contract carrier to an incineration, power generation, and/or cement generation subsystem 3816 for incinerating the source pharmaceutical material with or without power production and/or cement generation. The landfill material 3818 particulate materials, shaped particulate materials, containerized particulate materials, containerized shaped particulate materials, or a mixture and combination thereof. The landfill material 3818 is transported via a third transportation subsystem 3820 comprising a common or contract carrier to a landfill subsystem 3822.

The system 3800 may also include a monitoring and/or tracking subsystem 3824 for monitoring the deployed collection apparatuses 3804 and for tracking the transportable inner containers 3808, for example, as described above. For monitoring, the collection apparatus 3804 include a monitoring unit capable of monitoring deposits into the inner container and removing the inner container from the apparatus 3804. For the tracking, the inner containers include a tracking unit capable of transmitting location information to the monitoring and/or tracking subsystem 3824. For tracking the fuel 3812, the fuel 3812 is transported in a container including a tracking unit capable of transmitting location information to the monitoring and/or tracking subsystem 3824. For tracking the landfill material 3818, the landfill material 3818 is transported in a container including a tracking unit capable of transmitting location information to the monitoring and/or tracking subsystem 3824. The monitoring subsystem 3824 communicates with the deployed collection apparatuses 3804, inner containers 3808, the containers containing the fuel material 3812 and the container containing the landfill material 3818. For additionally details on the system, the reader is directed to U.S. Pat. Nos. 8,100,989; 8,163,045; and 8,268,073.

Auditing/Tracking

Generally, only properly permitted and regulated companies are authorized to remove and dispose of cannabis waste. Legal cannabis cultivation operations must document every stage of plant management, usually called "seed to sale tracking," which is currently handled by several software companies. This includes accounting for plants and plant material that is being discarded, which usually includes extra vegetative plants, failed clones, and harvest waste.

Conventional processes for tracking the collection of banned waste at various customer sites are largely manually intensive and paper-based, requiring various personnel to handle and process the paper records. Such manual processes are cumbersome and prone to human error. For example, personnel not properly trained and/or licensed to handle or remove a particular type of waste may inadvertently handle or remove such waste. The lack of cross checking and immediate feedback in conventional systems may result in unauthorized personnel removing such waste, thereby creating health and/or safety risks to themselves and others.

An audit trail (also called audit log) is a security-relevant chronological record, set of records, and/or destination and source of records that provide documentary evidence of the sequence of activities that have affected at any time a specific operation, procedure, or event.[2,3] The process that creates an audit trail is typically required to always run in a privileged mode, so it can access and supervise all actions from all users; a normal user should not be allowed to stop/change it. Furthermore, for the same reason, trail file or database table with a trail should not be accessible to normal users. Another way of handling this issue is through the use of a role-based security model in a software.[4] The software can operate with the closed-looped controls, or as a "closed system," as required by many companies when using audit trail functionality.

[2] "National Information Assurance (IA) Glossary" (PDF). Committee on National Security Systems. 7 Aug. 1996. p. 4.
[3] "ATIS Telecom Glossary 2012 —audit trail." ATIS Committee PRQC. 2012. Archived from the original on 13 Mar. 2013.
[4] Brancik Kenneth C. (2007). "Chapter 2: Related Research in Insider Computer Fraud and Information Security Controls." Insider computer fraud: an in-depth framework for detecting and defending against insider IT attacks. CRC Press. pp. 18-19. ISBN 1-4200-4659-4.

Marijuana Enforcement Tracking Reporting Compliance (METRC) system is a cannabis tracking system developed by Franwell and is used for California, Colorado, Oregon, Alaska, Michigan and Maryland. METRC is a government software solution that provides end to end tracking and tracing of marijuana plants and products and enables agencies and regulators to track and monitor a given jurisdiction's cannabis industry. Licensed cannabis businesses are required to submit specific data points to their state's METRC system for compliance purposes.

METRC has both an industry side and regulatory side. The industry side is used to report the required events and information while the regulatory side is used for enforcement and compliance monitoring. METRC can be used for fighting against diversion and illegal use and purchase of cannabis. The regulatory features of METRC include:
- supports marijuana "regulations" with technology to prevent and monitor drug diversions;
- promotes public safety and patient product safety with traceability;
- addresses medical marijuana "diversion" from a "state mandated" position;
- creates a vertically integrated "closed-loop" medical marijuana regulatory scheme which stems, in part, from the landmark 2005 California case, Gonzales vs. Raich (If you can demonstrate a closed loop, in which no marijuana crosses state borders, it strengthens against federal intervention);

by the use of RFID (Radio Frequency Identification) technology combined with serialized item tracking, the system creates an "end to end" surveillance system where the municipality has real-time visibility at any given time into the "inventory" at all the locations (does not rely on audits for tracking);

central control of security through RFID secure tag ID;

captures perpetual inventory quantities for each entity;

provides an inspection process with the tools necessary to complete onsite validation of inventory with audit capability and anti-piracy safeguards;

supports the auditing process from a series of exception reports;

provides the industry with the means to report required inventories with minimal cost and investment—can remain cost neutral to the regulatory body;

The system maintains a secure reporting environment for each industry participant. Each participant can access their own data but no other participants' data. The regulator has access to all industry participants data;

The system provides for a real-time digital transport manifest giving access to law enforcement enabling them to quickly discover illegal activity during transportation;

Tracks transfers between licensed premises;

Allows regulatory users to view all licensee activities captured in the system;

Creates audit trails and tools for assessing risk and channeling resources more efficiently (e.g. system notifications and reporting);

Creates an industry database of analytical information to establish trends and benchmarks for marijuana production;

Allows criminal investigators to streamline field enforcement and compliance activities associated with licensees;

Provides aggregate data regarding cultivation, production, transportation and sales of marijuana within the regulated model;

Secure web hosted solution scaling to thousands of credentialed users.[5]

[5] See "The System." Metrc™, <<https://www.metrc.com/the-system>>.

Having provided a secured container for waste material and verified tracking of the same disclosed embodiments also provide value added services for providing one or more individual or a network of collection services to process the collected waste material for subsequent processing.

Figure 38:
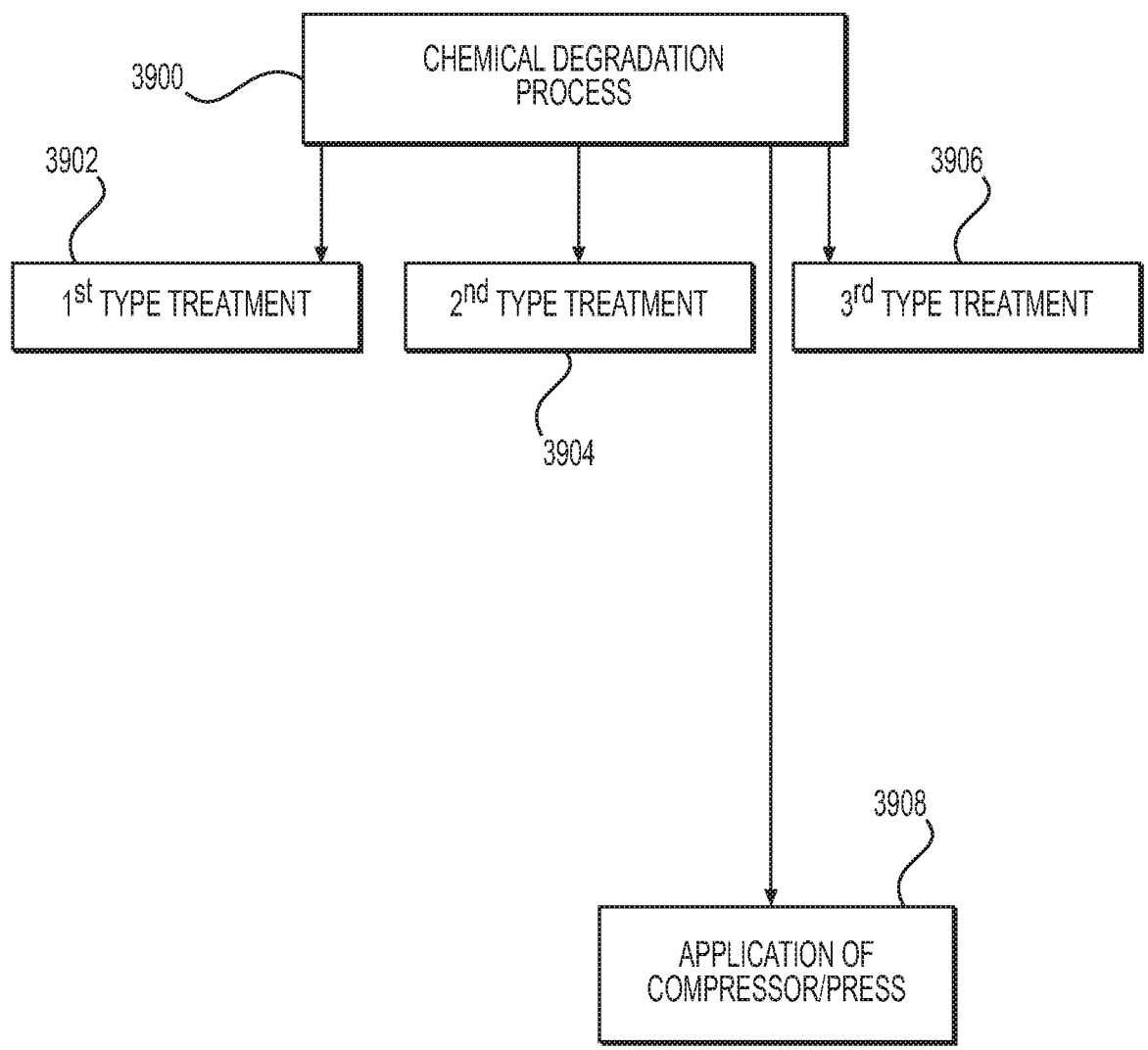
FIG. 38 illustrates a chemical degradation flow process according to one embodiment of the present disclosure.

Thus, an additional component of the disclosed invention describes an exemplary method for treating the waste material such as via a chemical degradation process. Embodiments of an exemplary chemical degradation process are illustrated, for example, in FIG. 38. Disclosed embodiments provide possible chemical degradation processes 3900 as follows:

On disclosed embodiment for enabling a chemical degradation (aka de-naturing) process may include providing a first type treatment 3902 such as (a) denaturing and neutralization by simple acid-base reaction using a water-soluble base to denature active compounds then adding an acid to bring the solution to a neutral pH (approximately pH 6.5-7). Another disclosed embodiment for enabling a chemical degradation process, select embodiments may include providing a second type treatment 3904 such as (b) denaturing by administration of ultraviolet light source. Applications of x-rays, high intensity light, and incubation may also be employed. While some chemicals have been disclosed herein, it is readily understood that other select chemicals may be utilized for enacting the chemical degradation process. Accordingly, in one exemplary example, select embodiments may include the use of sodium hydroxide (NaOH), as a base, in addition to a strong acid, such as sulfuric acid or muriatic acid, and water. In yet another disclosed embodiment for enabling a chemical degradation process select embodiments may include providing a third type treatment 3906 such as utilizing microbes to naturally decompose material over a period of days, weeks, or months.

In another disclosed embodiment, a compressor and/or press mechanism 3908 may be inserted within the disclosed waste unit or collection apparatus. The compressor and/or press mechanism may facilitate chemically degrading the waste material then press the neutralized liquid into a holding tank and press residual fiber into pellets of varying sizes. The neutralized liquid may be extracted from the holding tank and the residual fiber may be subsequently removed thereupon.

Thus, disclosed embodiments provide the disclosed machine 900 as a receptacle for not only receiving the described waste material, but also processing the same, such as via the disclosed chemical degradation process, within the machine 900. Therefore, the chemical deconstruction of the green waste material 2406 occurs within machine 900 or collection apparatus thereby eliminating a need for a separate processing facility such as a remote location disposed away from the aforementioned disclosed waste unit or collection apparatus. This also eliminates additional tracking and verification protocols for collecting green waste material from the disclosed machine 900 and ensuring proper transportation of the same for treatment, deconstruction and/or repurposing at another remote facility. Thus, the disclosed machine 900 addresses improved security and environmental concerns and techniques, since green waste materials 2406 will essentially be rendered inert prior to being removed from machine 900 at the same location in which the green waste materials 2406 was originally collected.

The disclosed invention is directed to collection, treatment and processing of marijuana or marihuana which may be regarded as cannabis. In referral to the plant itself, disclosed embodiments make no distinction between the two. It is readily appreciated that skilled artisans may argue that all cannabinoids (and perhaps terpenes) are all psychoactive in that they alter brain chemistry. However only THC is presently known to be psychoactive. Further, CBD is widely used in the industry and has recently been formulated as the first whole plant pharmaceutical that passed clinical trials. There remains some debate on the medicinal properties of CBD. Not all states treat it as an inert component; thus, there may be some speculation that it is or may be regarded as Schedule I. It is, therefore, considered that critical components of the disclosed plant extend beyond THC.

All aspects of the disclosed embodiment are applicable to all cannabis and cannabis subspecies, including hemp. In accordance with disclosed embodiments hemp is also considered as cannabis and is considered or called out alongside the other entities including, for example, cannabis, medical marijuana, recreational marijuana, etc. Finally, the disclosed waste unit or collection apparatus will have capacity to link to METRC as well as similar seed to sale software provided in other states.

Having described the many embodiments of the present disclosure in detail, it will be apparent that modifications and variations are possible without departing from the scope of the invention defined in the appended claims. For example, while embodiments describe the disclosed machine 900 as a receptacle for not only receiving the described green waste material 2406, but also processing the same, such as via the disclosed chemical degradation process, within the same machine 900, it is readily appreciated that other materials may be received by the disclosed machine 900 and processed within. Therefore, the treatment of the aforementioned other materials may also occur within machine 900 thereby eliminating a need for a separate processing facility such as a remote location disposed away from machine 900. Similar capability for machine 900 is also available for receiving and processing other materials such as tracking and verification protocols for collecting the other material(s) and ensuring proper transportation of the same for treatment, deconstruction and/or repurposing at another remote facility. Furthermore, it should be appreciated that all examples in the present disclosure, while illustrating many embodiments of the invention, are provided as non-limiting examples and are, therefore, not to be taken as limiting the various aspects so illustrated.

EXAMPLES

Example 1

Scenario: Cultivation facility batch of 1000 plants tested positive for mycotoxins, which requires batch destruction. Cultivation facility may submit attestation to rendering the failed batch unusable by commingling with cat litter as required by regulators.

In reality: cultivation facility may destroy all, some, or none of the failed crop. There is no objective audit trail. Further, it is very likely that most if not all of the failed crop is sold to the black market, yet this is 'off the grid' and as far as the regulators are concerned, the cultivation facility's attestation of destruction complies with regulatory body.

Example 2

Scenario: excess cannabis waste by testing laboratories.

Example 3

Scenario: expired materials in dispensaries.

Example 4

Scenario: old or moldy/unusable materials by personal growers/patients.

Example 5

Scenario: black market users who need to rid their illegal grows prior to enforcement detection.

Example 6

Scenario: Although legal by state, cannabis remains a federally prohibited substance and therefore, may not be transported across state lines. Tourists visiting a cannabis-friendly state, such as Colorado, must dispose of unused purchased products. Rather than properly dispose of this material, tourists may choose to leave residual product behind in hotels, rental cars, or attempt to transport via TSA/Border control at airports or borders.

The disclosed machine 900 will provide secure disposal at remote facilities, such as, hotels, rental car facilities, airports, and other points of transfer.

Example 7

Scenario: most illegal grow facilities are in U.S. National Parks. Once identified by DEA or other law enforcement, law enforcement agencies may seize the illegal grows and typically destroy the same via incineration. This incineration creates an ecological and environmental hazard to wildlife, residents, and other persons in the vicinity of the grow location and/or the airstream from the point of incineration.

The system, as described in the present technique or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present technique.

The computer system comprises a computer, an input device, a display unit and/or the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing or a request made by another processing machine.

While the present disclosure has been disclosed with references to certain embodiments, numerous modification, alterations, and changes to the described embodiments are possible without departing from the sphere and scope of the present disclosure, as defined in the appended claims.

Accordingly, it is intended that the present disclosure not be limited to the described embodiments, but that it has the full scope defined by the language of the following claims, and equivalents thereof.

What is claimed is:

1. A method of processing waste material in a self-contained smart waste machine comprising:
    powering the self-contained smart waste machine;
    placing waste material into an interior of the self-contained smart waste machine through a non-retrievable chute and into a first receiving bin;
    weighing the waste material in the first receiving bin;
    transferring the waste material from the first receiving bin to within a second receiving bin;
    supplying a processing fluid to a first holding tank for receiving the second receiving bin;
    immersing the second receiving bin with transferred waste material disposed therein into the processing fluid of the first holding tank to undergo a chemical degradation process for a prescribed time period;
    removing the chemically degraded waste material from the processing fluid of the first holding tank and allowing it to dry within the second receiving bin; and
    transferring the dried chemically degraded waste material from within the second receiving bin into a toter,
    wherein the placing step, the weighing step, the transferring the waste material step, the supplying step, the immersing step, the removing step and the transferring the dried chemically degraded waste material step occur entirely within an interior of a self-contained smart waste machine.

2. The method of claim 1, wherein the waste material includes green waste material.

3. The method of claim 1, further comprising:
    accessing and opening a lockable door of the self-contained smart waste machine and removing the toter from an interior of the self-contained smart waste machine to dispose of or repurpose the chemically degraded waste material.

4. The method of claim 3, further comprising:
    tracking the removed toter once removed from the self-contained smart waste machine.

5. The method of claim 1, further comprising:
    tracking the waste material placed into the interior of the self-contained smart waste machine.

6. The method of claim 1, further comprising:
    disposing of the chemically degraded waste material in a landfill facility, a cement facility, an incineration facility, or an industrial facility.

7. The method of claim 1, further comprising:
    monitoring the self-contained smart waste machine via one or more cameras, tracking software, GPS, RFID tag, lighting, and computer systems.

8. The method of claim 7, wherein the monitoring occurs after opening of the self-contained smart waste machine.

9. The method of claim 1, further comprising:
    producing a chain of custody audit trail of the waste material via the self-contained smart waste machine.

10. The method of claim 9, further comprising:
    uploading chain of custody audit trail information into a remote database via the self-contained smart waste machine.

11. The method of claim 10, wherein the chain of custody audit trail information includes communicating data, providing security information and/or security features.

12. The method of claim 11, wherein the communicating data, providing security information and/or security features further comprising a surveillance and audit data and verification and reporting capability.

13. The method of claim 12, wherein the audit data and verification and reporting capability includes at least one of specific identification of user depositing waste material, nature and weight of the waste material, photo or video of the waste material at time of deposit, synchronization or reconciliation of deposited waste material weight to that of the photo or video and an internal scale, opening and closure of the machine or when the machine is locked down, service personnel access to the machine, chemical degradation specifics including chemicals used in the processing of the waste material, final pH of resulting liquid generated from processing the waste material and date and time stamp information.

14. The method of claim 1, further comprising:
    wirelessly transmitting and receiving data from the self-contained smart waste machine.

15. The method of claim 14, wherein the data comprises chain of custody audit trail information.

16. The method of claim 1, further comprising:
    monitoring a deposit of green waste material within the self-contained smart waste machine.

17. The method of claim 1, further comprising:
    monitoring a fill level of the dried chemically degraded green waste material in the toter.

18. The method of claim 1, further comprising:
    immersing the transferred chemically degraded waste material for approximately 1-10 hours at ambient temperature.

19. The method of claim 1, wherein the transferred green waste material is immersed in a solution of predominately water and 10-15% sodium hypochlorite.

* * * * *